US009575645B2

(12) United States Patent
Han et al.

(10) Patent No.: US 9,575,645 B2
(45) Date of Patent: *Feb. 21, 2017

(54) DEVICE AND METHOD FOR PROCESSING VIRTUAL WORLDS

(75) Inventors: Seung Ju Han, Yongin-si (KR); Jae Joon Han, Yongin-si (KR); Won Chul Bang, Yongin-si (KR); Do Kyoon Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 573 days.

This patent is subject to a terminal disclaimer.

(21) Appl. No.: 13/640,658

(22) PCT Filed: Apr. 6, 2011

(86) PCT No.: PCT/KR2011/002407
§ 371 (c)(1),
(2), (4) Date: Dec. 18, 2012

(87) PCT Pub. No.: WO2011/129542
PCT Pub. Date: Oct. 20, 2011

(65) Prior Publication Data
US 2013/0088424 A1 Apr. 11, 2013

(30) Foreign Application Priority Data
Apr. 14, 2010 (KR) ........................ 10-2010-0034125

(51) Int. Cl.
*G09G 5/00* (2006.01)
*G06F 3/0487* (2013.01)
(Continued)

(52) U.S. Cl.
CPC ............. *G06F 3/0487* (2013.01); *A63F 13/21* (2014.09); *A63F 13/42* (2014.09); *G06N 3/006* (2013.01);
(Continued)

(58) Field of Classification Search
CPC ...... G06F 3/018; G06F 3/0487; G06F 3/0308; G06F 1/1626; G06F 1/1694; G06N 3/006; G06T 15/00; A63F 2300/6045
(Continued)

(56) References Cited

U.S. PATENT DOCUMENTS 8,448,153 B1 * 5/2013 Wang ........................... 717/146
2005/0094726 A1 * 5/2005 Park ................. H04N 21/23432
375/240.08
(Continued)

FOREIGN PATENT DOCUMENTS

JP 2002-229730 8/2002
JP 2003-525719 A 9/2003
(Continued)

OTHER PUBLICATIONS

International Search Report of PCT/KR2011/002407 mailed Dec. 15, 2011.
(Continued)

*Primary Examiner* — Jennifer Nguyen
(74) *Attorney, Agent, or Firm* — NSIP Law

(57) ABSTRACT

A device and method for processing virtual worlds. According to embodiments of the present disclosure, information which is measured from the real world using characteristics of a sensor is transferred to a virtual world, to thereby implement an interaction between the real world and the virtual world. The disclosed device and method for processing virtual worlds involve selectively transferring information, from among the measured information, which is different from previously measured information. The disclosed device and method for processing virtual worlds involve transferring the entire measured information in the event that the measured information is significantly different from the previously measured information and for selectively trans-
(Continued)

ferring information, from among the measured information, which is different from the measured information in the event that the difference is not significant.

17 Claims, 14 Drawing Sheets

(51) Int. Cl.
   *A63F 13/21* (2014.01)
   *A63F 13/42* (2014.01)
   *G06N 3/00* (2006.01)
   *G06T 15/00* (2011.01)

(52) U.S. Cl.
   CPC ........ *G06T 15/00* (2013.01); *A63F 2300/6045* (2013.01); *G06T 2215/16* (2013.01)

(58) Field of Classification Search
   USPC ....... 345/156–169; 463/32, 42, 7, 40, 36, 43
   See application file for complete search history.

(56) References Cited

U.S. PATENT DOCUMENTS

| | | | |
|---|---|---|---|
| 2006/0038833 A1* | 2/2006 | Mallinson et al. | 345/633 |
| 2006/0262120 A1* | 11/2006 | Rosenberg | 345/473 |
| 2008/0125224 A1 | 5/2008 | Pollatsek | |
| 2009/0005140 A1 | 1/2009 | Rose et al. | |
| 2009/0066690 A1* | 3/2009 | Harrison | 345/419 |
| 2009/0221368 A1 | 9/2009 | Yen et al. | |
| 2010/0029383 A1* | 2/2010 | Dai | 463/31 |
| 2010/0268745 A1* | 10/2010 | Choi | G11B 27/28 707/802 |

FOREIGN PATENT DOCUMENTS

| | | |
|---|---|---|
| JP | 2010-86400 A | 4/2010 |
| KR | 10-2009-0085628 A | 8/2009 |
| WO | WO 2009/146250 A1 | 12/2009 |

OTHER PUBLICATIONS

Japanese Office Action issued on Jan. 20, 2015 in counterpart Japanese Application No. JP 2013-504804 (4 pages).

Korean Office Action issued Feb. 17, 2016, in counterpart Korean Application No. 10-2010-0034125 (4 pages in English, 5 pages in Korean).

* cited by examiner

DEVICE AND METHOD FOR PROCESSING VIRTUAL WORLDS

CROSS-REFERENCE TO RELATED APPLICATIONS

This application is a U.S. National Phase application of PCT/KR2011/002407 filed Apr. 6, 2011 and claims the priority benefit of Korean Application No. 10-2010-0034125 filed Apr. 14, 2010 in the Korean Intellectual Property Office, the contents of both of which are incorporated herein by reference.

BACKGROUND

1. Field

Example embodiments relate to a method and apparatus of processing a virtual world, and more particularly, to a method and apparatus that may apply information of a real world to a virtual world.

2. Description of the Related Art

Currently, consumers are gaining an interest in experience-type games. MICROSOFT CORPORATION introduced "Project Natal" at the "E3 2009" Press Conference. "Project Natal" may provide a user body motion capturing function, a face recognition function, and a voice recognition function by combining MICROSOFT's XBOX 360 game console with a separate sensor device consisting of a depth/color camera and a microphone array, thereby enabling a user to interact with a virtual world without a dedicated controller. In addition, SONY CORPORATION introduced "Wand" which is an experience-type game motion controller. The "Wand" enables interaction with a virtual world through input of a motion trajectory of a controller by applying, to the PLAYSTATION 3 game console, a location/direction sensing technology obtained by combining a color camera, a marker, and an ultrasonic sensor.

In experience-type gaming systems, for example, the real world and the virtual world may interact in two directions. In one direction, data information obtained by a sensor in the real world may be reflected to the virtual world. In the other direction, data information obtained from the virtual world may be reflected to the real world using an actuator. Example embodiments suggest a control system, control method, and commanding structure for applying data obtained through a sensor in the real world to the virtual world, to achieve the interaction between the real world and the virtual world.

SUMMARY

Additional aspects and/or advantages will be set forth in part in the description which follows and, in part, will be apparent from the description, or may be learned by practice of the invention.

According to example embodiments, there is provided a virtual world processing apparatus, including a sensor to output information about sensor capabilities, and an encoder to output metadata of a binary format based on the output information. Here, the encoder may output the metadata of the binary format that is encoded into metadata of a first form or metadata of a second form depending on modes. The metadata of the first form may include items in the information. The metadata of the second form may include an item of which a value is different from a previous value of the item, among the items in the information.

According to other example embodiments, there is also provided a virtual world processing apparatus, including a decoder to output information based on metadata of a binary form, and a processor to generate information to be applied to a virtual world, based on the output information. Here, the decoder may output the metadata of the binary format that is decoded into metadata of a first form or metadata of a second form depending on modes. The metadata of the first form may include items in the information. The metadata of the second form may include an item of which a value is different from a previous value of the item, among the items in the information.

According to still other example embodiments, there is also provided a virtual world processing method, including outputting information about sensor capabilities, and outputting metadata of a binary format based on the output information. Here, the outputting of the metadata of the binary format may include outputting the metadata of the binary format that is encoded into metadata of a first form or metadata of a second form depending on modes. The metadata of the first form may include items in the information. The metadata of the second form may include an item of which a value is different from a previous value of the item, among the items in the information.

According to yet other example embodiments, there is also provided a virtual world processing method, including outputting information based on metadata of a binary form, and generating information to be applied to a virtual world, based on the output information. Here, the outputting of the information may include outputting the metadata of the binary format that is decoded into metadata of a first form or metadata of a second form depending on modes. The metadata of the first form may include items in the information. The metadata of the second form may include an item of which a value is different from a previous value of the item, among the items in the information.

According to yet other example embodiments, there is also provided a method for interacting between a real world and a virtual world, the method including: transferring, by a processor, information from the real world to the virtual world, the information being sensed in the real world using a sensor; and processing the transferred information, and applying the transferred information to the virtual world, thereby controlling an object of the virtual world, wherein the transferring of information comprises transferring an entirety of the information being sensed or a selective portion of the information being sensed, based on an operating mode.

Example embodiments provide a method and apparatus that may implement an interaction between a real world and a virtual world, by transferring information measured from the real world to the virtual world, using sensor capabilities corresponding to information on capabilities of a sensor.

Example embodiments provide a method and apparatus that may selectively transfer information differing from previously measured information, among the measured information.

Example embodiments provide a method and apparatus that may transfer an entirety of the measured information when the measured information is significantly different from the previously measured information, or may selectively transfer information differing from the previously measured information, among the measured information, when the measured information is scarcely different from the previously measured information.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
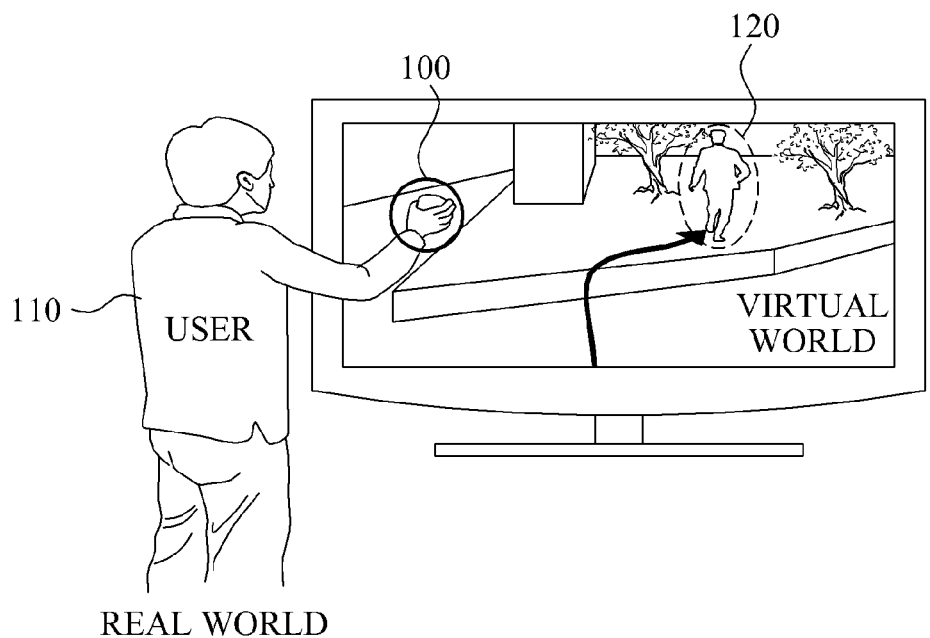
FIG. 1 illustrates an operation of manipulating an object of a virtual world using a sensor in a real world, according to example embodiments of the present disclosure.

Reference will now be made in detail to example embodiments, examples of which are illustrated in the accompanying drawings, wherein like reference numerals refer to the like elements throughout. Example embodiments are described below in order to explain example embodiments by referring to the figures.

A term 'object' used herein may include an object, a thing, an avatar, and the like, implemented and expressed in a virtual world. In addition, a term 'form' used herein may be interchangeable with a term 'type'.

Hereinafter, the example embodiments will be described with reference to the accompanying drawings.

FIG. 1 illustrates an operation of manipulating an object of a virtual world, using a sensor in the real world, according to example embodiments.

Referring to FIG. 1, a user 110 of a real world may manipulate an object 120 of the virtual world using a sensor 100 in the real world. The user 110 may input his or her motion, state, intention, shape, and the like, through the sensor 100 by performing various movements with the sensor, for example. The sensor 100 may transmit control information (CI) related to the sensed motion, state, intention, shape, and the like, of the user 110, the CI included in a sensor signal, to a virtual world processing apparatus.

Depending on embodiments, the user 110 of the real world may include humans, animals, plants, inanimate objects, such as, articles, and even surrounding environment of the user 110.

Figure 2:
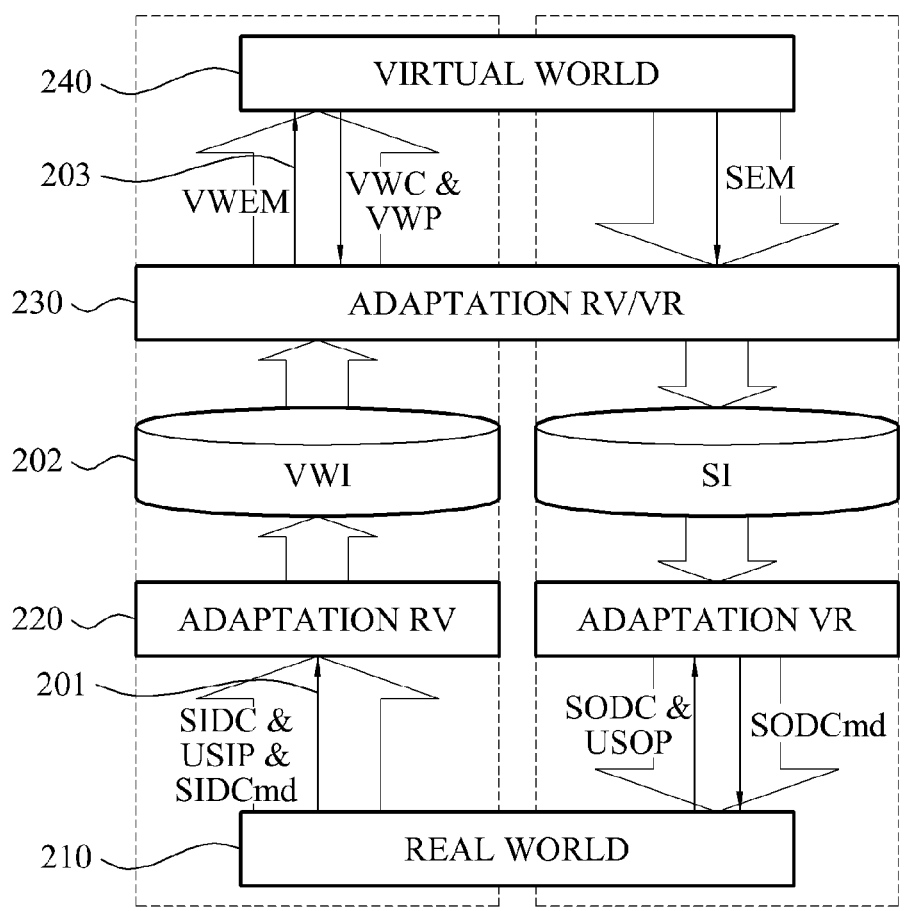
FIG. 2 illustrates a system for manipulating an object of a virtual world using a sensor in a real world, according to example embodiments.

FIG. 2 illustrates a system for manipulating an object of a virtual world using a sensor of the real world, according to example embodiments.

Referring to FIG. 2, the signal that includes CI 201 related to the motion, state, intention, shape, and the like, of a user of a real world 210 (the CI 201 input through a sensor as a real world device) may be transmitted to a virtual world processing apparatus. Depending on embodiments, the CI 201 related to the motion, state, intention, shape, and the like, of the user may include a sensor capability, a sensor adaptation preference, and sensed information that is sensed by the sensor in the real world.

The virtual world processing apparatus may include an adaptation real world to virtual world (RV) 220. The adaptation RV 220 may be implemented by an RV engine. The adaptation RV 220 may convert information of the real world 210 to information applicable to a virtual world 240, using the CI 201 related to the motion, state, intention, shape, and the like, of the user of the real world 210, the CI 201 included in the sensor signal.

Depending on embodiments, the adaptation RV 220 may convert virtual world information (VWI) 202 using the CI 201 related to the motion, state, intention, shape, and the like, of the user of the real world 210.

The VWI 202 denotes information relating to the virtual world 240. For example, the VWI 202 may include information on an object of the virtual world 240 or elements constituting the object.

The virtual world processing apparatus may transmit converted information 203 converted by the adaptation RV 220 to the virtual world 240 through adaptation real world to virtual world/virtual world to real world (RV/VR) 230.

Table 1 describes structures illustrated in FIG. 2.

TABLE 1

| Name | Description |
|---|---|
| SIDC | Sensory input device capabilities |
| | Another expression of sensor capability |
| VWI | Virtual world information |
| USIP | User sensory input preferences |
| | Another expression of sensor adaptation preference |
| SODC | Sensory output device capabilities |
| SIDCmd | Sensory input device commands |
| USOP | User sensory output preferences |
| VWC | Virtual world capabilities |
| SODCmd | Sensory output device commands |
| VWP | Virtual world preferences |
| SEM | Sensory effect metadata |
| VWEM | Virtual world effect metadata |
| SI | Sensory information |

Figure 3:
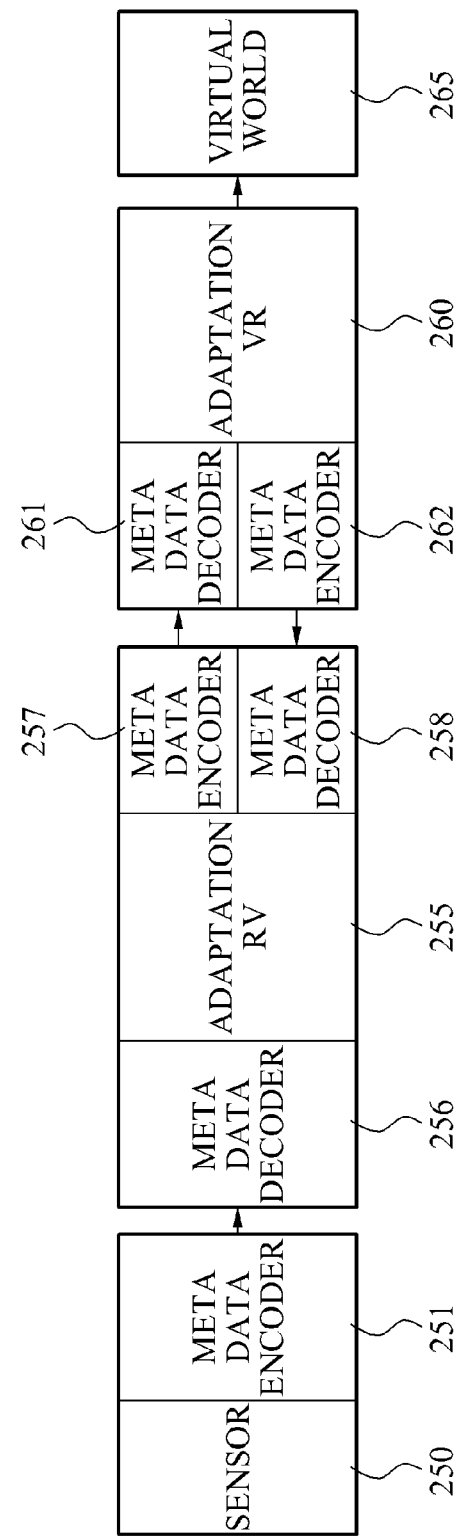
FIG. 3 illustrates a virtual world processing apparatus for manipulating an object of a virtual world using a sensor in a real world, according to other example embodiments.

FIG. 3 illustrates a virtual world processing apparatus for manipulating an object of a virtual world using a sensor in the real world, according to other example embodiments.

Referring to FIG. 3, a sensor 250 may collect information on a motion, state, intention, shape, and the like, of a user of a real world based on the user's manipulation of the sensor 250. The information collected by the sensor 250 may include sensed information sensed by the sensor.

Depending on embodiments, the sensor 250 may include an input unit. The input unit may be input with a sensor adaptation preference by the user of the real world.

The sensor 250 may include a metadata encoder 251 configured to encode the collected information of the sensor 250 into metadata.

The metadata encoder 251 may encode the collected information to first metadata. The sensor 250 may transmit the first metadata to an adaptation RV 255. A metadata decoder 256 included in the adaptation RV 255 may decode the first metadata received from the sensor 250, and then transmit the decoded first metadata to the adaptation RV 255.

Depending on embodiments, the metadata encoder 251 may include at least one of an Extensible Markup Language (XML) encoder that encodes the collected information into XML data and a binary encoder that encodes the collected information into binary data. The metadata decoder 256 may include at least one of an XML decoder that decodes received XML data and a binary decoder that decodes received binary data.

Hereinafter, encoding of the information collected by the sensor 250 and decoding of the data received by the adaptation RV 255, according to example embodiments will be described with reference to FIGS. 4 to 6.

Figure 4:
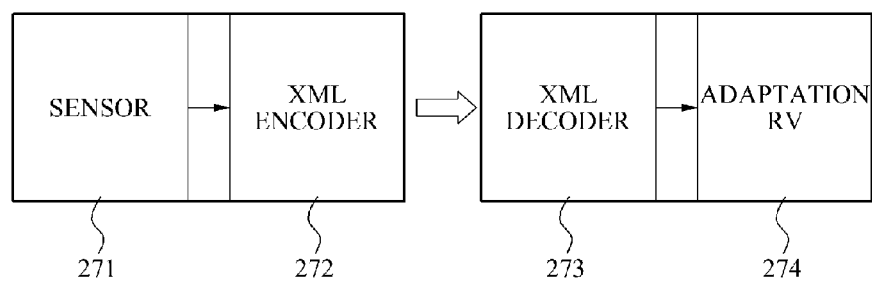
FIGS. 4 to 6 illustrate a sensor and an adaptation real world to virtual world (RV) unit, according to example embodiments.
Figure 5:
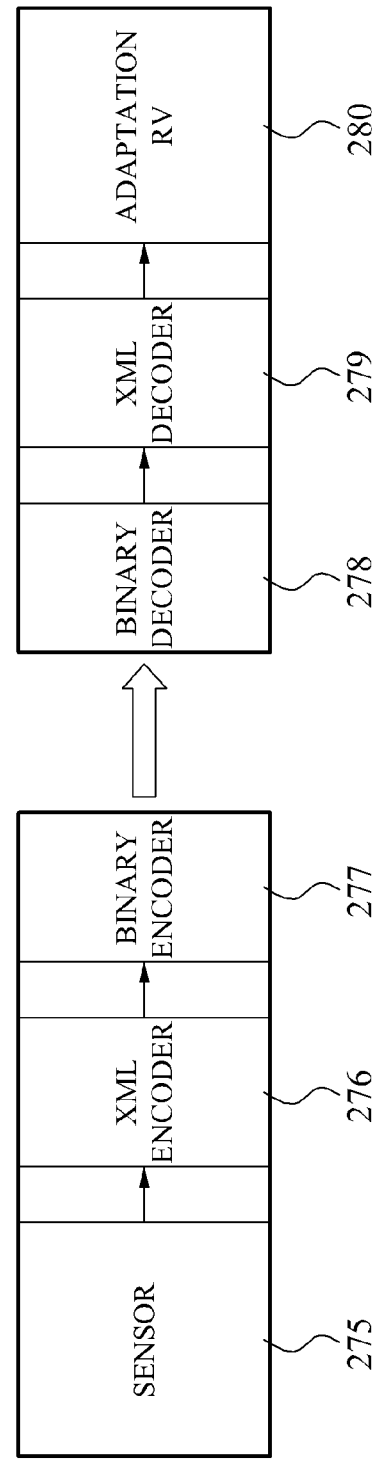
Figure 6:
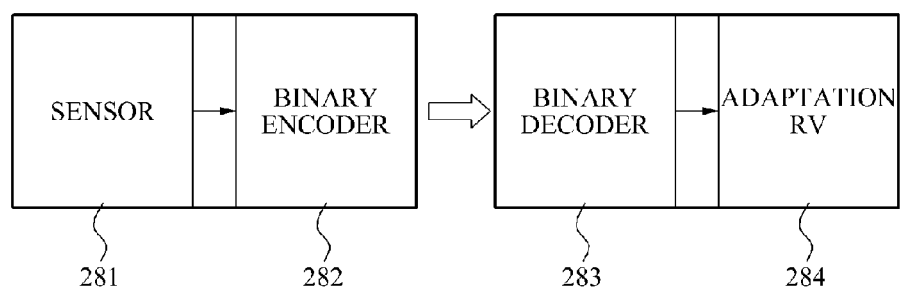

FIGS. 4 to 6 illustrate a sensor and an adaptation RV, according to example embodiments.

Referring to FIG. 4, a sensor 271 may include an XML encoder 272. The XML encoder 272 may encode information collected by the sensor 271, for example sensed information, into data of the XML format.

The sensor 271 may transmit the data encoded by the XML encoder 272 to an adaptation RV 274.

The adaptation RV 274 may include an XML decoder 273. The XML decoder 273 may decode the data received from the sensor 271.

Referring to FIG. 5, a sensor 275 according to example embodiments may include an XML encoder 276 and a binary encoder 277. The XML encoder 276 may encode information collected by the sensor 275, for example, sensed information, into data of the XML format. The binary encoder 277 may encode the data encoded by the XML encoder 276 into data of the binary form.

In addition, the sensor 275 may transmit the data encoded by the XML encoder 276 and the binary encoder 277 to an adaptation RV 280.

The adaptation RV 280 may include a binary decoder 278 and an XML decoder 279. The binary decoder 278 may decode the data received from the sensor 275 into data of the XML format. The XML decoder 279 may decode the data decoded into the XML format by the binary decoder 278.

Referring to FIG. 6, a sensor 281 according to example embodiments may include a binary encoder 282. The binary encoder 282 may encode information collected by the sensor 281, for example sensed information, into data of the binary form.

The sensor 281 may transmit the data encoded by the binary encoder 282 to an adaptation RV 284 unit.

The adaptation RV 284 unit may include a binary decoder 283. The binary decoder 283 may decode the data received from the sensor 281, e.g., sensed information encoded into the binary format.

Referring back to FIG. 3, a metadata decoder 258 included in the adaptation RV 284 may decode second metadata received from an adaptation VR 260. The second metadata or metadata of the second form may correspond to metadata generated by a metadata encoder 262 included in the adaptation VR 260, by encoding the information on a virtual world 265.

Depending on embodiments, the metadata encoder 262 may include at least one of an XML encoder that encodes the information on the virtual world 265 into metadata of the XML format and a binary encoder that encodes the information on the virtual world 265 into metadata of the binary format.

Depending on embodiments, the metadata encoder 262 may include an XML encoder. The XML encoder may encode the information on the virtual world 265 into data of the XML format.

In addition, according to other example embodiments, the metadata encoder 262 may include an XML encoder and a binary encoder. The XML encoder may encode the information on the virtual world 265 into data of the XML format. The binary encoder may encode the data of the XML format to data of the binary format.

Also, according to other example embodiments, the metadata encoder 262 may include a binary encoder. The binary encoder may encode the information on the virtual world 265 into data of the binary form.

The adaptation RV 255 may generate information to be applied to the virtual world 265, based on information decoded from the first metadata by the metadata decoder 256 and information decoded from the metadata of the second form by the metadata decoder 258. Here, the adaptation RV 255 may generate the information to be applied to the virtual world 265, such that the information corresponds to virtual world object characteristics and sensed information included in the metadata of the second form.

A metadata encoder 257 may encode the information, which is generated by the adaptation RV 255, and which is to be applied to the virtual world 265, into third metadata. In addition, the adaptation RV 255 may transmit the third metadata to the adaptation VR 260.

A metadata decoder 261 included in the adaptation VR 260 may decode the third metadata. The adaptation VR 260 may convert attributes of an object of the virtual world 265 based on the decoded information and, in addition, may apply the converted attributes to the virtual world 265.

A virtual world processing system may transmit the information on the virtual world 265 to an actuator of the real world so that the information on the virtual world 265 is reflected to the real world. Hereinafter, example embodiments in which the information on the virtual world 265 is reflected to the real world will be described in detail.

Figure 7:
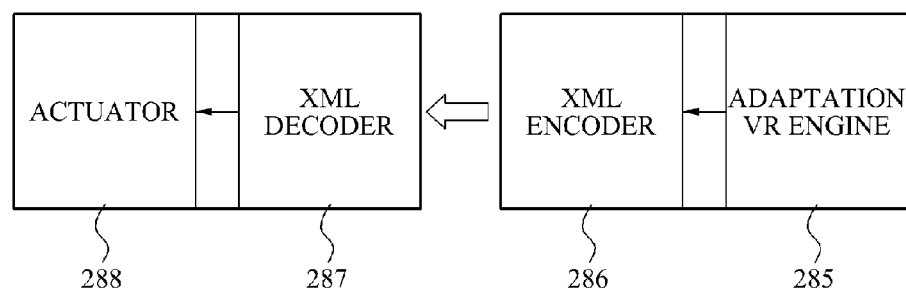
FIGS. 7 to 9 illustrate an adaptation virtual world to real world (VR) engine and an actuator, according to example embodiments.
Figure 8:
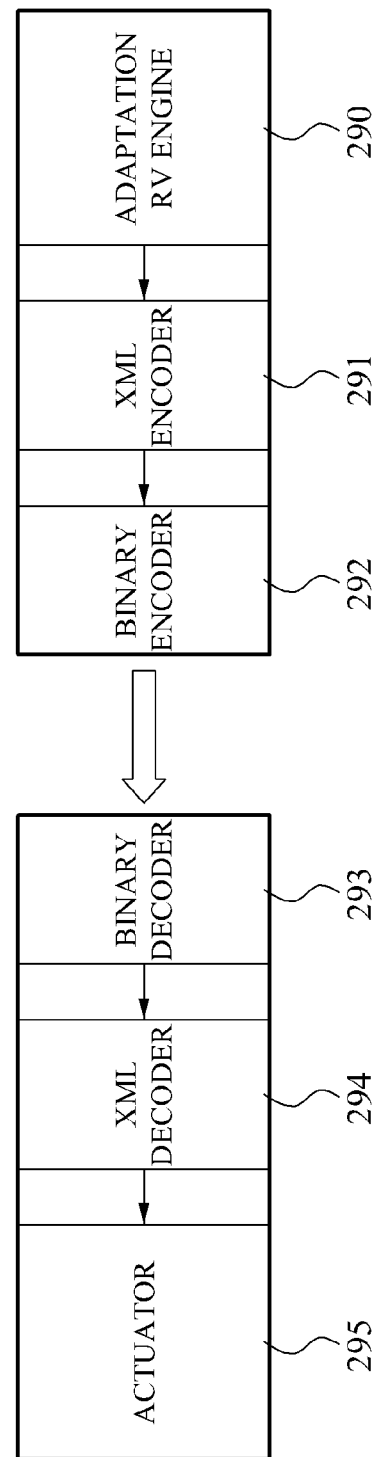
Figure 9:
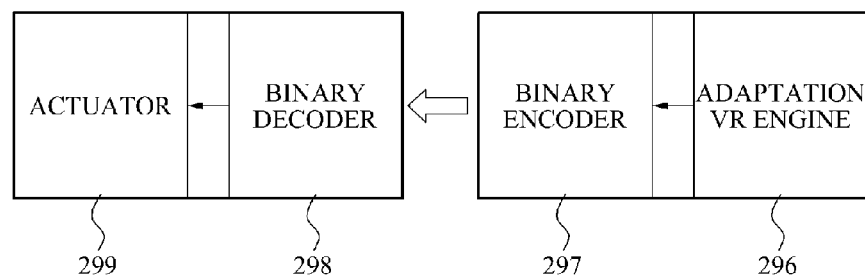

FIGS. 7 to 9 illustrate an adaptation VR engine and an actuator, according to example embodiments.

Referring to FIG. 7, an adaptation VR engine 285 may include an XML encoder 286. The adaptation VR engine 285, as an example embodiment of the adaptation RV 255 shown in FIG. 3, may transmit the information relating to the virtual world 265 to an actuator 288 of a real world so that the information on the virtual world 265 is reflected to the real world.

The adaptation VR 260 may collect information relating to a change in attributes of an object of the virtual world 265, and transmit the collected information to the adaptation VR engine 285. The adaptation VR 285 may include the XML encoder 286. The XML encoder 286 may encode the information on the virtual world 265 into data of the XML format. In addition, the adaptation VR engine 285 may transmit the data encoded by the XML encoder 286 to the actuator 288.

The actuator 288 may include an XML decoder 287. The XML decoder 287 may decode the XML data received from the adaptation VR engine 285.

Accordingly, the actuator 288 may operate based on the information decoded by the XML decoder 287.

Referring to FIG. 8, which illustrates an example embodiment, an adaptation VR engine 290 may include an XML encoder 291 and a binary encoder 292.

The adaptation VR 260 may collect information relating to a change in attributes of the object of the virtual world 265, and transmit the collected information to the adaptation VR engine 290. The adaptation VR engine 290 may include the XML encoder 291 and the binary encoder 292. The XML encoder 291 may encode the received information on the virtual world 265 into data of the XML format. The binary encoder 292 may encode the data encoded by the XML encoder 291 to data of the binary format. In addition, the adaptation VR engine 290 may transmit the data encoded by the XML encoder 292 to an actuator 295.

The actuator 295 may include a binary decoder 293 and an XML decoder 294. The binary decoder 293 may decode the binary data received from the adaptation VR engine 290 into data of the XML format. The XML decoder 294 may decode the data decoded into the XML format by the binary decoder 293.

The actuator 295 may operate based on the information decoded by the XML decoder 294.

Referring to FIG. 9, an adaptation VR engine 296 may include a binary encoder 297.

The adaptation VR 260 may collect information on a change in attributes of the object of the virtual world 265, and transmit the collected information to the adaptation VR engine 296. The adaptation VR engine 296 may include a binary encoder 297. The binary encoder 297 may encode the received information on the virtual world 265 into data of the binary form. In addition, the adaptation VR engine 296 may transmit the data encoded by the binary encoder 297 to an actuator 299.

The actuator 299 may include a binary decoder 298. The binary decoder 298 may decode the binary data received from the adaptation VR engine 296.

The actuator 299 may operate based on the information decoded by the binary decoder 298.

Figure 10:
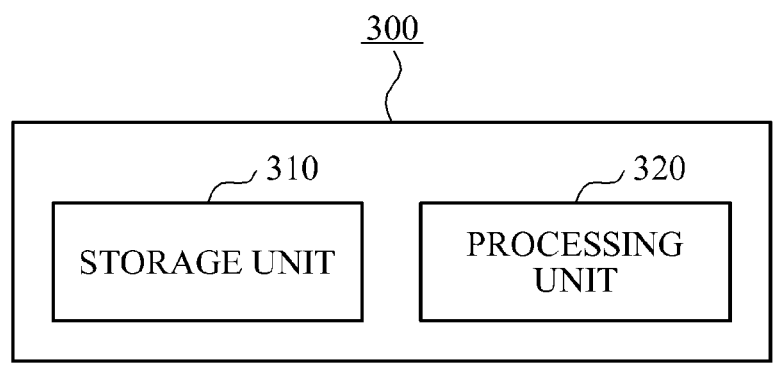
FIG. 10 illustrates a structure of a virtual world processing apparatus, according to example embodiments.

FIG. 10 is a view illustrating a structure of a virtual world processing apparatus according to example embodiments.

Referring to FIG. 10, a virtual world processing apparatus 300 includes a storage unit 310 and a processing unit 320.

The storage unit 310 stores sensor capability related to a sensor.

The sensor may measure a motion, state, intention, shape, and the like of a user of a real world. The sensor may be expressed as a sensory input device. Depending on embodiments, the sensor may be classified according to sensor types including (1) acoustic, sound, and vibration, (2) automotive and transportation, (3) chemical, (4) electric current, electric potential, magnetic, and radio, (5) environment and weather, (6) flow, (7) ionizing radiation, and subatomic particles, (8) navigation instruments, (9) position, angle, displacement, distance, speed, and acceleration, (10) optical, light, and imaging, (11) pressure, force, density, and level, (12) thermal, heat, and temperature, (13) proximity and presence, and (14) sensor technology.

Table 2 illustrates examples sensor according to the sensor types. Therefore, the sensors in Table 2 are suggested only as an embodiment but not limiting.

TABLE 2

| Sensor type | List of sensors |
| --- | --- |
| (1) Acoustic, sound, vibration | Geophone<br>Hydrophone<br>Lace sensor, a guitar pickup<br>Microphone<br>Seismometer<br>Accelerometer |
| (2) Automotive, transportation | Crank sensor<br>Curb feeler<br>Defect detector<br>Map sensor<br>Parking sensors<br>Parktronic<br>Radar gun<br>Speedometer<br>Speed sensor<br>Throttle position sensor |

TABLE 2-continued

| Sensor type | List of sensors |
| --- | --- |
| | Variable reluctance sensor<br>Wheel speed sensor |
| (3) Chemical | Breathalyzer<br>Carbon dioxide sensor<br>Carbon monoxide detector<br>Catalytic bead sensor<br>Chemical field-effect transistor<br>Electronic nose<br>Electrolyte-insulator-semiconductor sensor<br>Hydrogen sensor<br>Infrared point sensor<br>Ion-selective electrode<br>Nondispersive infrared sensor<br>Microwave chemistry sensor<br>Nitrogen oxide sensor<br>Optode<br>Oxygen sensor<br>Pellistor<br>pH glass electrode<br>Potentiometric sensor<br>Redox electrode<br>Smoke detector<br>Zinc oxide nanorod sensor |
| (4) Electric current, electric potential, magnetic, radio | Ammeter<br>Current sensor<br>Galvanometer<br>Hall effect sensor<br>Hall probe<br>Leaf electroscope<br>Magnetic anomaly detector<br>Magnetometer<br>Metal detector<br>Multimeter<br>Ohmmeter<br>Voltmeter<br>Watt-hour meter |
| (5) Environment, weather | Fish counter<br>Gas detector<br>Hygrometer<br>Pyranometer<br>Pyrgeometer<br>Rain gauge<br>Rain sensor<br>Seismometers |
| (6) Flow | Air flow meter<br>Flow sensor<br>Gas meter<br>Mass flow sensor<br>Water meter |
| (7) Ionizing radiation, subatomic particles | Bubble chamber<br>Cloud chamber<br>Geiger counter<br>Neutron detection<br>Particle detector<br>Scintillation counter<br>Scintillator<br>Wire chamber |
| (8) Navigation instruments | Air speed indicator<br>Altimeter<br>Attitude indicator<br>Fluxgate compass<br>Gyroscope<br>Inertial reference unit<br>Magnetic compass<br>MHD sensor<br>Ring laser gyroscope<br>Turn coordinator<br>Variometer<br>Vibrating structure gyroscope<br>Yaw rate sensor |
| (9) Position, angle, displacement, distance, speed, acceleration | Accelerometer<br>Inclinometer<br>Laser rangefinder<br>Linear encoder<br>Linear variable differential transformer (LVDT)<br>Liquid capacitive inclinometers<br>Odometer |

TABLE 2-continued

| Sensor type | List of sensors |
|---|---|
| | Piezoelectric accelerometer |
| | Position sensor |
| | Rotary encoder |
| | Rotary variable differential transformer |
| | Selsyn |
| | Tachometer |
| (10) Optical, light, imaging | Charge-coupled device |
| | Colorimeter |
| | Infra-red sensor |
| | LED as light sensor |
| | Nichols radiometer |
| | Fiber optic sensors |
| | Photodiode |
| | Photomultiplier tubes |
| | Phototransistor |
| | Photoelectric sensor |
| | Photoionization detector |
| | Photomultiplier |
| | Photo resistor |
| | Photoswitch |
| | Phototube |
| | Proximity sensor |
| | Scintillometer |
| | Shack-Hartmann |
| | Wavefront sensor |
| (11) Pressure, force, density, level | Anemometer |
| | Bhangmeter |
| | Barograph |
| | Barometer |
| | Hydrometer |
| | Level sensor |
| | Load cell |
| | Magnetic level gauge |
| | Oscillating U-tube |
| | Pressure sensor |
| | Piezoelectric sensor |
| | Pressure gauge |
| | Strain gauge |
| | Torque sensor |
| | Viscometer |
| (12) Thermal, heat, temperature | Bolometer |
| | Calorimeter |
| | Heat flux sensor |
| | Infrared thermometer |
| | Microbolometer |
| | Microwave radiometer |
| | Net radiometer |
| | Resistance temperature detector |
| | Resistance thermometer |
| | Thermistor |
| | Thermocouple |
| | Thermometer |
| (13) Proximity, presence | Alarm sensor |
| | Bedwetting alarm |
| | Motion detector |
| | Occupancy sensor |
| | Passive infrared sensor |
| | Reed switch |
| | Stud finder |
| | Triangulation sensor |
| | Touch switch |
| | Wired glove |
| (14) Sensor technology | Active pixel sensor |
| | Machine vision |
| | Biochip |
| | Biosensor |
| | Capacitance probe |
| | Catadioptric sensor |
| | carbon paste electrode |
| | Displacement receiver |
| | electromechanical film |
| | Electro-optical sensor |
| | Image sensor |
| | Inductive sensor |
| | Intelligent sensor |
| | Lab-on-a-chip |
| | Leaf sensor |
| | RADAR |
| | Sensor array |
| | Sensor node |
| | Soft sensor |
| | Staring array |
| | Transducer |
| | Ultrasonic sensor |
| | Video sensor |

Examples of the sensor types will be described below. The microphone belonging to a sensor type (1), i.e., acoustic, sound, and vibration, may collect voice of the user of the real world and ambient sounds of the user. The speed sensor belonging to the sensor type (2), i.e., automotive and transportation, may measure speed of the user of the real world and speed of an object such as a vehicle of the real world. The oxygen sensor belonging to the sensor type (3), i.e., chemical, may measure an oxygen ratio in ambient air around the user of the real world and an oxygen ratio in liquid around the user of the real world. The metal detector belonging to the sensor type (4), i.e., electric current, electric potential, magnetic, and radio, may detect metallic substances present in or around the user of the real world. The rain sensor belonging to the sensor type (5), i.e., environment and weather, may detect whether it is raining in the real world. The flow sensor belonging to the sensor type (6), i.e., flow, may measure a ratio of a fluid flow of the real world. The scintillator belonging to the sensor type (7), i.e., ionizing radiation and subatomic particles, may measure a ratio or radiation present in or around the user of the real world. The variometer belonging to the sensor type (8), i.e., navigation instruments, may measure a vertical movement speed of or around the user of the real world. The odometer belonging to the sensor type (9), i.e., position, angle, displacement, distance, speed, and acceleration, may measure a traveling distance of an object of the real world, such as a vehicle. The phototransistor belonging to the sensor type (10), i.e., optical, light, and imaging, may measure light of the real world. The barometer belonging to the sensor type (11), i.e., pressure, force, density, and level, may measure an atmospheric pressure of the real world. The bolometer belonging to the sensor type (12), i.e., thermal, heat, and temperature, may measure radiation rays of the real world. The motion detector belonging to the sensor type (13), i.e., proximity and presence, may measure a motion of the user of the real world. The biosensor belonging to the sensor type (14), i.e., sensor technology, may measure biological characteristics of the user of the real world.

Figure 11:
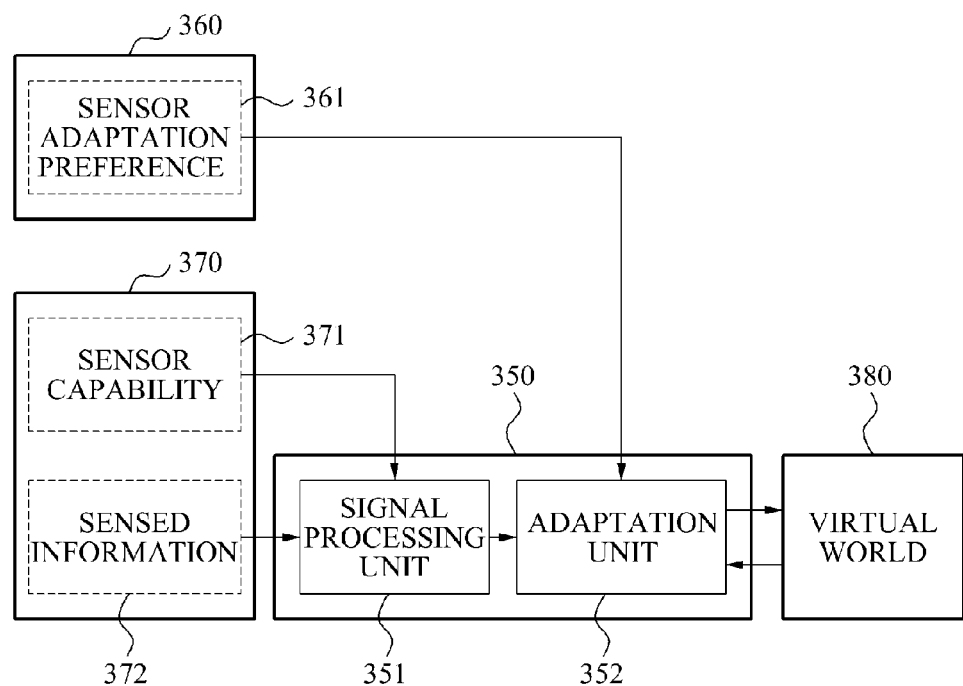
FIG. 11 illustrates a structure of a virtual world processing apparatus, according to other embodiments.

FIG. 11 illustrates a structure of a virtual world processing apparatus 350, according to other example embodiments.

Referring to FIG. 11, an input device 360 according to the present embodiments may be input with a sensor adaptation preference 361 by a user of a real world. Depending on embodiments, the input device 360 may be modularized and inserted in a sensor 370 or a virtual world processing apparatus 350. The sensor adaptation preference 361 will be described in further detail with reference to FIGS. 7 to 9.

The sensor 370 may transmit a sensor capability 371 and sensed information 372 to the virtual world processing apparatus 350.

The virtual world processing apparatus 350 may include a signal processing unit 351 and an adaptation unit 352.

The signal processing unit 351 may receive the sensor capability 371 and the sensed information 372 from the sensor 370, and perform signal-processing with respect to the sensor capability 371 and the sensed information 372. Depending on embodiments, the signal processing unit 351 may filter and validate the sensor capability 371 and the sensed information 372.

The adaptation unit 352 may receive the sensor adaptation preference 361 from the input device 360. In addition, based on the received sensor adaptation preference 361, the adaptation unit 352 may perform adaptation with respect to the information signal processed by the signal processing unit 351 so that the information is applied to a virtual world 380. In addition, the virtual world processing apparatus 350 may apply the information having undergone the adaptation by the adaptation unit 352 to the virtual world 380.

The sensor capability denotes information on capability of a sensor.

A sensor capability base type denotes a base type of the sensor capability. Depending on embodiments, the sensor capability base type may be a base abstract type of the metadata related to a sensor capability that is commonly applied to all types of sensors, as part of metadata types related to the sensor capability.

During the transfer of information between a virtual world and a real world, when current information to be transferred at a predetermined point in time is narrowly different from past information that is previously transferred, only a portion of the current information which differs from the past information may be transferred. Conversely, when the current information is significantly different from the past information, the entire current information may be transferred. The foregoing may be performed to reduce a total amount of information to be transferred between the virtual world and the real world, thereby increasing efficiency.

For example, when a user wears a motion sensor, information on the motion sensor may be transmitted wirelessly. In this instance, unless the user moves, current information on the motion sensor may be narrowly different from past information on the motion sensor. In this instance, when all the current information on the motion sensor is transmitted, all information related to the motion sensor, for every frame, may be transmitted. However, when an update scheme, that is, a scheme of transferring only a different portion between the current information and the past information, is employed, other information apart from a time stamp, among commands related to the motion sensor may not be transferred since the motion sensor does not move. That is, information related to position, orientation, velocity, angular velocity, acceleration, and angular acceleration, for every frame, may not be transmitted. Accordingly, a wireless communication transmission load may be reduced considerably.

In the foregoing embodiments, the binary encoder 277 of FIG. 5, the binary encoder 282 of FIG. 6, the binary encoder 292 of FIG. 8, and the binary encoder 297 of FIG. 9 may transfer information between a virtual world and a real world to the binary decoder 278 of FIG. 5, the binary decoder 283 of FIG. 6, the binary decoder 293 of FIG. 8, and the binary decoder 298 of FIG. 9, respectively.

Each of the binary encoder 277, the binary encoder 282, the binary encoder 292, and the binary encoder 297 may operate in one of a normal mode and an update mode.

In the normal mode, each of the binary encoder 277, the binary encoder 282, the binary encoder 292, and the binary encoder 297 may encode and output all received information, regardless of a difference between previously transmitted information.

In an example embodiment, each of the binary encoder 277, the binary encoder 282, the binary encoder 292, and the binary encoder 297 may output metadata of the binary format that is encoded into first metadata or metadata of a first form, when an operating mode is the normal mode. For example, the first metadata may include items in information or data.

In the update mode, each of the binary encoder 277, the binary encoder 282, the binary encoder 292, and the binary encoder 297 may encode and output only a portion of information that is currently received, which differs from information that was previously received.

In an example embodiment, each of the binary encoder 277, the binary encoder 282, the binary encoder 292, and the binary encoder 297 may output metadata of the binary format that is encoded into second metadata or metadata of a second form, when an operating mode is the update mode. For example, the second metadata ay include an item of which a value is different from a previous value of the item, among the items in information or data.

In addition, in the update mode, each of the binary encoder 277, the binary encoder 282, the binary encoder 292, and the binary encoder 297 may compare the information that is currently received to past information that is previously received. When the currently-received information is significantly different from the past information, each of the binary encoder 277, the binary encoder 282, the binary encoder 292, and the binary encoder 297 may encode and output the entire currently-received information. Conversely, when the current information is narrowly different from the past information received, each of the binary encoder 277, the binary encoder 282, the binary encoder 292, and the binary encoder 297 may encode and output the portion of the current information, which differs from the past information.

Each of the binary decoder 278, the binary decoder 283, the binary decoder 293, and the binary decoder 298 may operate in one of the normal mode and the update mode, as well.

In the normal mode, the binary decoder 278, the binary decoder 283, the binary decoder 293, and the binary decoder 298 may receive all information from the binary encoder 277, the binary encoder 282, the binary encoder 292, and the binary encoder 297, respectively. Accordingly, each of the binary decoder 278, the binary decoder 283, the binary decoder 293, and the binary decoder 298 may decode and output all of the received information, regardless of a difference between previously received information.

In an example embodiment, each of the binary decoder 278, the binary decoder 283, the binary decoder 293, and the binary decoder 298 may output metadata of the binary format that is decoded into first metadata or metadata of a first form, when an operating mode is the normal mode. For example, the first metadata may include items in information or data.

In the update mode, the binary decoder 278, the binary decoder 283, the binary decoder 293, and the binary decoder 298 may receive only a portion of the information currently received which differs from past information, from the binary encoder 277, the binary encoder 282, the binary encoder 292, and the binary encoder 297, respectively. In this instance, each of the binary decoder 278, the binary decoder 283, the binary decoder 293, and the binary decoder 298 may decode and output the received portion of the information. In this instance, another part of the system having received the information according to example embodiment may perform necessary functions, using remaining information from the previously received information.

In an example embodiment, each of the binary decoder 278, the binary decoder 283, the binary decoder 293, and the binary decoder 298 may output metadata of the binary format that is decoded into second metadata or metadata of a second form, when an operating mode is the update mode. For example, the second metadata ay include an item of which a value is different from a previous value of the item, among the items in information or data.

In addition, each of the binary decoder 278, the binary decoder 283, the binary decoder 293, and the binary decoder 298 may decode the received portion of the information, and may output the information by incorporating the remaining information from the previously received information into the received portion of the information. In this instance, another part of the system having received the information according to example embodiments may operate transparently with respect to a difference in the information transmitted in the normal mode and the update mode.

Further, as described above, since each of the binary encoder 277, the binary encoder 282, the binary encoder 292, and the binary encoder 297 may output the entire current information in the update mode as well, each of the binary decoder 278, the binary decoder 283, the binary decoder 293, and the binary decoder 298 may also decode and output the entire currently-received information in the update mode, e.g., when the currently received information is significantly different from previously received information.

Figure 12:
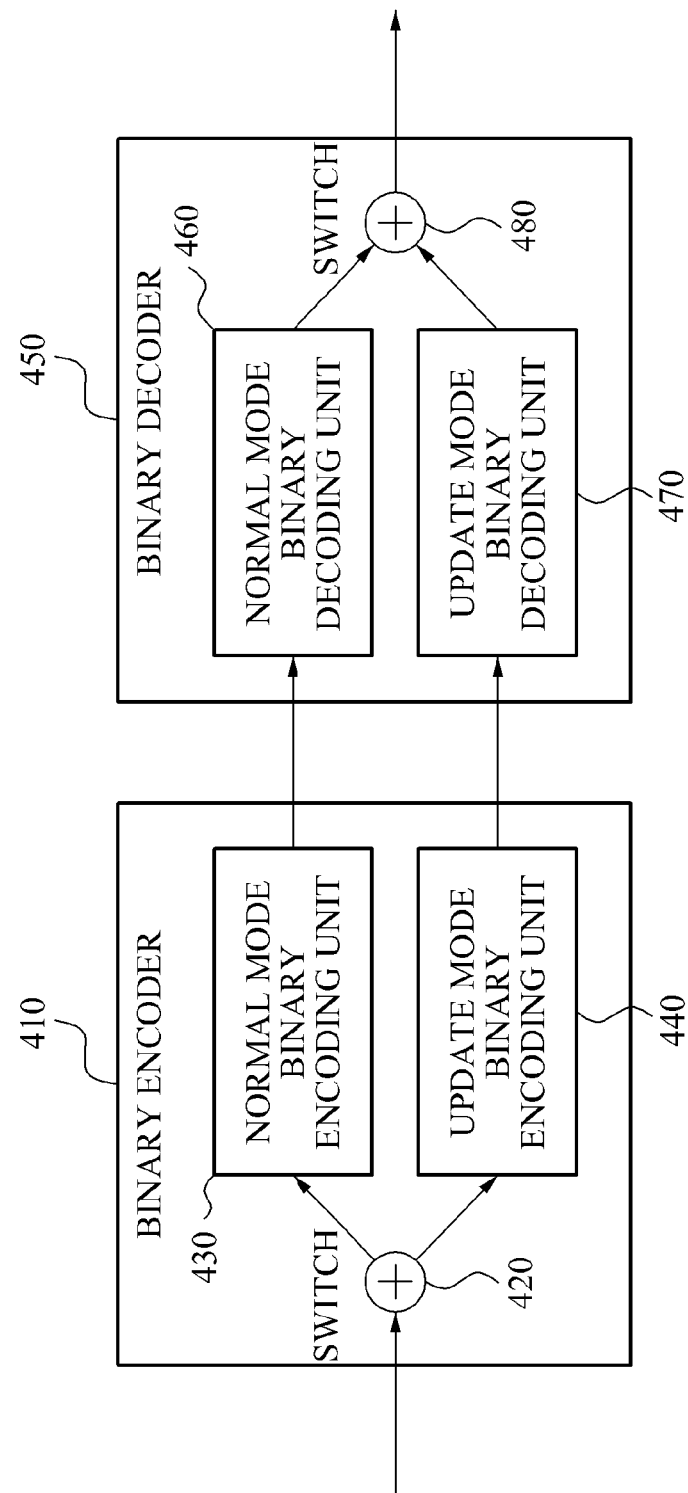
FIG. 12 illustrates structures of a binary encoder and a binary decoder supporting a normal mode and an update mode, according to example embodiments.

FIG. 12 is a view illustrating structures of a binary encoder 410 and a binary decoder 450 supporting a normal mode and an update mode, according to example embodiments.

A binary encoder 410 may include a switch 420, a normal mode binary encoding unit 430, and an update mode binary encoding unit 440.

The switch 420 may include a plurality of output ports. One of the plurality of output ports may be connected to an input of the normal mode binary encoding unit 430, and another of the plurality of output ports may be connected to an input of the update mode binary encoding unit 440. The switch 420 may transmit information input into the binary encoder 410, by switching to the normal mode binary encoding unit 430 or the update mode binary encoding unit 440 depending on a current operating mode.

The normal mode binary encoding unit 430 may perform the operation of each of the binary encoder 277 of FIG. 5, the binary encoder 282 of FIG. 6, the binary encoder 292 of FIG. 8, and the binary encoder 297 of FIG. 9 in the normal mode. That is, the normal mode binary encoding unit 430 may output the input information encoded in the normal mode. The update mode binary encoding unit 440 may perform the operation of each of the binary encoder 277, the binary encoder 282, the binary encoder 292, and the binary encoder 297 in the update mode. That is, the update mode binary encoding unit 440 may output the input information encoded in the update mode.

A binary decoder 450 may include a normal mode binary decoding unit 460, an update mode binary decoding unit 470, and a switch 480.

The normal mode binary decoding unit 460 may perform operations of each of the binary decoder 278 of FIG. 5, the binary decoder 283 of FIG. 6, the binary decoder 293 of FIG. 8, and the binary decoder 298 of FIG. 9 in the normal mode. That is, the normal mode binary decoding unit 460 may output the information input from the normal mode binary encoding unit 430 and decoded in the normal mode, e.g., all of the received information. The update mode binary decoding unit may perform the operations of each of the binary decoder 278, the binary decoder 283, the binary decoder 293, and the binary decoder 298 in the update mode. That is, the update node binary decoding unit 470 may output the input information input from the update mode binary encoding unit 440 and decoded in the update mode.

The switch 480 may include a plurality of input ports. One of the plurality of input ports may be connected to an output of the normal node binary decoding unit 460, and another of the plurality of input ports may be connected to an output of the update mode binary decoding unit 470. The switch 480 may switch to one of the output of the normal mode binary decoding unit 460 and the output of the update mode binary decoding unit 470 depending on a current operating mode.

Figure 13:
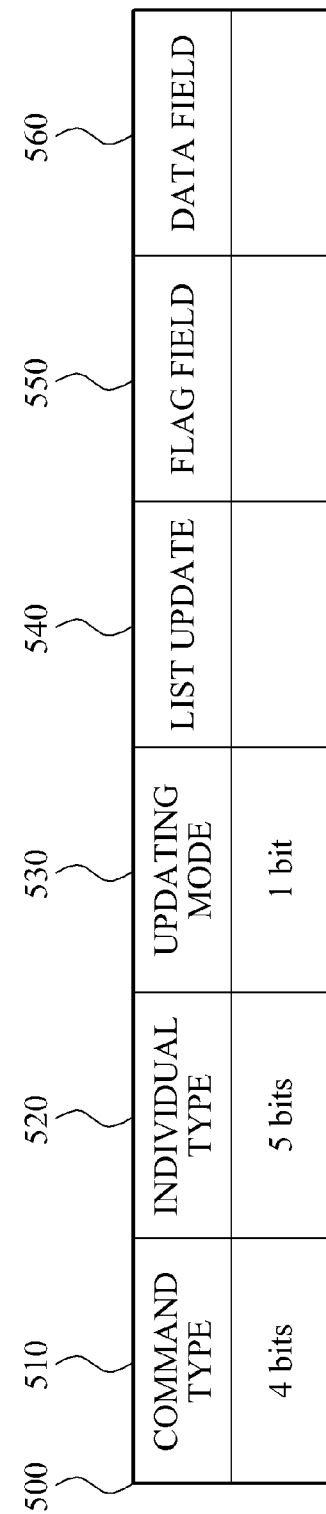
FIG. 13 illustrates a structure of information metadata to be transmitted from a binary encoder to a binary decoder, according to example embodiments.

FIG. 13 illustrates a structure of information metadata 500 to be transmitted from the binary encoder 277 of FIG. 5, the binary encoder 282 of FIG. 6, the binary encoder 292 of FIG. 8, the binary encoder 297 of FIG. 9, and the binary encoder 410 of FIG. 12 to the binary decoder 278 of FIG. 5, the binary decoder 283 of FIG. 6, the binary decoder 293 of FIG. 8, the binary decoder 298 of FIG. 9, and the binary decoder 450 of FIG. 12, respectively, according to example embodiments. The metadata 500 may correspond to sensor update metadata indicating an update of information collected by a sensor. The metadata 500 may correspond to sensory update metadata indicating an update of information collected by an apparatus.

The metadata 500 may include a command type 510, an individual type 520, an updating mode 530, a list update 540, a flag field 550, and a data field 560.

The command type 510 denotes a type of the metadata 500. The command type 510 may have a fixed length, for example, a 4-bit length.

The individual type 520 denotes a type of an individual device and a type of a sensor. The individual type 520 may have a fixed length, for example, a 5-bit length.

The updating mode 530 denotes modes of the binary encoder 277, the binary encoder 282, the binary encoder 292, the binary encoder 297, and the binary encoder 410, and modes of the binary decoder 278, the binary decoder 283, the binary decoder 293, the binary decoder 298, and the binary decoder 450. That is, depending on a value of the updating mode 530, the modes of the binary encoder 277, the binary encoder 282, the binary encoder 292, the binary encoder 297, and the binary encoder 410, and mode of the binary decoder 278, the binary decoder 283, the binary decoder 293, the binary decoder 298, and the binary decoder 450 may be changed. Since the mode corresponds to a normal mode or an update mode, the two different modes may be distinguished using 1-bit information.

The updating mode 530 may be included as a portion of the command type 510. That is, when the command type 510 has a predetermined value, embodiments may be configured so that the command type 510 may act as the updating mode 530, or embodiments may be configured so that a predetermined bit of the command type 510 may act as a bit of the updating mode 530.

The flag field 550 denotes flag fields to be included in the metadata 500.

The data field 560 denotes data fields to be included in the metadata 500.

Data may be mandatory or optional. In a case of optional data, whether the data is included in metadata is to be indicated. A flag may indicate whether predetermined data is included in metadata. For example, when a value of a flag A corresponds to "1," data B corresponding to the flag A may be included in metadata C. When the value of the flag A corresponds to "0," the data B corresponding to the flag A may not be included in the metadata C.

The foregoing may be represented using a binary representation syntax, as shown in Code 1.

[Code 1]

```
C {
    A
    if (A) {
        B
    }
}
```

A plurality of data may correspond to the single flag A. For example, when the data B and data C correspond to the flag A of the metadata C, a binary representation syntax may be provided as shown in Code 2.

[Code 2]

```
C {
    A
    if (A) {
        B
        C
    }
}
```

The data B corresponding to the single flag A may include a subfield. The subfield of the data B may also include another subfield.

For example, when the data B corresponds to the flag A of the metadata C, the data B includes a flag D as a subfield, and the flag D corresponds to data E, a binary representation syntax may be provided as shown in Code 3.

[Code 3]

```
C {
    A
    if (A) {
        B
    }
}
B {
    D
    if (D) {
        E
    }
}
```

In this example, A and D are to be "1" so that the optional data E may be present.

A plurality of flags having an identical name or a plurality of data having an identical name may be present in the metadata 500. In this instance, the plurality of flags or the plurality of data may be present as an array, e.g., an index for specifying an element may be used in the array. In addition, initialization and addition/subtraction operations may be applied to the index.

Code 4 denotes metadata D including a flag array A, data B corresponding to A[0], and data C corresponding to A[1].

[Code 4]

```
D {
    A
    if (A[0]) {
        B
    }
    if (A[1]) {
        C
    }
}
```

Code 4 may be represented using a variable E for indexing, as shown in Code 5.

[Code 5]

```
D {
    A
    E = 0
    if (A[E]) {
        B
        E++
    }
    if (A[E]) {
        C
    }
}
```

In Code 5, E is primarily initialized to a value of "0," and increased by "1" in order to indicate an index 1.

A first normal mode according to example embodiments will be described herein.

A transmission side may transmit metadata including all flags and all mandatory data corresponding to the flags. In a case of optional data, only when a value of a flag corresponding to the optional data corresponds to "1," may the optional data be included in the metadata and transmitted. A reception side may extract all flags and all mandatory data from received metadata. In a case of optional data, the reception side may verify a value of a flag corresponding to the optional data. Only when the value of the flag corresponding to the optional data corresponds to "1," may the reception side extract the optional data. A relative priority of a flag, mandatory data, and optional data may be predetermined.

A second normal node according to example embodiments will be described herein.

The transmission side may transmit metadata including all flags, all mandatory data, and all optional data.

Optional data which, in actuality, is nonexistent in view of a value of a corresponding flag may be transmitted while being given a fixed value or a predetermined value. The reception side may identify and discard nonexistent data among all the optional data.

A first update mode according to example embodiments will be described herein.

The transmission side may determine a number of bits of the list update 540.

The number of bits may correspond to a sum of a number of all flags and a number of all data. For example, when three flags and four data are provided, the list update 540 may be configured with 7 bits. Each bit may correspond to the flag or data. In this example, when a flag or data is to be included in metadata at all times, a bit corresponding to the flag or data may be excluded.

When a value of a flag is changed from a previous value, the transmission side may include the flag in the flag field 550 of the metadata 500, and set a value of a bit corresponding to the flag and included in the list update 540 to "1." When the value of the flag is identical to the previous value, the value of the bit corresponding to the flag and included in the list update 540 may be set to "0." When a value of mandatory data is changed from a previous value, the transmission side may include the mandatory data in the data field 560 of the metadata 500, and may set a value of a bit corresponding to the mandatory data and included in the list update 540 to be "1." When the value of the mandatory data is identical to the previous value, the value of the bit corresponding to the flag and included in the list update 540 may be set to "0." In addition, when optional data is present, that is, a value of a flag corresponding to the optional data is "1," and a value of the optional data is changed from a previous value, the transmission side may include the optional data in the data field 560, and may set a value of a bit corresponding to the optional data and included in the list update 540 to be "1." When the value of the optional data is identical to the previous value, the value of the bit corresponding to the optional data and included in the list update 540 may be set to "0."

The transmission side may transmit, to the reception side, the metadata 500 configured by the aforementioned manner.

The reception side may verify whether a value of a bit included in the list update 540, and corresponding to a flag or data, corresponds to "1." When the value of the bit corresponds to "1," the reception side may extract the flag or the data from the flag field 550 or the data field 560 since a value of the flag or a value of the data has been changed. Here, when the data corresponds to optional data, the reception side may verify whether a value of a bit included in the list update 540, and corresponding to the optional data, corresponds to "1." When the value of the bit corresponds to "1," the reception side may verify whether a value of a flag corresponding to the optional data corresponds to "1." When the value of the flag corresponds to "1," the reception side may extract the optional data from the data field 560.

By the process described above, the reception side may distinguish a flag or data of which a value is changed, and may output the value of the flag or data through a combination of the changed value and a previous value of the flag or data.

In this instance, a flag or data, for example, a time stamp, which is to be included in metadata at all times since a value of the flag or data is changed constantly or frequently, may be extracted from the flag field 550 or the data field 560 at all times, without occupying a bit of the list update 540. The flag or data which is to be included in the metadata at all times may occupy a bit of the list update 540, and the transmission side or the reception side may ignore a value of the bit occupied by the flag or data, and regard the flag or data as being included in the flag field 550 or the data field 560 at all times.

A second update mode according to example embodiments will be described herein.

The second update mode is based on a premise that current values of flags correspond to previous values of the flags. That is, when a flag, among the flags, has a value different from a previous value of the flag, a mode may be changed to the normal mode, and the transmission side and the reception side may operate in the normal mode. Optional data to be included in the metadata 500 may be determined at a point in time of entering an update mode from the normal mode.

A flag and mandatory data may be included in the flag field 550 and the data field 560, respectively. Here, the flag may be included in the flag field 550 in order to indicate whether optional data corresponding to the flag is included. However, as described above, since a value of the flag may continuously correspond to a previous value of the flag in the update mode, that is, the value of the flag may remain unchanged, the flag may not occupy a bit of the list update 540. Since a value of the mandatory data may be changed, the mandatory data may occupy a bit of the list update 540. Among optional data, data for which a value of a flag relating to the data corresponds to "1" may occupy a bit of the list update 540 in order to indicate whether a value of the optional data is changed. A number of the bits may correspond to a sum of a number of mandatory data and a number of flags having a value of "1" at the point in time of entering the update mode.

The transmission side may include the flag in the flag field 550. The transmission side may include, in the data field 560, mandatory data of which a value is changed, among the mandatory data, and may set a value of a bit corresponding to the mandatory data and included in the list update 540 to "1." Among the mandatory data, mandatory data of which a value remains unchanged may not be included in the data field 560, and a value of a bit corresponding to the mandatory data and included in the list update 540 may be set to "0."

The transmission side may include, in the data field 560, optional data of which a value is changed, among optional data for which a value of a corresponding flag corresponds to "1," and may set a value of a bit that corresponds to the optional data and is included in the list update 540 to "1." Among the optional data for which the value of the corresponding flag corresponds to "1," optional data of which a value remains unchanged may not be included in the data field 560, and a value of a bit corresponding to the optional data and included in the list update 540 may be set to "0."

The reception side may extract values of flags from the flag field 550 of the metadata 500. Based on the values of the flags extracted, the reception side may identify data occupying a bit of the list update 540. In addition, the reception side may identify mandatory data of which a value is changed, based on a value of a bit of the list update 540. The reception side may identify optional data of which a value is changed, based on the value of the bit of the list update 540 and the values of the flags extracted.

By the process described above, the reception side may distinguish a flag or data of which a value is changed, and may output the value of the flag or data through a combination of the changed value and a previous value of the flag or data.

Figure 14:
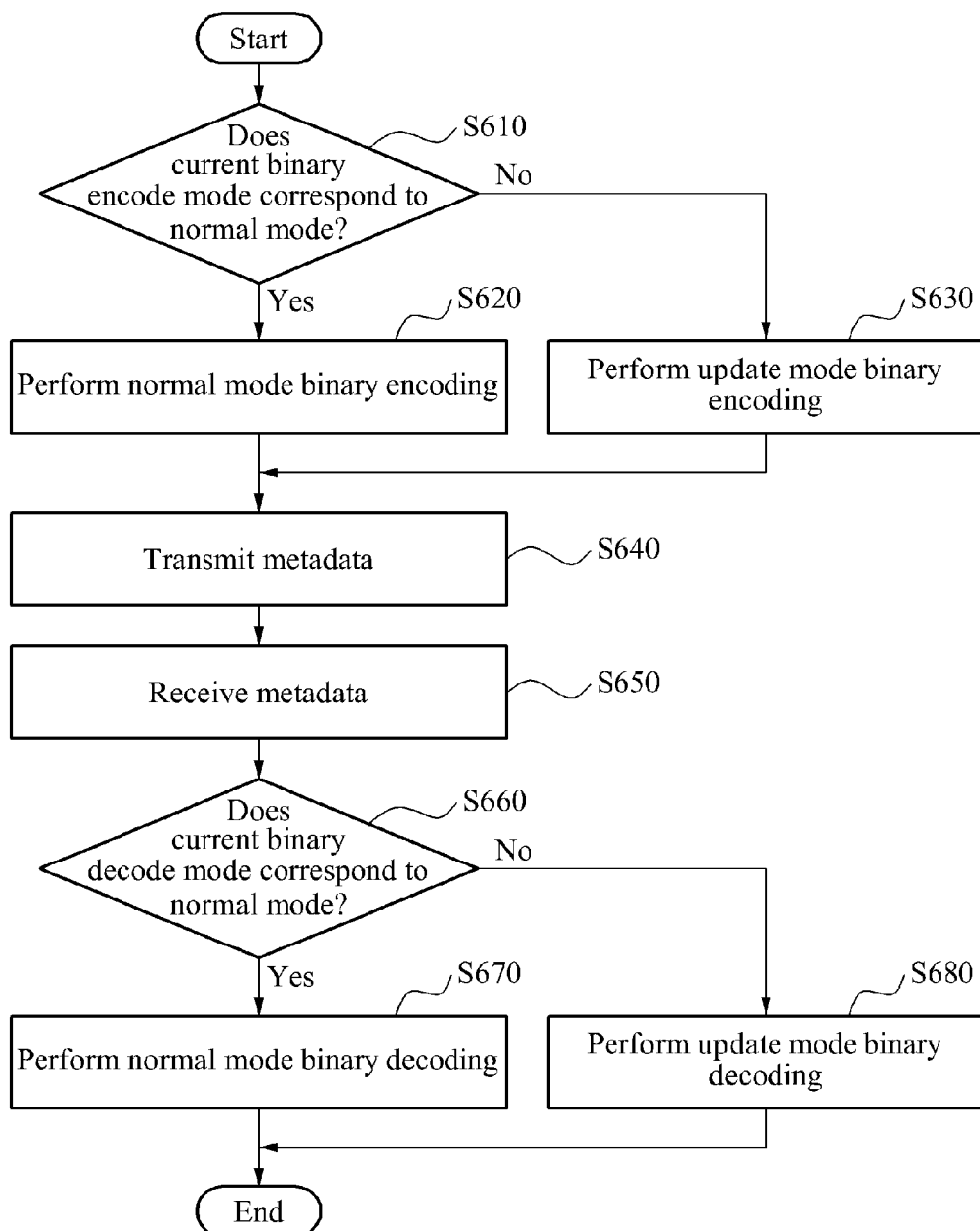
FIG. 14 illustrates a method of processing a virtual world, according to example embodiments.

FIG. 14 is a flowchart illustrating a method of processing a virtual world, according to example embodiments.

In operation S610, a transmission side may determine whether a current binary encode mode corresponds to a normal mode, in order to perform binary encoding. When the current binary encode mode corresponds to the normal mode, the transmission side may perform normal mode binary encoding, in operation S620. When the current binary encode mode corresponds to an update mode, the transmission side may perform update mode binary encoding, in operation S630. In operation S640, the transmission side may transmit metadata, a result of the encoding, to a reception side.

In operation S650, the reception side may receive the metadata. In operation S660, the reception side may determine whether binary decoding is to be performed in the normal mode. The determination may be performed based on contents of the received metadata. When the binary decoding is to be performed in the normal mode, the reception side may perform normal mode binary decoding, in operation S670. When the binary decoding is to be performed in the update mode, the reception side may perform binary decoding with respect to the update mode, in operation S680. Here, a result of the decoding may be output at the reception side.

Depending on embodiments, the transmission side may include an apparatus for processing a virtual world, including the binary encoder 277 of FIG. 5, the binary encoder 282 of FIG. 6, the binary encoder 292 of FIG. 8, the binary encoder 297 of FIG. 9, and/or the binary encoder 410 of FIG. 12. The reception side may include an apparatus for processing a virtual world, including the binary decoder 278 of FIG. 5, the binary decoder 283 of FIG. 6, the binary decoder 293 of FIG. 8, the binary decoder 298 of FIG. 9, and/or the binary decoder 450 of FIG. 12.

An exemplary structure of metadata used in the present disclosure will be described hereinafter. The structure may be described using an XML representation syntax and a binary representation syntax. Entries in the XML representation syntax and the binary representation syntax may be described in descriptor components semantics.

Table 3 shows term information and binary representations of the command type 510 of FIG. 13.

TABLE 3

| Term information | Binary representation (4 bits) |
|---|---|
| Sensory Information | 0000 |
| Device Command | 0001 |
| Sensory Device Capability | 0010 |
| User Sensory Preference | 0011 |
| Virtual World Object Characteristics | 0100 |
| Sensed Information | 0101 |
| Sensor Capability | 0110 |
| Reserved | 0111-1111 |

The command type 510 may indicate information to be transmitted, that is, information indicated by metadata. For example, the sensory information denotes information relating to an effect event implemented in a sensory device of a real world. The device command denotes information relating to a command to control an operation of the sensory device of the real world. The sensory device capabilities denote information on capabilities of the sensory device. The user sensory preference denotes information on sensory preferences of a user. The virtual world object characteristics denote characteristics of an object in a virtual world. The sensed information denotes information on the real world sensed by a sensor. The sensor capability denotes information on a capability of the sensor.

As described above, a portion of the binary representation listed as Reserved in Table 3 may be used for indicating a mode. That is, example embodiments may be configured, such that the mode is determined when the command type 510 has a predetermined value between 0111 and 1111.

Table 4 lists devices indicated by the individual type 520 of FIG. 13 when the command type 510 corresponds to the device command, the sensor capability, or the sensory preferences of the user. The following is an example, and thus, the present disclosure is not limited thereto.

TABLE 4

| Term of Device | Binary representation for device type (5 bits) |
|---|---|
| Light device | 00000 |
| Flash device | 00001 |
| Heating device | 00010 |
| Cooling device | 00011 |
| Wind device | 00100 |
| Vibration device | 00101 |
| Sprayer device | 00110 |
| Fog device | 00111 |
| Color correction device | 01000 |
| Initialize color correction parameter device | 01001 |
| Rigid body motion device | 01010 |
| Tactile device | 01011 |
| Kinesthetic device | 01100 |
| Reserved | 01101-11111 |

Table 5 lists devices indicated by the individual type 520 when the command type 510 corresponds to the sensed information, or a sensor capability. The following is an example, and thus, the present disclosure is not limited thereto.

TABLE 5

| Term of Sensor | Binary representation for sensor type (5 bits) |
|---|---|
| Light sensor | 00000 |
| Ambient noise sensor | 00001 |
| Temperature sensor | 00010 |
| Humidity sensor | 00011 |
| Distance sensor | 00100 |
| Atmospheric sensor | 00101 |
| Position sensor | 00110 |
| Velocity sensor | 00111 |
| Acceleration sensor | 01000 |
| Orientation sensor | 01001 |
| Angular velocity sensor | 01010 |
| Angular acceleration sensor | 01011 |
| Force sensor | 01100 |
| Torque sensor | 01101 |
| Pressure sensor | 01110 |
| Motion sensor | 01111 |
| Intelligent camera sensor | 10000 |
| Reserved | 10001-11111 |

Table 6 lists a binary representation of the updating mode 530 of FIG. 13, Table 7 shows the binary representation syntax of the updating mode 530. The following is an example, and thus, the present disclosure is not limited thereto.

TABLE 6

| | Binary representation for mode type |
|---|---|
| Normal Mode | 0 |
| Update Mode | 1 |

TABLE 7

| UpdatingType{ | Number of bits | Mnemonic |
|---|---|---|
| Update | 1 | bslbf |
| if(Update){ | | |
|     UpdateMode | | UpdateModeType |
| } else { | | |
|     NormalMode | | NormalModeType |
| } | | |
| } | | |

In Table 7, the 'if' statement indicates that an update mode is to be set when a value of Update corresponds to "1," and a normal mode is to be set when the value of Update does not correspond to "1."

Metadata for an individual device in the normal mode will be described herein.

Table 8, Table 9, and Table 10 show an XML representation syntax, binary representation syntax, and descriptor components semantics of a device command base type, respectively. The following is an example, and thus, the present disclosure is not limited thereto.

TABLE 8

```
<!-- ##################################################### -->
<!-- Device command base type                              -->
<!-- ##################################################### -->
<complexType name="DeviceCommandBaseType" abstract="true">
    <sequence>
        <element name="TimeStamp"
            type="mpegvct:TimeStampType"/>
    </sequence>
    <attributeGroup ref="iidl:DeviceCmdBaseAttributes"/>
</complexType>
```

An XML representation in Table 8 and other tables used herein is specified in a schema of <schema xmlns="http://www.w3.org/2001/XMLSchema" xmlns:mpeg7="urn:mpeg:mpeg7:schema:2004" xmlns:iidl="urn:mpeg:mpeg-v:2010:01-IIDL-NS" targetNamespace="urn:mpeg:mpeg-v:2010:01-IIDL-NS" elementFormDefault="qualified" attributeFormDefault="unqualified" version="ISO/IEC 23005-x" id="MPEG-V-IIDL.xsd">.

TABLE 9

| DeviceCommandBaseType{ | Number of bits | Mnemonic |
|---|---|---|
| TimeStamp | | TimeStampType |
| DeviceCmdBaseAttributes | | DeviceCmdBaseAttributesType |
| } | | |
| TimeStampType{ | | |
| TimeStampSelect | 2 | bslbf |
| If(TimeStampSelect==00){ | | |
| AbsoluteTimeStamp | | AbsoluteTimeStampType |
| } else if (TimeStampSelect==01){ | | |
| ClockTickTimeStamp | | ClockTickTimeStampType |
| } else if (TimeStampSelect==10){ | | |
| ClockTickTimeDeltaStamp | | ClockTickTimeDeltaStampType |
| } | | |
| } | | |

In Table 9, DeviceCommandBaseType has TimeStamp and DeviceCmdBaseAttributes data, and TimeStampType has ClockTickTimeStamp or ClockTickTimeDeltaStamp data, based on a value of TimeStampSelect.

In the mnemonic of FIG. 9, bslbf refers to 'bit string left bit first', where "left" is the order in which bits are written in ISO/IEC 15938-3. Unicode transformation format-8 (UTF-8) refers to a variable length letter encoding method for Unicode, and is defined in ISO 10646/IETF RFC 2279. UTF-8 may use 1 to 4 bytes to express one Unicode character. In addition, vluimsbf5 refers to 'variable length unsigned integer most significant bit first', consisting of two parts. The first part defines the number n of 4-bit bit fields used for the value representation, encoded by a sequence of n−1 "1" bits, followed by a "0" bit signaling the end of the sequence. The second part contains the value of the integer encoded using the number of bit fields specified in the first part. uimbsf refers to 'unsigned integer, most significant bit first'. fsbf refer to 'Float (32 bit), sign bit first'. The semantics of the bits within a float are specified in the IEEE Standard for Binary Floating Point Arithmetic (ANSI/IEEE Std 754-1985).

TABLE 10

| Names | Description |
|---|---|
| TimeStamp | Provides the timing information for the device command to be executed. As defined in Part 6 of ISO/IEC 23005, there is a choice of selection among three timing schemes, which are absolute time, clock tick time, and delta of clock tick time |
| DeviceCommandBase | Provides the topmost type of the base type hierarchy which each individual device command can inherit. |
| TimeStampType | This field, which is only present in the binary representation, describes which time stamp scheme shall be used. "00" means that the absolute time stamp type shall be used, "01" means that the clock tick time stamp type shall be used, and "10" means that the clock tick time delta stamp type shall be used. |
| AbsoluteTimeStamp | The absolute time stamp is defined in A.2.3 of ISO/IEC 23005-6. |
| ClockTickTimeStamp | The clock tick time stamp is defined in. A.2.3 of ISO/IEC 23005-6. |
| ClockTickTimeDeltaStamp | The clock tick time delta stamp, which value is the time delta between the present and the past time, is defined in A.2.3 of ISO/IEC 23005-6. |
| DeviceCmdBaseAttributes | Describes a group of attributes for the commands. |

Table 11, Table 12, and Table 13 show an XML representation syntax, binary representation syntax, and descriptor components semantics of device command base attributes, respectively. The following is an example, and thus, the present disclosure is not limited thereto.

TABLE 11

```
<!-- ##################################################### -->
<!-- Definition of Device Command Base Attributes          -->
<!-- ##################################################### -->
<attributeGroup name="DeviceCmdBaseAttributes">
    <attribute name="id" type="ID" use="optional">
    <attribute name="deviceIdRef" type="anyURI" use="optional"/>
    <attribute name="activate" type="boolean" use="optional"
        default="true"/>
</attributeGroup>
```

TABLE 12

| DeviceCmdBaseAttributesType{ | Number of bits | Mnemonic |
|---|---|---|
| idFlag | 1 | bslbf |
| deviceIdRefFlag | 1 | bslbf |
| activateFlag | 1 | bslbf |
| If(idFlag) { | | |
|   id | See ISO 10646 | UTF-8 |
| } | | |
| if(deviceIdRefFlag) { | | |
|   deviceIdRefLength | | vluimsbf5 |
|   deviceIdRef | 8* deviceIdRefLength | bslbf |
| } | | |
| If(activateFlag) { | | |
|   activate | 1 | bslbf |
| } | | |
| } | | |

In Table 12, DeviceCmdBaseAttributesType has idFlag, deviceIdRef Flag, and activateFlag. When a value of the idFlag corresponds to "1," DeviceCmdBaseAttributesType may have id. When a value of the deviceIdRef Flag corresponds to "1," DeviceCmdBaseAttributesType may have deviceIdRef Length data and deviceIdRef data. When a value of the activateFlag corresponds to "1," DeviceCmdBaseAttributesType may have activate data.

TABLE 13

| Names | Description |
|---|---|
| DeviceCmdBaseAttributesType | Provides the topmost type of the base type hierarchy which the attributes of each individual device command can inherit. |
| idFlag | This field, which is only present in the binary representation, signals the presence of the id attribute. A value of "1" means the attribute shall be used and "0" means the attribute shall not be used. |
| deviceIdRefFlag | This field, which is only present in the binary representation, signals the presence of the sensor ID reference attribute. A value of "1" means the attribute shall be used and "0" means the attribute shall not be used. |
| activateFlag | This field, which is only present in the binary representation, signals the presence of the activation attribute. A value of "1" means the attribute shall be used and "0" means the attribute shall not be used. |
| id | id to identify the sensed information with respect to a light sensor. |
| deviceIdRefLength | This field, which is only present in the binary representation, specifies the length of the following deviceIdRef attribute. |
| deviceIdRef | References a device that has generated the command included in this specific device command. |
| activate | Describes whether the device is activated. A value of "1" means the sensor is activated and "0" means the sensor is deactivated. |

A device command vocabulary will be described herein. That is, example configurations of respective device commands, according to example embodiments, will be provided.

Table 14, Table 15, and Table 16 show an example of XML representation syntax, binary representation syntax, and descriptor components semantics of a color correction type, respectively. The following is an example, and thus, the present disclosure is not limited thereto.

TABLE 14

```
<!-- ############################################## -->
<!-- Definition of DCV Color Correction Type      -->
<!-- ############################################## -->
<complexType name="ColorCorrectionType">
    <complexContent>
        <extension base="iidl:DeviceCommandBaseType">
            <sequence minOccurs="0" maxOccurs="unbounded">
                <element name="SpatialLocator" type="mpeg7:RegionLocatorType"/>
            </sequence>
        </extension>
    </complexContent>
</complexType>
```

TABLE 15

| ColorCorrectionType{ | Number of bits | Mnemonic |
|---|---|---|
| intensityFlag | 1 | bslbf |
| DeviceCommandBase | | DeviceCommandBaseType |
| LoopSpatialLocator | | vluimsbf5 |
| for(k=0;k< LoopSpatialLocator;k++){ | | |
|   SpatialLocator[k] | | mpeg?:RegionLocatorType |
| } | | |
| if(intensityFlag) { | | |
|   intensity | 7 | uimsbf |
| } | | |
| } | | |

In Table 15, ColorCorrectionType has SpatialLocator[i] (0≤i<k) corresponding to k, a value of LoopSpatialLocator.

TABLE 16

| Names | Description |
| --- | --- |
| ColorCorrectionType | Tool for commanding a display device to perform color correction. |
| intensityFlag | This field, which is only present in the binary representation, signals the presence of device command attribute. A value of "1" means the attribute shall be used and "0" means the attribute shall not be used. |
| DeviceCommandBase | Provides the topmost type of the base type hierarchy which each individual device command can inherit. |
| LoopSpatialLocator | This field, which is only present in the binary representation, specifies the number of SpatialLocator contained in the description. |
| SpatialLocator | Describes the spatial localization of the still region using SpatialLocatorType (optional), which indicates the regions in a video segment where the color correction effect is applied. The SpatialLocatorType is defined in ISO/IEC 15938-5. |
| intensity | Describes the command value of the light device with respect to the default unit if the unit is not defined. Otherwise, use the unit type defined in the sensor capability. |

Table 17, Table 18, and Table 19 show an example of XML representation syntax, binary representation syntax, and descriptor components semantics of a rigid body motion type, respectively. The following is an example, and thus, the present disclosure is not limited thereto.

TABLE 17

```
<!-- ################################################## -->
<!-- Definition of Rigid Body Motion Type              -->
<!-- ################################################## -->
<complexType name="RigidBodyMotionType">
    <complexContent>
        <extension base="iidl:DeviceCommandBaseType">
            <sequence>
                <element name="MoveToward" type="dcv:MoveTowardType" minOccurs="0"/>
                <element name="Incline" type="dcv:InclineType" minOccurs="0"/>
            </sequence>
            <attribute name="duration" type="float"/>
        </extension>
    </complexContent>
</complexType>
<complexType name="MoveTowardType">
    <attribute name="directionX" type="float"/>
    <attribute name="directionY" type="float"/>
    <attribute name="directionZ" type="float"/>
    <attribute name="speedX" type="float"/>
    <attribute name="speedY" type="float"/>
    <attribute name="speedZ" type="float"/>
    <attribute name="accelerationX" type="float"/>
    <attribute name="accelerationY" type="float"/>
    <attribute name="accelerationZ" type="float"/>
</complexType>
<complexType name="InclineType">
    <attribute name="PitchAngle" type="mpegvct:InclineAngleType" use="optional"/>
    <attribute name="YawAngle" type="mpegvct:InclineAngleType" use="optional"/>
    <attribute name="RollAngle" type="mpegvct:InclineAngleType" use="optional"/>
    <attribute name="PitchSpeed" type="float" use="optional"/>
    <attribute name="YawSpeed" type="float" use="optional"/>
    <attribute name="RollSpeed" type="float" use="optional"/>
    <attribute name="PitchAcceleration" type="float" use="optional"/>
    <attribute name="YawAcceleration" type="float" use="optional"/>
    <attribute name="RollAcceleration" type="float" use="optional"/>
</complexType>
```

TABLE 18

| RigidBodyMotionType{ | Number of bits | Mnemonic |
| --- | --- | --- |
| MoveTowardFlag | 1 | bslbf |
| InclineFlag | 1 | bslbf |
| durationFlag | 1 | bslbf |
| DeviceCommandBase | | DeviceCommandBaseType |
| if( MoveTowardFlag ) { | | |
|    MoveToward | | MoveTowardTypes |

TABLE 18-continued

| RigidBodyMotionType{ | Number of bits | Mnemonic |
|---|---|---|
| } | | |
| if( InclineFlag ) { | | |
|   Incline | | InclineType |
| } | | |
| if(durationFlag) { | | |
|   duration | 32 | fsbf |
| } | | |
| } | | |
| MoveTowardType{ | | |
|   directionXFlag | 1 | bslbf |
|   directionYFlag | 1 | bslbf |
|   directionZFlag | 1 | bslbf |
|   speedXFlag | 1 | bslbf |
|   speedYFlag | 1 | bslbf |
|   speedZFlag | 1 | bslbf |
|   accelerationXFlag | 1 | bslbf |
|   accelerationYFlag | 1 | bslbf |
|   accelerationZFlag | 1 | bslbf |
|   if( directionXFlag){ | | |
|     directionX | 32 | fsbf |
|   } | | |
|   if( directionYFlag){ | | |
|     directionY | 32 | fsbf |
|   } | | |
|   if( directionZFlag){ | | |
|     directionZ | 32 | fsbf |
|   } | | |
|   if(speedXFlag){ | | |
|     speedX | 32 | fsbf |
|   } | | |
|   if(speedYFlag){ | | |
|     speedY | 32 | fsbf |
|   } | | |
|   if(speedZFlag){ | | |
|     speedZ | 32 | fsbf |
|   } | | |
|   if(accelerationXFlag){ | | |
|     accelerationX | 32 | fsbf |
|   } | | |
|   if(accelerationYFlag){ | | |
|     accelerationY | 32 | fsbf |
|   } | | |
|   if(accelerationZFlag){ | | |
|     accelerationZ | 32 | fsbf |
|   } | | |
| } | | |
| InclineType{ | | |
|   PitchAngleFlag | 1 | bslbf |
|   YawAngleFlag | 1 | bslbf |
|   RollAngleFlag | 1 | bslbf |
|   PitchSpeedFlag | 1 | bslbf |
|   YawSpeedFlag | 1 | bslbf |
|   RollSpeedFlag | 1 | bslbf |
|   PitchAccelerationFlag | 1 | bslbf |
|   YawAccelerationFlag | 1 | bslbf |
|   RollAccelerationFlag | 1 | bslbf |
|   if(PitchAngleFlag){ | | |
|     PitchAngle | | InclineAngleType |
|   } | | |
|   if(YawAngleFlag){ | | |
|     YawAngle | | InclineAngleType |
|   } | | |
|   if(RollAngleFlag){ | | |
|     RollAngle | | InclineAngleType |
|   } | | |
|   if(PitchSpeedFlag){ | | |
|     PitchSpeed | 32 | fsbf |
|   } | | |
|   if(YawSpeedFlag){ | | |
|     YawSpeed | 32 | fsbf |
|   } | | |
|   if(RollSpeedFlag){ | | |
|     RollSpeed | 32 | fsbf |
|   } | | |
|   if(PitchAccelerationFlag){ | | |
|     PitchAcceleration | 32 | fsbf |
|   } | | |
|   if(YawAccelerationFlag){ | | |
|     YawAcceleration | 32 | fsbf |
|   } | | |
|   if(RollAccelerationFlag){ | | |
|     RollAcceleration | 32 | fsbf |
|   } | | |
| } | | |

TABLE 19

| Names | Description |
|---|---|
| RigidBodyMotionType | Tool for describing a rigid body motion device command. |
| MoveTowardFlag | This field, which is only present in the binary representation, signals the presence of device command attribute. A value of "1" means the attribute shall be used and "0" means the attribute shall not be used. |
| InclineFlag | This field, which is only present in the binary representation, signals the presence of device command attribute. A value of "1" means the attribute shall be used and "0" means the attribute shall not be used. |
| durationFlag | This field, which is only present in the binary representation, signals the presence of device command attribute. A value of "1" means the attribute shall be used and "0" means the attribute shall not be used. |
| DeviceCommandBase | Provides the topmost type of the base type hierarchy which each individual device command can inherit. |
| MoveToward | Describes the destination axis values of move toward effect. The type is defined by dcv:MoveTowardType. |
| Incline | Describes the rotation angle of incline effect. The type is defined by dcv:InclineType. |
| Duration | Describes time period during which the rigid body object should continuously move. The object which reaches the destination described by the description of RigidBodyMotionType should stay at the destination until it receives another command with activates = "false". |
| MoveTowardType | Tool for describing MoveToward commands for each axis |
| directionXFlag | This field, which is only present in the binary representation, signals the presence of device command attribute. A value of "1" means the attribute shall be used and "0" means the attribute shall not be used. |

TABLE 19-continued

| Names | Description |
|---|---|
| directionYFlag | This field, which is only present in the binary representation, signals the presence of device command attribute. A value of "1" means the attribute shall be used and "0" means the attribute shall not be used. |
| directionZFlag | This field, which is only present in the binary representation, signals the presence of device command attribute. A value of "1" means the attribute shall be used and "0" means the attribute shall not be used. |
| speedXFlag | This field, which is only present in the binary representation, signals the presence of device command attribute. A value of "1" means the attribute shall be used and "0" means the attribute shall not be used. |
| speedYFlag | This field, which is only present in the binary representation, signals the presence of device command attribute. A value of "1" means the attribute shall be used and "0" means the attribute shall not be used. |
| speedZFlag | This field, which is only present in the binary representation, signals the presence of device command attribute. A value of "1" means the attribute shall be used and "0" means the attribute shall not be used. |
| accelerationXFlag | This field, which is only present in the binary representation, signals the presence of device command attribute. A value of "1" means the attribute shall be used and "0" means the attribute shall not be used. |
| accelerationYFlag | This field, which is only present in the binary representation, signals the presence of device command attribute. A value of "1" means the attribute shall be used and "0" means the attribute shall not be used. |
| accelerationZFlag | This field, which is only present in the binary representation, signals the presence of device command attribute. A value of "1" means the attribute shall be used and "0" means the attribute shall not be used. |
| directionX | Describes the position command on x-axis in terms of centimeter with respect to the current position. |
| directionY | Describes the position command on y-axis in terms of centimeter with respect to the current position. |
| directionZ | Describes the position command on z-axis in terms of centimeter with respect to the current position. |
| speedX | Describes the desired speed of the rigid body object on the x-axis in terms of percentage with respect to the maximum speed of the specific device which also be described in the device capability as defined in Part 2 of ISO/IEC 23005. |
| SpeedY | Describes the desired speed of the rigid body object on the y-axis in terms of percentage with respect to the maximum speed of the specific device which also be described in the device capability as defined in Part 2 of ISO/IEC 23005. |
| speedZ | Describes the desired speed of the rigid body object on the z-axis in terms of percentage with respect to the maximum speed of the specific device which also be described in the device capability as defined in Part 2 of ISO/IEC 23005. |
| accelerationX | Describes the desired acceleration of the rigid body object on the x-axis in terms of percentage with respect to the maximum acceleration of the specific device which may be described in the device capability as defined in Part 2 of ISO/IEC 23005. |
| accelerationY | Describes the desired acceleration of the rigid body object on the y-axis in terms of percentage with respect to the maximum acceleration of the specific device which may be described in the device capability as defined in Part 2 of ISO/IEC 23005. |
| accelerationZ | Describes the desired acceleration of the rigid body object on the z-axis in terms of percentage with respect to the maximum acceleration of the specific device which may be described in the device capability as defined in Part 2 of ISO/IEC 23005. |
| InclineType | Tool for describing Incline commands for each axis. attribute shall be used and "0" means the attribute shall not be used. |
| accelerationXFlag | This field, which is only present in the binary representation, signals the presence of device command attribute. A value of "1" means the attribute shall be used and "0" means the attribute shall not be used. |
| accelerationYFlag | This field, which is only present in the binary representation, signals the presence of device command attribute. A value of "1" means the attribute shall be used and "0" means the attribute shall not be used. |
| accelerationZFlag | This field, which is only present in the binary representation, signals the presence of device command attribute. A value of "1" means the attribute shall be used and "0" means the attribute shall not be used. |
| directionX | Describes the position command on x-axis in terms of centimeter with respect to the current position. |
| directionY | Describes the position command on y-axis in terms of centimeter with respect to the current position. |
| directionZ | Describes the position command on z-axis in terms of centimeter with respect to the current position. |
| speedX | Describes the desired speed of the rigid body object on the x-axis in terms of percentage with respect to the maximum speed of the specific device which also be described in the device capability as defined in Part 2 of ISO/IEC 23005. |
| speedY | Describes the desired speed of the rigid body object on the y-axis in terms of percentage with respect to the maximum speed of the |

TABLE 19-continued

| Names | Description |
|---|---|
| | specific device which also be described in the device capability as defined in Part 2 of ISO/IEC 23005. |
| speedZ | Describes the desired speed of the rigid body object on the z-axis in terms of percentage with respect to the maximum speed of the specific device which also be described in the device capability as defined in Part 2 of ISO/IEC 23005. |
| accelerationX | Describes the desired acceleration of the rigid body object on the x-axis in terms of percentage with respect to the maximum acceleration of the specific device which may be described in the device capability as defined in Part 2 of ISO/IEC 23005. |
| accelerationY- | Describes the desired acceleration of the rigid body object on the y-axis in terms of percentage with respect to the maximum acceleration of the specific device which may be described in the device capability as defined in Part 2 of ISO/IEC 23005. |
| accelerationZ- | Describes the desired acceleration of the rigid body object on the z-axis in terms of percentage with respect to the maximum acceleration of the specific device which may be described in the device capability as defined in Part 2 of ISO/IEC 23005. |
| InclineType | Tool for describing Incline commands for each axis. |
| PitchAngleFlag | This field, which is only present in the binary representation, signals the presence of device command attribute. A value of "1" means the attribute shall be used and "0" means the attribute shall not be used. |
| YawAngleFlag | This field, which is only present in the binary representation, signals the presence of device command attribute. A value of "1" means the attribute shall be used and "0" means the attribute shall not be used. |
| RollAngleFlag | This field, which is only present in the binary representation, signals the presence of device command attribute. A value of "1" means the attribute shall be used and "0" means the attribute shall not be used. |
| PitchSpeedFlag | This field, which is only present in the binary representation, signals the presence of device command attribute. A value of "1" means the attribute shall be used and "0" means the attribute shall not be used. |
| YawSpeedFlag | This field, which is only present in the binary representation, signals the presence of device command attribute. A value of "1" means the attribute shall be used and "0" means the attribute shall not be used. |
| RollSpeedFlag | This field, which is only present in the binary representation, signals the presence of device command attribute. A value of "1" means the attribute shall be used and "0" means the attribute shall not be used. |
| PitchAccelerationFlag | This field, which is only present in the binary representation, signals the presence of device command attribute. A value of "1" means the attribute shall be used and "0" means the attribute shall not be used. |
| YawAccelerationFlag | This field, which is only present in the binary representation, signals the presence of device command attribute. A value of "1" means the attribute shall be used and "0" means the attribute shall not be used. |
| RollAccelerationFlag | This field, which is only present in the binary representation, signals the presence of device command attribute. A value of "1" means the attribute shall be used and "0" means the attribute shall not be used. |
| PitchAngle | Describes the angle to rotate in y-axis, $\Theta$(pitch) in degrees between −180 and 180. |
| YawAngle | Describes the angle to rotate in z-axis, $\Psi$(yaw) in degrees between −180 and 180. |
| RollAngle | Describes the angle to rotate in x-axis, o (roll) in degrees between −180 and 180. |
| PitchSpeed | Describes the desired speed (command) of rotation for pitch in terms of percentage with respect to the maximum angular speed of the specific device which may be described in the device capability as defined in Part 2 of ISO/IEC 23005. |
| YawSpeed | Describes the desired speed (command) of rotation for yaw in terms of percentage with respect to the maximum angular speed of the specific device which may be described in the device capability as defined in Part 2 of ISO/IEC 23005. |
| RollSpeed | Describes the desired speed (command) of rotation for roll in terms of percentage with respect to the maximum angular speed of the specific device which may be described in the device capability as defined in Part 2 of ISO/IEC 23005. |
| PitchAcceleration | Describes the desired acceleration (command) of rotation for pitch in terms of percentage with respect to the maximum angular acceleration of the specific device which may be described in the device capability as defined in Part 2 of ISO/IEC 23005. |
| YawAcceleration | Describes the desired acceleration (command) of rotation for yaw in terms of percentage with respect to the maximum angular acceleration of the specific device which may be described in the device capability as defined in Part 2 of ISO/IEC 23005. |
| RollAcceleration | Describes the desired acceleration (command) of rotation for roll in terms of percentage with respect to the maximum angular acceleration of the specific device which may be described in the device capability as defined in Part 2 of ISO/IEC 23005. |

TABLE 19-continued

| Names | Description |
|---|---|
| FirstFlag | This field, which is only present in the binary representation, signals the presence of device command attribute. A value of "1" means the attribute shall be used and "0" means the attribute shall not be used. |
| MoveTowardMask | This field, which is only present in the binary syntax, specifies a bit-field that indicates whether a MoveToward is assigned to the corresponding partition. |
| NumOfModify | This field, which is only present in the binary representation, specifies the number of modified elements contained in the description. |
| InclineMask | This field, which is only present in the binary syntax, specifies a bit-field that indicates whether an Incline is assigned to the corresponding partition. |

Table 20, Table 21, and Table 22 show an example of XML representation syntax, binary representation syntax, and descriptor components semantics of a tactile type, respectively. The following is an example, and thus, the present disclosure is not limited thereto.

TABLE 20

```
<!-- ################################################## -->
<!-- Definition of DCV Tactile Type                      -->
<!-- ################################################## -->
<complexType name="TactileType">
    <complexContent>
        <extension base="iidl:DeviceCommandBaseType">
            <sequence>
                <element name="array_intensity" type="mpeg7:FloatMatrixType"/>
            </sequence>
        </extension>
    </complexContent>
</complexType>
```

TABLE 21

| TactileType{ | Number of bits | Mnemonic |
|---|---|---|
| DeviceCommandBase |  | DeviceCommandBaseType |
| dimX | 16 | uimsbf |
| dimY | 16 | uimsbf |
| array_intensity | dimX * dimY * 32 | fsbf |
| } | | |

TABLE 22

| Names | Description |
|---|---|
| TactileType | Tool for describing array-type tactile device command. A tactile device is composed of an array of actuators. |
| DeviceCommandBase | Provides the topmost type of the base type hierarchy which each individual device command can inherit. |
| dimX | This field, which is only present in the binary representation, specifies the x-direction size of ArrayIntensity. |
| dimY | This field, which is only present in the binary representation, specifies the y-direction size of ArrayIntensity. |
| array_intensity | Describes the intensities of array actuators in percentage with respect to the maximum intensity described in the device capability. If the intensity is not specified, this command shall be interpreted as turning on at the maximum intensity. |

Table 23, Table 24, and Table 25 show an example of XML representation syntax, binary representation syntax, and descriptor components semantics of a kinesthetic type, respectively. The following is an example, and thus, the present disclosure is not limited thereto.

TABLE 23

```
<!-- ################################################## -->
<!-- Definition of DCV Kinesthetic Type                  -->
<!-- ################################################## -->
<complexType name="KinestheticType">
    <complexContent>
        <extension base="iidl:DeviceCommandBaseType">
            <sequence>
                <element name="Position" type="mpegvct:Float3DVectorType" minOccurs="0"/>
                <element name="Orientation" type="mpegvct:Float3DVectorType" minOccurs="0"/>
                <element name="Force" type="mpegvct:Float3DVectorType" minOccurs="0"/>
                <element name="Torque" type="mpegvct:Float3DVectorType" minOccurs="0"/>
            </sequence>
        </extension>
    </complexContent>
</complexType>
```

TABLE 24

| KinesthestheticType{ | Number of bits | Mnemonic |
|---|---|---|
| PositionFlag | 1 | bslbf |
| OrientationFlag | 1 | bslbf |
| ForceFlag | 1 | bslbf |
| TorqueFlag | 1 | bslbf |
| DeviceCommandBase |  | DeviceCommandBaseType |
| if(PositionFlag){ | | |
| Position | | Float3DVectorType |
| } | | |
| if(OrientationFlag){ | | |
| Orientation | | Float3DVectorType |
| } | | |
| if(ForceFlag){ | | |
| Force | | Float3DVectorType |
| } | | |
| if(TorqueFlag){ | | |
| Torque | | Float3DVectorType |
| } | | |
| } | | |
| Float3DVectorType { | | |
| X | 32 | fsbf |
| Y | 32 | fsbf |
| Z | 32 | fsbf |
| } | | |

TABLE 25

| Names | Description |
|---|---|
| KinesthestheticType | Describes a command for a kinesthetic device. |
| PositionFlag | This field, which is only present in the binary representation, signals the presence of device command attribute. A value of "1" means the attribute shall be used and "0" means the attribute shall not be used. |
| OrientationFlag | This field, which is only present in the binary representation, signals the presence of device command attribute. A value of "1" means the attribute shall be used and "0" means the attribute shall not be used. |
| ForceFlag | This field, which is only present in the binary representation, signals the presence of device command attribute. A value of "1" means the attribute shall be used and "0" means the attribute shall not be used. |
| TorqueFlag | This field, which is only present in the binary representation, signals the presence of device command attribute. A value of "1" means the attribute shall be used and "0" means the attribute shall not be used. |
| DeviceCommandBase | Provides the topmost type of the base type hierarchy which each individual device command can inherit. |
| Position | Describes the position that a kinesthetic device shall take in millimeters along each axis of X, Y, and Z, with respect to the idle position of the device. |
| Orientation | Describes the orientation that a kinesthetic device shall take in degrees along each axis of X, Y, and Z, with respect to the idle orientation of the device. |
| Force | Describes the force of kinesthetic effect in percentage with respect to the maximum force described in the device capability. If the Force is not specified, this command shall be interpreted as turning on at the maximum force. This element takes Float3DVectorType type defined in Part 6 of ISO/IEC 23005. |
| Torque | Describes the torque of kinesthetic effect in percentage with respect to the maximum torque described in the device capability. If the Torque is not specified, this command shall be interpreted as turning on at the maximum torque. This element takes Float3DVectorType type defined in Part 6 of ISO/IEC 23005. |
| Float3DVectorType | Tool for describing a 3D vector |
| X | Describes the sensed value in x-axis. |
| Y | Describes the sensed value in y-axis. |
| Z | Describes the sensed value in z-axis. |

Hereinafter, metadata for an individual sensor in the normal mode will be described.

Tables 26 through 28 show an example of XML representation syntax, binary representation syntax, and descriptor components semantics of a sensed information based type, respectively. The following is an example, and thus, the present disclosure is not limited thereto.

TABLE 26

```
<!-- ################################################## -->
<!-- Sensed information base type                       -->
<!-- ################################################## -->
<complexType name="SensedInfoBaseType" abstract="true">
    <sequence>
        <element name="TimeStamp" type="mpegvct:TimeStampType"
        use="optional" />
    </sequence>
    <attributeGroup ref="iidl:SensedInfoBaseAttributes"/>
</complexType>
```

TABLE 27

| SensedInfoBaseTypeType{ | Number of bits | Mnemonic |
|---|---|---|
| TimeStampFlag | 1 | bslbf |
| SensedInfoBaseAttributes | | SensedInfoBaseAttributesType |
| If(TimeStampFlag){ | | |
|    TimeStamp | | TimeStampType |
| } | | |
| } | | |

TABLE 28

| Names | Description |
|---|---|
| SensedInfoBaseTypeType | Tool for describing sensed information base type. |
| TimeStampFlag | This field, which is only present in the binary representation, signals the presence of the timestamp element. A value of "1" means the timestamp shall be used and "0" means the timestamp shall not be used. |
| SensedInfoBaseAttributes | Provides the topmost type of the base type hierarchy which each individual sensed information can inherit. |
| TimeStamp | Provides the timing information for the sensed information to be executed. As defined in Part 6 of ISO/IEC 23005, there is a choice of selection among three timing schemes, which are absolute time, clock tick time, and delta of clock tick time |

Tables 29 through 31 show an example of XML representation syntax, binary representation syntax, and descriptor components semantics of sensed information base attributes, respectively. The following is an example, and thus, the present disclosure is not limited thereto.

TABLE 29

```
<!-- ################################################## -->
<!-- Definition of Sensed information Base Attributes   -->
<!-- ################################################## -->
<attributeGroup name="SensedInfoBaseAttributes">
    <attribute name="id" type="ID" use="optional"/>
    <attribute name="sensorIdRef" type="anyURI" use="optional"/>
    <attribute name="linkedlist" type="anyURI" use="optional"/>
    <attribute name="groupID" type="anyURI" use="optional"/>
```

TABLE 29-continued

```
<attribute name="priority" type="PositiveInteger" use="optional"/>
<attribute name="activate" type="boolean" use="optional"/>
</attributeGroup>
```

TABLE 30

| SensedInfoBaseAttributesType{ | Number of bits | Mnemonic |
|---|---|---|
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| If(IDFlag) { | | |
| ID | See ISO 10646 | UTF-8 |

TABLE 30-continued

| SensedInfoBaseAttributesType{ | Number of bits | Mnemonic |
|---|---|---|
| } | | |
| if(sensorIdRefFlag) { | | |
| sensorIdRefLength | | vluimsbf5 |
| sensorIdRef | 8* sensorIdRefLength | bslbf |
| } | | |
| if(linkedlistFlag) { | | |
| linkedlistLength | | vluimsbf5 |
| linkedlist | 8* linkedlistLength | bslbf |
| } | | |
| if(groupIDFlag) { | | |
| groupIDLength | | vluimsbf5 |
| groupID | 8* groupIDLength | bslbf |
| } | | |
| If(priorityFlag) { | | |
| priority | 8 | uimsbf |
| } | | |
| if(activateFlag) { | | |
| activate | 1 | bslbf |
| } | | |
| } | | |

TABLE 31

| Names | Description |
|---|---|
| SensedInfoBaseAttributesType | Tool for describing sensed information base attributes. |
| IDFlag | This field, which is only present in the binary representation, signals the presence of the ID attribute. A value of "1" means the attribute shall be used and "0" means the attribute shall not be used. |
| sensorIdRefFlag | This field, which is only present in the binary representation, signals the presence of the sensor ID reference attribute. A value of "1" means the attribute shall be used and "0" means the attribute shall not be used. |
| linkedlistFlag | This field, which is only present in the binary representation, signals the presence of the linked list attribute. A value of "1" means the attribute shall be used and "0" means the attribute shall not be used. |
| groupIDFlag | This field, which is only present in the binary representation, signals the presence of the group ID attribute. A value of "1" means the attribute shall be used and "0" means the attribute shall not be used. |
| priorityFlag | This field, which is only present in the binary representation, signals the presence of the priority attribute. A value of "1" means the attribute shall be used and "0" means the attribute shall not be used. |
| activateFlag | This field, which is only present in the binary representation, signals the presence of the activation attribute. A value of "1" means the attribute shall be used and "0" means the attribute shall not be used. |
| ID | ID to identify the sensed information with respect to a light sensor. |
| sensorIdRefLength | This field, which is only present in the binary representation, specifies the length of the following sensorIdRef attribute. |
| sensorIdRef | References a sensor that has generated the information included in this specific sensed information. |
| linkedlistLength | This field, which is only present in the binary representation, specifies the length of the following linkedlist attribute. |
| linkedlist | Identifier for the next sensor of the multi-sensor structure that consists of a group of sensors in a way that each record contains a reference to the ID of the next sensor. |
| groupIDLength | This field, which is only present in the binary representation, specifies the length of the following groupID attribute. |
| groupID | Identifier for a group multi-sensor structure to which this light sensor belongs. |
| priority | Describes a priority for sensed information with respect to other sensed information sharing the same point in time when the sensed information becomes adapted. A value of zero indicates the highest priority and larger values indicate lower priorities. The default value of the priority is zero. If there is more than one sensed information with the same priority, the order of process can be determined by the adaptation engine itself. |
| Activate | Describes whether the sensor is activated. A value of "1" means the sensor is activated and "0" means the sensor is deactivated. |

Tables 32 through 34 show an example of XML representation syntax, binary representation syntax, and descriptor components semantics of a position sensor type, respectively. The following is an example, and thus, the present disclosure is not limited thereto.

TABLE 32

```
<!--######################################-->
<!--Definition of Position Sensor type    -->
<!--######################################-->
<complexType name="PositionSensorType">
<complexContent>
    <extension base="iidl:SensedInfoBaseType">
        <sequence>
            <element name="position"
                type="mpegvct:Float3DVectorType" minOccurs="0"/>
        </sequence>
        <attribute name="unit" type="mpegvct:unitType"
            use="optional"/>
    </extension>
</complexContent>
</complexType>
```

TABLE 33

| PositionSensorType{ | Number of bits | Mnemonic |
|---|---|---|
| positionFlag | 1 | bslbf |
| unitFlag | 1 | bslbf |
| SensedInfoBaseType | | SensedInfoBaseTypeType |
| if(positionFlag) { | | |
|   position | | Float3DVectorType |
| } | | |
| if(unitFlag) { | | |
|   unit | | unitType |
| } | | |
| } | | |

TABLE 34

| Names | Description |
|---|---|
| PositionSensorType | Tool for describing sensed information with respect to a position sensor. |
| positionFlag | This field, which is only present in the binary representation, signals the presence of sensor value attribute. A value of "1" means the attribute shall be used and "0" means the attribute shall not be used. |
| unitFlag | This field, which is only present in the binary representation, signals the presence of unit attribute. A value of "1" means the user-defined unit shall be used and "0" means the user-defined unit shall not be used. |
| SensedInfoBaseType | Provides the topmost type of the base type hierarchy which each individual sensed information can inherit. |
| position | Describes the sensed value of the position sensor in 3D with respect to the default unit if the unit is not defined. Otherwise, use the unit type defined in the sensor capability. |
| unit | Specifies the unit of the sensed value, if a unit other than the default unit is used, as a reference to a classification scheme term provided by UnitCS defined in ISO/IEC 23005-6 and use the binary representation defined above. |

Tables 35 through 37 show an example of XML representation syntax, binary representation syntax, and descriptor components semantics of an orientation sensor type, respectively. The following is an example, and thus, the present disclosure is not limited thereto.

TABLE 35

```
<!--######################################-->
<!--Definition of Orientation Sensor type -->
<!--######################################-->
<complexType name="OrientationSensorType">
    <complexContent>
        <extension base="iidl:SensedInfoBaseType">
            <sequence>
                <element name="orientation"
                    type="mpegvct:Float3DVectorType"
```

TABLE 35-continued

```
                    minOccurs="0"/>
            </sequence>
            <attribute name="unit" type="mpegvct:unitType"
                use="optional"/>
        </extension>
    </complexContent>
</complexType>
```

TABLE 36

| Type | Number of bits | Mnemonic |
|---|---|---|
| OrientationSensorType{ | | |
|   orientationFlag | 1 | bslbf |
|   unitFlag | 1 | bslbf |
|   SensedInfoBaseType | | SensedInfoBaseTypeType |
|   if(orientationFlag) { | | |
|     orientation | | Float3DVectorType |
|   } | | |
|   If(unitFlag) { | | |
|     unit | | unitType |
|   } | | |
| } | | |

TABLE 37

| Names | Description |
|---|---|
| OrientationSensorType | Tool for describing sensed information with respect to an orientation sensor. |
| orientationFlag | This field, which is only present in the binary representation, signals the presence of sensor value attribute. A value of "1" means the attribute shall be used and "0" means the attribute shall not be used. |
| unitFlag | This field, which is only present in the binary representation, signals the presence of unit attribute. A value of "1" means the user-defined unit shall be used and "0" means the user-defined unit shall not be used. |

TABLE 37-continued

| Names | Description |
|---|---|
| SensedInfoBaseType | Provides the topmost type of the base type hierarchy which each individual sensed information can inherit. |
| orientation | Describes the sensed value of the orientation sensor in 3D with respect to the default unit if the unit is not defined. Otherwise, use the unit type defined in the sensor capability. |
| unit | Specifies the unit of the sensed value, if a unit other than the default unit is used, as a refererence to a classification scheme term provided by UnitCS defined in ISO/IEC 23005-6 and use the binary representation defined above. |

Tables 38 through 40 show an example of XML representation syntax, binary representation syntax, and descriptor components semantics of a velocity sensor type, respectively. The following is an example, and thus, the present disclosure is not limited thereto.

TABLE 38

```
<!--######################################## -->
<!--Definition of Velocity Sensor type         -->
<!--######################################## -->
<complexType name="VelocitySensorType">
    <complexContent>
        <extension base="iidl:SensedInfoBaseType">
            <sequence>
                <element name="velocity"
                    type="mpegvct:Float3DVectorType" minOccurs="0"/>
            </sequence>
            <attribute name="unit" type="mpegvct:unitType"
                use="optional"/>
        </extension>
    </complexContent>
</complexType>
```

TABLE 39

| VelocitySensorType{ | Number of bits | Mnemonic |
|---|---|---|
| velocityFlag | 1 | bslbf |
| unitFlag | 1 | bslbf |
| SensedInfoBaseType | | SensedInfoBaseTypeType |
| If(velocityFlag) { | | |
|   velocity | | Float3DVectorType |
| } | | |
| if(unitFlag) { | | |
|   unit | | unitType |
| } | | |
| } | | |

TABLE 40

| Names | Description |
|---|---|
| VelocitySensorType | Tool for describing sensed information with respect to a velocity sensor. |
| velocityFlag | This field, which is only present in the binary representation, signals the presence of sensor value attribute. A value of "1" means the attribute shall be used and "0" means the attribute shall not be used. |
| unitFlag | This field, which is only present in the binary representation, signals the presence of unit attribute. A value of "1" means the user-defined unit shall be used and "0" means the user-defined unit shall not be used |

TABLE 40-continued

| Names | Description |
|---|---|
| SensedInfoBaseType | Provides the topmost type of the base type hierarchy which each individual sensed information can inherit. |
| velocity | Describes the sensed value of the velocity sensor in 3D with respect to the default unit if the unit is not defined. Otherwise, use the unit type defined in the sensor capability. |
| unit | Specifies the unit of the sensed value, if a unit other than the default unit is used, as a reference to a classification scheme term provided by UnitCS defined in ISO/IEC 23005-6 and use the binary representation defined above. |

Tables 41 through Table 43 show an example of XML representation syntax, binary representation syntax, and descriptor components semantics of an angular velocity sensor type, respectively. The following is an example, and thus, the present disclosure is not limited thereto.

TABLE 41

```
<!--######################################## -->
<!--Definition of Angular Velocity Sensor type -->
<!--######################################## -->
<complexType name="AngularVelocitySensorType">
    <complexContent>
        <extension base="iidl:SensedInfoBaseType">
            <sequence>
                <element name="AngularVelocity"
                    type="mpegvct:Float3DVectorType"
                    minOccurs="0"/>
            </sequence>
            <attribute name="unit" type="mpegvct:unitType"
                use="optional"/>
        </extension>
    </complexContent>
</complexType>
```

TABLE 42

| AngularVelocitySensorType{ | Number of bits | Mnemonic |
|---|---|---|
| angularvelocityFlag | 1 | bslbf |
| unitFlag | 1 | bslbf |
| SensedInfoBaseType | | SensedInfoBaseTypeType |
| if(angularvelocityFlag) { | | |
|   angularvelocity | | Float3DVectorType |
| } | | |
| if(unitFlag) { | | |
|   unit | | unitType |
| } | | |
| } | | |

TABLE 43

| Names | Description |
|---|---|
| AngularVelocitySensorType | Tool for describing sensed information with respect to an angular velocity sensor |
| angularvelocityFlag | This field, which is only present in the binary representation, signals the presence of sensor value attribute. A value of "1" means the attribute shall be used and "0" means the attribute shall not be used. |
| unitFlag | This field, which is only present in the binary representation, signals the presence of unit attribute. A value of "1" means the user-defined unit shall be used and "0" means the user-defined unit shall not be used. |

TABLE 43-continued

| Names | Description |
| --- | --- |
| SensedInfoBaseType | Provides the topmost type of the base type hierarchy which each individual sensed information can inherit. |
| angularvelocity | Describes the sensed value of the angular velocity sensor in 3D with respect to the default unit if the unit is not defined. Otherwise, use the unit type defined in the sensor capability. |
| unit | Specifies the unit of the sensed value, if a unit other than the default unit is used, as a reference to a classification scheme term provided by UnitCS defined in ISO/IEC 23005-6 and use the binary representation defined above. |

Tables 44 through 46 show an example of XML representation syntax, binary representation syntax, and descriptor components semantics of an acceleration sensor type, respectively. The following is an example, and thus, the present disclosure is not limited thereto.

TABLE 44

```
<!--########################### -->
<!--Definition of Acceleration Sensor type   -->
<!--########################### -->
<complexType name="AccelerationSensorType">
    <complexContent>
        <extension base="iidl:SensedInfoBaseType">
            <sequence>
                <element name="acceleration"
                type="mpegvct:Float3DVectorType" minOccurs="0"/>
            </sequence>
            <attribute name="unit" type="mpegvct:unitType"
            use="optional"/>
        </extension>
    </complexContent>
</complexType>
```

TABLE 45

| AccelerationSensorType{ | Number of bits | Mnemonic |
| --- | --- | --- |
| accelerationFlag | 1 | bslbf |
| unitFlag | 1 | bslbf |
| SensedInfoBaseType | | SensedInfoBaseTypeType |
| if(accelerationFlag) { | | |
|   acceleration | | Float3DVectorType |
| } | | |
| if(unitFlag) { | | |
|   unit | | unitType |
| } | | |
| } | | |

TABLE 46

| Names | Description |
| --- | --- |
| AccelerationSensorType | Tool for describing sensed information with respect to an acceleration sensor. |
| accelerationFlag | This field, which is only present in the binary representation, signals the presence of sensor value attribute. A value of "1" means the attribute shall be used and "0" means the attribute shall not be used. |
| unitFlag | This field, which is only present in the binary representation, signals the presence of unit attribute. A value of "1" means the user-defined unit shall be used and "0" means the user-defined unit shall not be used. |

TABLE 46-continued

| Names | Description |
| --- | --- |
| SensedInfoBaseType | Provides the topmost type of the base type hierarchy which each individual sensed information can inherit. |
| acceleration | Describes the sensed value of the acceleration sensor in 3D with respect to the default unit if the unit is not defined. Otherwise, use the unit type defined in the sensor capability. |
| unit | Specifies the unit of the sensed value, if a unit other than the default unit is used, as a reference to a classification scheme term provided by UnitCS defined in ISO/IEC 23005-6 and use the binary representation defined above. |

Tables 47 through 49 show an example of XML representation syntax, binary representation syntax, and descriptor components semantics of an angular acceleration sensor type, respectively. The following is an example, and thus, the present disclosure is not limited thereto.

TABLE 47

```
<!-- ########################### -->
<!-- Definition of Angular Acceleration Sensor type -->
<!-- ########################### -->
<complexType name="AngularAccelerationSensorType">
    <complexContent>
        <extension base="iidl:SensedInfoBaseType">
            <sequence>
                <element name="AngularAcceleration" type="mpegvct:Float3DVectorType" minOccurs="0"/>
            </sequence>
            <attribute name="unit" type="mpegvct:unitType" use="optional"/>
        </extension>
    </complexContent>
</complexType>
```

TABLE 48

| AngularAccelerationSensorType{ | Number of bits | Mnemonic |
| --- | --- | --- |
| angularaccelerationFlag | 1 | bslbf |
| unitFlag | 1 | bslbf |
| SensedInfoBaseType | | SensedInfoBaseTypeType |
| if(angularaccelerationFlag) { | | |
|   angularacceleration | | Float3DVectorType |
| } | | |
| if(unitFlag) { | | |
|   unit | | unitType |
| } | | |
| } | | |

TABLE 49

| Names | Description |
| --- | --- |
| AngularAccelerationSensorType | Tool for describing sensed information with respect to an angular acceleration sensor |
| angularaccelerationFlag | This field, which is only present in the binary representation, signals the presence of sensor value attribute. A value of "1" means the attribute shall be used and "0" means the attribute shall not be used. |
| unitFlag | This field, which is only present in the binary representation, signals the presence of unit attribute. A value of "1" means the user-defined unit shall |

TABLE 49-continued

| Names | Description |
|---|---|
| | be used and "0" means the user-defined unit shall not be used. |
| SensedInfoBaseType | Provides the topmost type of the base type hierarchy which each individual sensed information can inherit. |
| angularacceleration | Describes the sensed value of the angular acceleration sensor in 3D with respect to the default unit if the unit is not defined. Otherwise, use the unit type defined in the sensor capability. |
| unit | Specifies the unit of the sensed value, if a unit other than the default unit is used, as a reference to a classification scheme term provided by UnitCS defined in ISO/IEC 23005-6 and use the binary representation defined above. |

Tables 50 through 52 show an example XML representation syntax, binary representation syntax, and descriptor components semantics of a motion acceleration sensor type, respectively. The following is an example, and thus, the present disclosure is not limited thereto.

TABLE 50

```
<!-- ############################################### -->
<!-- Definition of Motion Sensor Type              -->
<!-- ############################################### -->
<complexType name="MotionSensorType">
    <complexContent>
        <extension base="iidl:SensedInfoBaseType">
            <sequence>
                <element name="position"
type="siv:PositionSensorType" minOccurs="0"/>
                <element name="orientation"
type="siv:OrientationSensorType" minOccurs="0"/>
                <element name="velocity"
type="siv:VelocitySensorType" minOccurs="0"/>
                <element name="angularvelocity"
type="siv:AngularVelocitySensorType" minOccurs="0"/>
                <element name="acceleration"
type="siv:AccelerationSensorType" minOccurs="0"/>
                <element name="angularacceleration"
type="siv:AngularAccelerationSensorType" minOccurs="0"/>
            </sequence>
        </extension>
    </complexContent>
</complexType>
```

TABLE 51

| MotionSensorType{ | Number of bits | Mnemonic |
|---|---|---|
| positionFlag | 1 | bslbf |
| orientationFlag | 1 | bslbf |
| velocityFlag | 1 | bslbf |
| angularvelocityFlag | 1 | bslbf |
| accelerationFlag | 1 | bslbf |
| angularaccelerationFlag | 1 | bslbf |
| SensedInfoBaseType | | SensedInfoBaseTypeType |
| if(positionFlag) { | | |
|   position | | PositionSensorType |
| } | | |
| if(orientationFlag) { | | |
|   orientation | | OrientationSensorType |
| } | | |
| if(velocityFlag) { | | |
|   velocity | | VelocitySensorType |
| } | | |
| if(angularvelocityFlag) { | | |
|   angularvelocity | | AngularVelocitySensorType |
| } | | |

TABLE 51-continued

| MotionSensorType{ | Number of bits | Mnemonic |
|---|---|---|
| if(accelerationFlag) { | | |
|   acceleration | | AccelerationSensorTyrpe |
| } | | |
| if(angularaccelerationFlag) { | | |
|   angularacceleration | | AngularAccelerationSensorType |
| } | | |

TABLE 52

| Names | Description |
|---|---|
| MotionSensorType | Tool for describing sensed information with respect to a motion sensor. |
| positionFlag | This field, which is only present in the binary representation, signals the presence of position value attribute. A value of "1" means the attribute shall be used and "0" means the attribute shall not be used. |
| orientationFlag | This field, which is only present in the binary representation, signals the presence of orientation value attribute. A value of "1" means the attribute shall be used and "0" means the attribute shall not be used. |
| velocityFlag | This field, which is only present in the binary representation, signals the presence of velocity value attribute. A value of "1" means the attribute shall be used and "0" means the attribute shall not be used. |
| angularvelocityFlag | This field, which is only present in the binary representation, signals the presence of angular velocity value attribute. A value of "1" means the attribute shall be used and "0" means the attribute shall not be used. |
| accelerationFlag | This field, which is only present in the binary representation, signals the presence of acceleration value attribute. A value of "1" means the attribute shall be used and "0" means the attribute shall not be used. |
| angularaccelerationFlag | This field, which is only present in the binary representation, signals the presence of angular acceleration value attribute. A value of "1" means the attribute shall be used and "0" means the attribute shall not be used. |
| SensedInfoBaseType | Provides the topmost type of the base type hierarchy which each individual sensed information can inherit. |
| position | Describes the sensed position value of the motion sensor with respect to the default unit if the unit is not defined. Otherwise, use the unit type defined in the sensor capability. |
| orientation | Describes the sensed orientation value of the motion sensor with respect to the default unit if the unit is not defined. Otherwise, use the unit type defined in the sensor capability. |
| velocity | Describes the sensed velocity value of the motion sensor with respect to the default unit if the unit is not defined. Otherwise, use the unit type defined in the sensor capability. |
| angularvelocity | Describes the sensed angular velocity value of the motion sensor with respect to the default unit if the unit is not defined. Otherwise, use the unit type defined in the sensor capability. |
| acceleration | Describes the sensed acceleration value of the motion sensor with respect to the default unit if the unit is not defined. Otherwise, use the unit type defined in the sensor capability. |
| angularacceleration | Describes the sensed angular acceleration value of the motion sensor with respect to the default unit if the unit is not defined. Otherwise, use the unit type defined in the sensor capability. |

Tables 53 through Table 55 show an example of XML representation syntax, binary representation syntax, and descriptor components semantics of an intelligent camera type, respectively. The following is an example, and thus, the present disclosure is not limited thereto.

TABLE 53

```
<!-- ################################################ -->
<!-- Definition of Intelligent Camera Type          -->
<!-- ################################################ -->
<complexType name="IntelligentCameraType">
    <complexContent>
        <extension base="iidl:SensedInfoBaseType">
            <sequence>
                <element name="FacialAnimationID" type="anyURI" minOccurs="0"/>
                <element name="BodyAnimationID" type="anyURI" minOccurs="0"/>
                <element name="FaceFeature" type="mpegvct:Float3DVectorType" minOccurs="0" maxOccurs="255"/>
                <element name="BodyFeature" type="mpegvct:Float3DVectorType" minOccurs="0" maxOccurs="255"/>
            </sequence>
        </extension>
    </complexContent>
</complexType>
```

TABLE 54

| IntelligentCameraType{ | Number of bits | Mnemonic |
|---|---|---|
| FacialIDFlag | 1 | bslbf |
| BodyIDFlag | 1 | bslbf |
| FaceFeatureFlag | 1 | bslbf |
| BodyFeatureFlag | 1 | bslbf |
| SensedInfoBaseType | | SensedInfoBaseTypeType |
| if( FacialIDFlag ) { | | |
|     FacialAnimationIDLength | | vluimsbf5 |
|     FacialAnimationID | 8* FacialAnimationIDLength | bslbf |
| } | | |
| if( BodyIDFlag ) { | | |
|     BodyAnimationIDLength | | vluimsbf5 |
|     BodyAnimationID | 8* BodyAnimationIDLength | bslbf |
| } | | |
| if( FaceFeatureFlag ) { | | |
|   NumOfFaceFeature | 8 | uimsbf |
|   for( k=0; k<NumOfFaceFeature; k++ ) { | | |
|     FaceFeature[k] | | Float3DVectorType |
|   } | | |
| } | | |
| if( BodyFeatureFlag ) { | | |
|   NumOfBodyFeature | 8 | uimsbf |
|   for( k=0; k<NumOfBodyFeature; k++ ) { | | |
|     BodyFeature[k] | | Float3DVectorType |
|   } | | |
| } | | |
| } | | |

TABLE 55

| Names | Description |
|---|---|
| IntelligentCameraType | Tool for describing sensed information with respect to an intelligent camera sensor. |
| FacialIDFlag | This field, which is only present in the binary representation, signals the presence of the facial animation ID. A value of "1" means the facial animation ID mode shall be used and "0" means the facial animation ID mode shall not be used. |
| BodyIDFlag | This field, which is only present in the binary representation, signals the presence of the body animation ID. A value of "1" means the body animation ID mode shall be used and "0" means the body animation ID mode shall not be used. |
| FaceFeatureFlag | This field, which is only present in the binary representation, signals the presence of the face features. A value of "1" means the face feature tracking mode shall be used and "0" means the face feature tracking mode shall not be used. |
| BodyFeatureFlag | This field, which is only present in the binary representation, signals the presence of the body features. A value of "1" means the body feature tracking mode shall be used and "0" means the body feature tracking mode shall not be used. |
| SensedInfoBaseType | Provides the topmost type of the base type hierarchy which each individual sensed information can inherit. |
| FacialAnimationIDLength | This field, which is only present in the binary representation, specifies the length of the following FacialAnimationID attribute. |
| FacialAnimationID | Describes the ID referencing the facial expression animation clip. |
| BodyAnimationIDLength | This field, which is only present in the binary representation, specifies the length of the following BodyAnimationID attribute. |

TABLE 55-continued

| Names | Description |
| --- | --- |
| BodyAnimationID | Describes the ID referencing the body animation clip. |
| NumOfFaceFeature | This field, which is only present in the binary representation, specifies the number of face feature points. |
| FaceFeature | Describes the 3D position of each of the face feature points detected by the camera.<br>Note: The order of the elements corresponds to the order of the face feature points defined at the featureControl for face in 2.2.15 of ISO/IEC_23005-4 |
| NumOfBodyFeature | This field, which is only present in the binary representation, specifies the number of body feature points. |
| BodyFeature | Describes the 3D position of each of the body feature points detected by the camera.<br>Note: The order of the elements corresponds to the order of the body feature points defined at the featureControl for body in 2.2.14 of ISO/IEC_23005-4. |

Hereinafter, metadata for an individual device and a sensor in the first update mode will be described.

A device command vocabulary will be described.

Table 56 shows an example of the color correction type.

The ColorCorrectionDeviceUpdate includes the list update 540 of 10 bits. Each bit of the list update 540 may correspond to a predetermined flag or data of the ColorCorrectionDeviceUpdate. For example, when a value of a lowermost bit, e.g., ListUpdate[0], of the list update 540 corresponds to "1," idFlag may be included in the ColorCorrectionDeviceUpdate. When the value of the lowermost bit does not correspond to "1," idFlag may not be included in the ColorCorrectionDeviceUpdate. In addition, id, optional data included in the flag idFlag, may be included in the ColorCorrectionDeviceUpdate when a value of a sixth bit, ListUpdate[5], from the lowermost bit corresponds to "1" and a value of the idFlag corresponds to "1."

In addition, in a case of SpitialLocator, a plurality of SpitialLocators may be present depending on a value of LoopSpatialLocator. UpdateMask may be included in order to indicate whether each of the plurality of SpitialLocators is included. That is, SpatialLocator[k] corresponding to a $k^{th}$ bit of which a value corresponds to "1," among the plurality of bits of the UpdateMask may be included in the ColorCorrectionDeviceUpdate.

Table 57 shows an example of the rigid body motion type.

TABLE 56

| ColorCorrectionDeviceUpdateModeType{ | Number of bits | Mnemonic |
| --- | --- | --- |
| ListUpdate | 10 | bslbf |
| if(ListUpdate[0]){ | | |
|     idFlag | 1 | bslbf |
| } | | |
| if(ListUpdate[1]){ | | |
|     deviceIdRefFlag | 1 | bslbf |
| } | | |
| if(ListUpdate[2]){ | | |
|     activateFlag | 1 | bslbf |
| } | | |
| if(ListUpdate[3]){ | | |
|     intensityFlag | 1 | bslbf |
| } | | |
| TimeStamp | | TimeStampType |
| if(ListUpdate[5]){ | | |
|     If(idFlag) { | | |
|         id | See ISO 10646 | UTF-8 |
|     } | | |
| } | | |
| if(ListUpdate[6]){ | | |
|     if(deviceIdRefFlag) { | | |
|         deviceIdRefLength | | vluimsbf5 |
|         deviceIdRef | 8* deviceIdRefLength | bslbf |
|     } | | |
| } | | |
| if(ListUpdate[7]){ | | |
|     if(activateFlag) { | | |
|         activate | 1 | bslbf |
|     } | | |
| } | | |
| if(ListUpdate[8]){ | | |
|     LoopSpatialLocator | | vluimsbf5 |
|     UpdateMask | LoopSpatialLocator | bslbf |
|     for(k=0;k<LoopSpatialLocator; k++){ | | |
|         if(UpdateMask[k]){ | | |
|             SpatialLocator[k] | | mpeg7:RegionLocatorType |
|         } | | |
|     } | | |
| } | | |
| if(ListUpdate[9]){ | | |
|     if(intensityFlag) { | | |
|         intensity | 7 | uimsbf |
|     } | | |
| } | | |
| } | | |

TABLE 57

| RigidBodyMotionDeviceUpdateModeType{ | Number of bits | Mnemonic |
|---|---|---|
| ListUpdate | 49 | bslbf |
| if(ListUpdate[0]){ | | |
|     idFlag | 1 | bslbf |
| } | | |
| if(ListUpdate[1]){ | | |
|     deviceIdRefFlag | 1 | bslbf |
| } | | |
| if(ListUpdate[2]){ | | |
|     activateFlag | 1 | bslbf |
| } | | |
| if(ListUpdate[3]){ | | |
|     intensityFlag | 1 | bslbf |
| } | | |
| if(ListUpdate(4]){ | | |
|     MoveTowardFlag | 1 | bslbf |
| } | | |
| if(ListUpdate[5]){ | | |
|     durationFlag | 1 | bslbf |
| } | | |
| TimeStamp | | TimeStampType |
| if(ListUpdate[7]){ | | |
|     If(idFlag) { | | |
|         id | See ISO 10646 | UTF-8 |
|     } | | |
| } | | |
| if(ListUpdate[8]){ | | |
|     if(deviceIdRefFlag) { | | |
|         deviceIdRefLength | | vluimsbf5 |
|         deviceIdRef | 8* deviceIdRefLength | bslbf |
|     } | | |
| } | | |
| if(ListUpdate[9]){ | | |
|     if(activateFlag) { | | |
|         activate | 1 | bslbf |
|     } | | |
| } | | |
| if(ListUpdate[10]){ | | |
|     if(intensityFlag) { | | |
|         intensity | 7 | uimsbf |
|     } | | |
| } | | |
| if(ListUpdate[11]){ | | |
|     if(MoveTowardFlag) { | | |
|         if(ListUpdate[12]){ | | |
|             directionXFlag | 1 | bslbf |
|         } | | |
|         if(ListUpdate[13]){ | | |
|             directionYFlag | 1 | bslbf |
|         } | | |
|         if(ListUpdate[14]){ | | |
|             directionZFlag | 1 | bslbf |
|         } | | |
|         if(ListUpdate[15]){ | | |
|             speedXFlag | 1 | bslbf |
|         } | | |
|         if(ListUpdate[16]){ | | |
|             speedYFlag | 1 | bslbf |
|         } | | |
|         if(ListUpdate[17]){ | | |
|             speedZFlag | 1 | bslbf |
|         } | | |
|         if(ListUpdate[18]){ | | |
|             accelerationXFlag | 1 | bslbf |
|         } | | |
|         if(ListUpdate[19]){ | | |
|             accelerationYFlag | 1 | bslbf |
|         } | | |
|         if(ListUpdate[20]){ | | |
|             accelerationZFlag | 1 | bslbf |
|         } | | |
|         if(ListUpdate[21]){ | | |
|             if(directionXFlag){ | | |
|                 directionX | 32 | fsbf |
|             } | | |
|         } | | |
|         if(ListUpdate[22]){ | | |
|             if(directionYFlag){ | | |
|                 directionY | 32 | fsbf |

TABLE 57-continued

| RigidBodyMotionDeviceUpdateModeType{ | Number of bits | Mnemonic |
|---|---|---|
| ............}<br>}<br>............if(ListUpdate[23]){<br>....................if(directionZFlag){<br>............................directionZ<br>....................}<br>............}<br>............if(ListUpdate[24]){<br>....................if(speedXFlag){<br>............................speedX<br>....................}<br>............}<br>............if(ListUpdate[25]){<br>....................if(speedYFlag){<br>............................speedY<br>....................}<br>............}<br>............if(ListUpdate[26]){<br>....................if(speedZFlag){<br>............................speedZ<br>....................}<br>............}<br>............if(ListUpdate[27]]){<br>....................if(accelerationXFlag){<br>............................accelerationX<br>....................}<br>............}<br>............if(ListUpdate[28]){<br>....................if(accelerationYFlag){<br>............................accelerationY<br>....................}<br>............}<br>............if(ListUpdate[29]){<br>....................if(accelerationZFlag){<br>............................accelerationZ<br>....................}<br>............}<br>....}<br>}<br>if(ListUpdate[30]){<br>....if(InclineFlag) {<br>............if(ListUpdate[31]){<br>....................PitchAngleFlag<br>............}<br>............if(ListUpdate[32]){<br>....................YawAngleFlag<br>............}<br>............if(ListUpdate[33]){<br>....................RollAngleFlag<br>............}<br>............if(ListUpdate[34]){<br>....................PitchSpeedFlag<br>............}<br>............if(ListUpdate[35]){<br>....................YawSpeedFlag<br>............}<br>............if(ListUpdate[36]){<br>....................RollSpeedFlag<br>............}<br>............if(ListUpdate[37]){<br>....................PitchAccelerationFlag<br>............}<br>............if(ListUpdate[38]){<br>....................YawAccelerationFlag<br>............}<br>............if(ListUpdate[39]){<br>....................RollAccelerationFlag<br>............}<br>............if(ListUpdate[40]){<br>....................if(PitchAngleFlag){<br>............................PitchAngle<br>....................}<br>............}<br>............if(ListUpdate[41]){<br>....................if(YawAngleFlag){<br>............................YawAngle<br>....................}<br>............} | <br><br><br><br>32<br><br><br><br><br>32<br><br><br><br><br>32<br><br><br><br><br>32<br><br><br><br><br>32<br><br><br><br><br>32<br><br><br><br><br>32<br><br><br><br><br><br><br><br>1<br><br><br>1<br><br><br>1<br><br><br>1<br><br><br>1<br><br><br>1<br><br><br>1<br><br><br>1<br><br><br>1<br><br><br><br>32<br><br><br><br><br>32 | <br><br><br><br>fsbf<br><br><br><br><br>fsbf<br><br><br><br><br>fsbf<br><br><br><br><br>fsbf<br><br><br><br><br>fsbf<br><br><br><br><br>fsbf<br><br><br><br><br>fsbf<br><br><br><br><br><br><br><br>bslbf<br><br><br>bslbf<br><br><br>bslbf<br><br><br>bslbf<br><br><br>bslbf<br><br><br>bslbf<br><br><br>bslbf<br><br><br>bslbf<br><br><br>bslbf<br><br><br><br>fsbf<br><br><br><br><br>fsbf |

TABLE 57-continued

| RigidBodyMotionDeviceUpdateModeType{ | Number of bits | Mnemonic |
|---|---|---|
| if(ListUpdate[42]){ | | |
|     if(RollAngleFlag){ | | |
|         RollAngle | 32 | fsbf |
|     } | | |
| } | | |
| if(ListUpdate[43]){ | | |
|     if(PitchSpeedFlag){ | | |
|         PitchSpeed | 32 | fsbf |
|     } | | |
| } | | |
| if(ListUpdate[44]){ | | |
|     if(YawSpeedFlag){ | | |
|         YawSpeed | 32 | fsbf |
|     } | | |
| } | | |
| if(ListUpdate[45]){ | | |
|     if(RollSpeedFlag){ | | |
|         RollSpeed | 32 | fsbf |
|     } | | |
| } | | |
| if(ListUpdate[46]){ | | |
|     if(PitchAccelerationFlag){ | | |
|         PitchAcceleration | 32 | fsbf |
|     } | | |
| } | | |
| if(ListUpdate[47]){ | | |
|     if(YawAccelerationFlag){ | | |
|         YawAcceleration | 32 | fsbf |
|     } | | |
| } | | |
| if(ListUpdate[48]){ | | |
|     if(RollAccelerationFlag){ | | |
|         RollAcceleration | 32 | fsbf |
|     } | | |
| } | | |
| } | | |
| } | | |
| } | | |

In Table 57, directionXFlag may be included in RigidBodyMotionDeviceUpdateModeType when MoveTowardFlag is included in RigidBodyMotionDeviceUpdateModeType since a value of ListUpdate[11] corresponds to "1," and a value of ListUpdate[12] corresponds to "1."

Table 58 shows an example of the tactile type.

TABLE 58

| TactileDeviceUpdateModeType{ | Number of bits | Mnemonic |
|---|---|---|
| ListUpdate | 10 | bslbf |
| if(ListUpdate[0]){ | | |
|     idFlag | 1 | bslbf |
| } | | |
| if(ListUpdate[1]){ | | |
|     deviceIdRefFlag | 1 | bslbf |
| } | | |
| if(ListUpdate[2]){ | | |
|     activateFlag | 1 | bslbf |
| } | | |
| TimeStamp | | TimeStampType |
| if(ListUpdate[4]){ | | |
|     If(idFlag) { | | |
|         id | See ISO 10646 | UTF-8 |
|     } | | |
| } | | |
| if(ListUpdate[5]){ | | |
|     if(deviceIdRefFlag) { | | |
|         deviceIdRefLength | | vluimsbf5 |
|         deviceIdRef | 8* deviceIdRefLength | bslbf |
|     } | | |
| } | | |
| if(ListUpdate[6]){ | | |
|     if(activateFlag) { | | |
|         activate | 1 | bslbf |
|     } | | |
| } | | |
| if(ListUpdate[7]){ | | |

TABLE 58-continued

| TactileDeviceUpdateModeType{ | Number of bits | Mnemonic |
|---|---|---|
| dimX | 16 | uimsbf |
| } | | |
| if(ListUpdate[8]){ | | |
| dimY | 16 | uimsbf |
| } | | |
| if(ListUpdate[9]){ | | |
| array_intensity | dimX*dimY*32 | fsbf |
| } | | |
| } | | |

Table 59 shows an example of the kinesthetic type.

TABLE 59

| KinestheticDeviceUpdateModeType{ | Number of bits | Mnemonic |
|---|---|---|
| ListUpdate | 15 | bslbf |
| if(ListUpdate[0]){ | | |
| idFlag | 1 | bslbf |
| } | | |
| if(ListUpdate[1]){ | | |
| deviceIdRefFlag | 1 | bslbf |
| } | | |
| if(ListUpdate[2]){ | | |
| activateFlag | 1 | bslbf |
| } | | |
| if(ListUpdate[3]){ | | |
| PositionFlag | 1 | bslbf |
| } | | |
| if(ListUpdate[4]){ | | |
| OrientationFlag | 1 | bslbf |
| } | | |
| if(ListUpdate[5]){ | | |
| ForceFlag | 1 | bslbf |
| } | | |
| if(ListUpdate[6]){ | | |
| TorqueFlag | 1 | bslbf |
| } | | |
| TimeStamp | | TimeStampType |
| if(ListUpdate[8]){ | | |
| If(idFlag) { | | |
| id | See ISO 10646 | UTF-8 |
| } | | |
| } | | |
| if(ListUpdate[9]){ | | |
| if(deviceIdRefFlag) { | | |
| deviceIdRefLength | | vluimsbf5 |
| deviceIdRef | 8* deviceIdRefLength | bslbf |
| } | | |
| } | | |
| if(ListUpdate[10]){ | | |
| if(activateFlag) { | | |
| activate | 1 | bslbf |
| } | | |
| } | | |
| if(ListUpdate[11]){ | | |
| if(PositionFlag){ | | |
| Position | | Float3DVectorType |
| } | | |
| } | | |
| if(ListUpdate[12]){ | | |
| if(OrientationFlag){ | | |
| Orientation | | Float3DVectorType |
| } | | |
| } | | |
| if(ListUpdate[13]){ | | |
| if(ForceFlag){ | | |
| Force | | Float3DVectorType |
| } | | |
| } | | |
| if(ListUpdate[14]){ | | |
| if(TorqueFlag){ | | |
| Torque | | Float3DVectorType |
| } | | |
| } | | |
| } | | |

TABLE 59-continued

| KinestheticDeviceUpdateModeType{ | Number of bits | Mnemonic |
|---|---|---|
| Float3DVectorType { | | |
|     X | 32 | fsbf |
|     Y | 32 | fsbf |
|     Z | 32 | fsbf |
| } | | |

A sensed information vocabulary will be described hereinafter.

Table 60 shows an example of the position sensor type.

TABLE 60

| PositionSensorUpdateModeType { | Number of bits | Mnemonic |
|---|---|---|
|   ListUpdate | 18 | bslbf |
|   if(ListUpdate[0]){ | | |
|     TimeStampFlag | 1 | bslbf |
|   } | | |
|   if(ListUpdate[1]){ | | |
|     IDFlag | 1 | bslbf |
|   } | | |
|   if(ListUpdate[2]){ | | |
|     sensorIdRefFlag | 1 | bslbf |
|   } | | |
|   if(ListUpdate[3]){ | | |
|     linkedlistFlag | 1 | bslbf |
|   } | | |
|   if(ListUpdate[4]){ | | |
|     groupIDFlag | 1 | bslbf |
|   } | | |
|   if(ListUpdate[5]){ | | |
|     priorityFlag | 1 | bslbf |
|   } | | |
|   if(ListUpdate[6]){ | | |
|     activateFlag | 1 | bslbf |
|   } | | |
|   if(ListUpdate[7]){ | | |
|     PositionFlag | 1 | bslbf |
|   } | | |
|   if(ListUpdate[8]){ | | |
|     unitFlag | 1 | bslbf |
|   } | | |
|   if(ListUpdate[9]){ | | |
|     If(TimeStampFlag){ | | |
|       TimeStamp | | TimeStampType |
|     } | | |
|   } | | |
|   if(ListUpdate[10]){ | | |
|     If(IDFlag) { | | |
|       ID | See ISO 10646 | UTF-8 |
|     } | | |
|   } | | |
|   if(ListUpdate[11]){ | | |
|     if(sensorIdRefFlag) { | | |
|       sensorIdRefLength | | vluimsbf5 |
|       sensorIdRef | 8* sensorIdRefLength | bslbf |
|     } | | |
|   } | | |
|   if(ListUpdate[12]){ | | |
|     if(linkedlistFlag) { | | |
|       linkedlistLength | | vluimsbf5 |
|       linkedlist | 8* linkedlistLength | bslbf |
|     } | | |
|   } | | |
|   if(ListUpdate[13]){ | | |
|     if(groupIDFlag) { | | |
|       groupIDLength | | vluimsbf5 |
|       groupID | 8* groupIDLength | bslbf |
|     } | | |
|   } | | |
|   if(ListUpdate[14]){ | | |
|     If(priorityFlag) { | | |
|       priority | 8 | uimsbf |
|     } | | |
|   } | | |

TABLE 60-continued

| PositionSensorUpdateModeType { | Number of bits | Mnemonic |
|---|---|---|
| if(ListUpdate[15]){ | | |
|     if(activateFlag) { | | |
|         activate | 1 | bslbf |
|     } | | |
| } | | |
| if(ListUpdate[16]){ | | |
|     if(PositionFlag) { | | |
|         position | | Float3DVectorType |
|     } | | |
| } | | |
| if(ListUpdate[17]){ | | |
|     if(unitFlag) { | | |
|         unit | | unitType |
|     } | | |
| } | | |
| } | | |

Table 61 shows an example of the orientation sensor type.

TABLE 61

| OrientationSensorUpdateModeType { | Number of bits | Mnemonic |
|---|---|---|
|   ListUpdate | 18 | bslbf |
|   if(ListUpdate[0]){ | | |
|     TimeStampFlag | 1 | bslbf |
|   } | | |
|   if(ListUpdate[1]){ | | |
|     IDFlag | 1 | bslbf |
|   } | | |
|   if(ListUpdate[2]){ | | |
|     sensorIdRefFlag | 1 | bslbf |
|   } | | |
|   if(ListUpdate[3]){ | | |
|     linkedlistFlag | 1 | bslbf |
|   } | | |
|   if(ListUpdate[4]){ | | |
|     groupIDFlag | 1 | bslbf |
|   } | | |
|   if(ListUpdate[5]){ | | |
|     priorityFlag | 1 | bslbf |
|   } | | |
|   if(ListUpdate[6]){ | | |
|     activateFlag | 1 | bslbf |
|   } | | |
|   if(ListUpdate[7]){ | | |
|     OrientationFlag | 1 | bslbf |
|   } | | |
|   if(ListUpdate[8]){ | | |
|     unitFlag | 1 | bslbf |
|   } | | |
|   if(ListUpdate[9]){ | | |
|     If(TimeStampFlag){ | | |
|       TimeStamp | | TimeStampType |
|     } | | |
|   } | | |
|   if(ListUpdate[10]){ | | |
|     If(IDFlag) { | | |
|       ID | See ISO 10646 | UTF-8 |
|     } | | |
|   } | | |
|   if(ListUpdate[11]){ | | |
|     if(sensorIdRefFlag) { | | |
|       sensorIdRefLength | | vluimsbf5 |
|       sensorIdRef | 8* sensorIdRefLength | bslbf |
|     } | | |
|   } | | |
|   if(ListUpdate[12]}{ | | |
|     if(linkedlistFlag) { | | |
|       linkedlistLength | | vluimsbf5 |
|       linkedlist | 8* linkedlistLength | bslbf |
|     } | | |
|   } | | |
|   if(ListUpdate[13]){ | | |
|     if(groupIDFlag) { | | |
|       groupIDLength | | vluimsbf5 |

TABLE 61-continued

| OrientationSensorUpdateModeType { | Number of bits | Mnemonic |
|---|---|---|
|         groupID | 8* groupIDLength | bslbf |
|       } | | |
|     } | | |
|     if(ListUpdate[14]){ | | |
|       If(priorityFlag) { | | |
|         priority | 8 | uimsbf |
|       } | | |
|     } | | |
|     if(ListUpdate[15]){ | | |
|       if(activateFlag) { | | |
|         activate | 1 | bslbf |
|       } | | |
|     } | | |
|     if(ListUpdate[16]){ | | |
|       if(OrientationFlag) { | | |
|         Orientation | | Float3DVectorType |
|       } | | |
|     } | | |
|     if(ListUpdate[17]){ | | |
|       if(unitFlag) { | | |
|         unit | | unitType |
|       } | | |
|     } | | |
| } | | |

Table 62 shows an example of the velocity sensor type.

TABLE 62

| VelocitySensorUpdateModeType { | Number of bits | Mnemonic |
|---|---|---|
|     ListUpdate | 18 | bslbf |
|     if(ListUpdate[0]){ | | |
|       TimeStampFlag | 1 | bslbf |
|     } | | |
|     if(ListUpdate[1]){ | | |
|       IDFlag | 1 | bslbf |
|     } | | |
|     if(ListUpdate[2]){ | | |
|       sensorIdRefFlag | 1 | bslbf |
|     } | | |
|     if(ListUpdate[3]){ | | |
|       linkedlistFlag | 1 | bslbf |
|     } | | |
|     if(ListUpdate[4]){ | | |
|       groupIDFlag | 1 | bslbf |
|     } | | |
|     if(ListUpdate[5]){ | | |
|       priorityFlag | 1 | bslbf |
|     } | | |
|     if(ListUpdate[6]){ | | |
|       activateFlag | 1 | bslbf |
|     } | | |
|     if(ListUpdate[7]){ | | |
|       VelocityFlag | 1 | bslbf |
|     } | | |
|     if(ListUpdate[8]){ | | |
|       unitFlag | 1 | bslbf |
|     } | | |
|     if(ListUpdate[9]){ | | |
|       If(TimeStampFlag){ | | |
|         TimeStamp | | TimeStampType |
|       } | | |
|     } | | |
|     if(ListUpdate[10]){ | | |
|       If(IDFlag) { | | |
|         ID | See ISO 10646 | UTF-8 |
|       } | | |
|     } | | |
|     if(ListUpdate[11]){ | | |
|       if(sensorIdRefFlag) { | | |
|         sensorIdRefLength | | vluimsbf5 |
|         sensorIdRef | 8* sensorIdRefLength | bslbf |
|       } | | |
|     } | | |
|     if(ListUpdate[12]){ | | |

TABLE 62-continued

| VelocitySensorUpdateModeType { | Number of bits | Mnemonic |
|---|---|---|
|     if(linkedlistFlag) { | | |
|         linkedlistLength | | vluimsbf5 |
|         linkedlist | 8* linkedlistLength | bslbf |
|     } | | |
| } | | |
| if(ListUpdate[13]){ | | |
|     if(groupIDFlag) { | | |
|         groupIDLength | | vluimsbf5 |
|         groupID | 8* groupIDLength | bslbf |
|     } | | |
| } | | |
| if(ListUpdate[14]){ | | |
|     If(priorityFlag) { | | |
|         priority | 8 | uimsbf |
|     } | | |
| } | | |
| if(ListUpdate[15]){ | | |
|     if(activateFlag) { | | |
|         activate | 1 | bslbf |
|     } | | |
| } | | |
| if(ListUpdate[16]){ | | |
|     if(VelocityFlag) { | | |
|         Velocity | | Float3DVectorType |
|     } | | |
| } | | |
| if(ListUpdate[17]){ | | |
|     if(unitFlag) { | | |
|         unit | | unitType |
|     } | | |
| } | | |
| } | | |

Table 63 shows an example of the angular velocity sensor type.

TABLE 63

| AngularVelocitySensorUpdateModeType { | Number of bits | Mnemonic |
|---|---|---|
|     ListUpdate | 18 | bslbf |
|     if(ListUpdate[0]){ | | |
|         TimeStampFlag | 1 | bslbf |
|     } | | |
|     if(ListUpdate[1]){ | | |
|         IDFlag | 1 | bslbf |
|     } | | |
|     if(ListUpdate[2]){ | | |
|         sensorIdRefFlag | 1 | bslbf |
|     } | | |
|     if(ListUpdate[3]){ | | |
|         linkedlistFlag | 1 | bslbf |
|     } | | |
|     if(ListUpdate[4]){ | | |
|         groupIDFlag | 1 | bslbf |
|     } | | |
|     if(ListUpdate[5]){ | | |
|         priorityFlag | 1 | bslbf |
|     } | | |
|     if(ListUpdate[6]){ | | |
|         activateFlag | 1 | bslbf |
|     } | | |
|     if(ListUpdate[7]){ | | |
|         AngularVelocityFlag | 1 | bslbf |
|     } | | |
|     if(ListUpdate[8]){ | | |
|         unitFlag | 1 | bslbf |
|     } | | |
|     if(ListUpdate[9]){ | | |
|         If(TimeStampFlag){ | | |
|             TimeStamp | | TimeStampType |
|         } | | |
|     } | | |
|     if(ListUpdate[10]){ | | |
|         If(IDFlag) { | | |

TABLE 63-continued

| AngularVelocitySensorUpdateModeType { | Number of bits | Mnemonic |
|---|---|---|
| ID | See ISO 10646 | UTF-8 |
| } | | |
| } | | |
| if(ListUpdate[11]){ | | |
|     if(sensorIdRefFlag) { | | |
|         sensorIdRefLength | | vluimsbf5 |
|         sensorIdRef | 8* sensorIdRefLength | bslbf |
|     } | | |
| } | | |
| if(ListUpdate[12]){ | | |
|     if(linkedlistFlag) { | | |
|         linkedlistLength | | vluimsbf5 |
|         linkedlist | 8* linkedlistLength | bslbf |
|     } | | |
| } | | |
| if(ListUpdate[13]){ | | |
|     if(groupIDFlag) { | | |
|         groupIDLength | | vluimsbf5 |
|         groupID | 8* groupIDLength | bslbf |
|     } | | |
| } | | |
| if(ListUpdate[14]){ | | |
|     If(priorityFlag) { | | |
|         priority | 8 | uimsbf |
|     } | | |
| } | | |
| if(ListUpdate[15]){ | | |
|     if(activateFlag) { | | |
|         activate | 1 | bslbf |
|     } | | |
| } | | |
| if(ListUpdate[16]){ | | |
|     if(AngularVelocityFlag) { | | |
|         AngularVelocity | | Float3DVectorType |
|     } | | |
| } | | |
| if(ListUpdate[17]){ | | |
|     if(unitFlag) { | | |
|         unit | | unitType |
|     } | | |
| } | | |
| } | | |

Table 64 shows an example of the acceleration sensor 40 type.

TABLE 64

| AccelerationSensorUpdateModeType { | Number of bits | Mnemonic |
|---|---|---|
| ListUpdate | 18 | bslbf |
| if(ListUpdate[0]){ | | |
|     TimeStampFlag | 1 | bslbf |
| } | | |
| if(ListUpdate[1]){ | | |
|     IDFlag | 1 | bslbf |
| } | | |
| if(ListUpdate[2]){ | | |
|     sensorIdRefFlag | 1 | bslbf |
| } | | |
| if(ListUpdate[3]){ | | |
|     linkedlistFlag | 1 | bslbf |
| } | | |
| if(ListUpdate[4]){ | | |
|     groupIDFlag | 1 | bslbf |
| } | | |
| if(ListUpdate[5]){ | | |
|     priorityFlag | 1 | bslbf |
| } | | |
| if(ListUpdate[6]){ | | |
|     activateFlag | 1 | bslbf |
| } | | |
| if(ListUpdate[7]){ | | |
|     AccelerationFlag | 1 | bslbf |
| } | | |

TABLE 64-continued

| AccelerationSensorUpdateModeType { | Number of bits | Mnemonic |
|---|---|---|
| if(ListUpdate[8]){ | | |
|     unitFlag | 1 | bslbf |
| } | | |
| if(ListUpdate[9]){ | | |
|     If(TimeStampFlag){ | | |
|         TimeStamp | | TimeStampType |
|     } | | |
| } | | |
| if(ListUpdate[10]){ | | |
|     If(IDFlag) { | | |
|         ID | See ISO 10646 | UTF-8 |
|     } | | |
| } | | |
| if(ListUpdate[11]){ | | |
|     if(sensorIdRefFlag) { | | |
|         sensorIdRefLength | | vluimsbf5 |
|         sensorIdRef | 8* sensorIdRefLength | bslbf |
|     } | | |
| } | | |
| if(ListUpdate[12]){ | | |
|     if(linkedlistFlag) { | | |
|         linkedlistLength | | vluimsbf5 |
|         linkedlist | 8* linkedlistLength | bslbf |
|     } | | |
| } | | |
| if(ListUpdate[13]){ | | |
|     if(groupIDFlag) { | | |
|         groupIDLength | | vluimsbf5 |
|         groupID | 8* groupIDLength | bslbf |
|     } | | |
| } | | |
| if(ListUpdate[14]){ | | |
|     If(priorityFlag) { | | |
|         priority | 8 | uimsbf |
|     } | | |
| } | | |
| if(ListUpdate[15]){ | | |
|     if(activateFlag) { | | |
|         activate | 1 | bslbf |
|     } | | |
| } | | |
| if(ListUpdate[16]){ | | |
|     if(AccelerationFlag) { | | |
|         Acceleration | | Float3DVectorType |
|     } | | |
| } | | |
| if(ListUpdate[17]){ | | |
|     if(unitFlag) { | | |
|         unit | | unitType |
|     } | | |
| } | | |
| } | | |

Table 65 shows an example of the angular acceleration sensor type.

TABLE 65

| AngularAccelerationSensorUpdateModeType { | Number of bits | Mnemonic |
|---|---|---|
| ListUpdate | 18 | bslbf |
| if(ListUpdate[0]){ | | |
|     TimeStampFlag | 1 | bslbf |
| } | | |
| if(ListUpdate[1]){ | | |
|     IDFlag | 1 | bslbf |
| } | | |
| if(ListUpdate[2]){ | | |
|     sensorIdRefFlag | 1 | bslbf |
| } | | |
| if(ListUpdate[3]){ | | |
|     linkedlistFlag | 1 | bslbf |
| } | | |
| if(ListUpdate[4]){ | | |
|     groupIDFlag | 1 | bslbf |

TABLE 65-continued

| AngularAccelerationSensorUpdateModeType { | Number of bits | Mnemonic |
|---|---|---|
| } | | |
| if(ListUpdate[5]){ | | |
|     priorityFlag | 1 | bslbf |
| } | | |
| if(ListUpdate[6]){ | | |
|     activateFlag | 1 | bslbf |
| } | | |
| if(ListUpdate[7]){ | | |
|     AngularAccelerationFlag | 1 | bslbf |
| } | | |
| if(ListUpdate[8]){ | | |
|     unitFlag | 1 | bslbf |
| } | | |
| if(ListUpdate[9]){ | | |
|     If(TimeStampFlag){ | | |
|         TimeStamp | | TimeStampType |
|     } | | |
| } | | |
| if(ListUpdate[10]){ | | |
|     If(IDFlag) { | | |
|         ID | See ISO 10646 | UTF-8 |
|     } | | |
| } | | |
| if[ListUpdate[11]){ | | |
|     if(sensorIdRefFlag) { | | |
|         sensorIdRefLength | | vluimsbf5 |
|         sensorIdRef | 8* sensorIdRefLength | bslbf |
|     } | | |
| } | | |
| if(ListUpdate[12]){ | | |
|     if(linkedlistFlag) { | | |
|         linkedlistLength | | vluimsbf5 |
|         linkedlist | 8* linkedlistLength | bslbf |
|     } | | |
| } | | |
| if(ListUpdate[13]){ | | |
|     if(groupIDFlag) { | | |
|         groupIDLength | | vluimsbf5 |
|         groupID | 8* groupIDLength | bslbf |
|     } | | |
| } | | |
| if(ListUpdate[14]){ | | |
|     If(priorityFlag) { | | |
|         priority | 8 | uimsbf |
|     } | | |
| } | | |
| if(ListUpdate[15]){ | | |
|     if(activateFlag) { | | |
|         activate | 1 | bslbf |
|     } | | |
| } | | |
| if(ListUpdate[16]){ | | |
|     if(AngularAccelerationFlag) { | | |
|         AngularAcceleration | | Float3DVectorType |
|     } | | |
| } | | |
| if(ListUpdate[17]){ | | |
|     if(unitFlag) { | | |
|         unit | | unitType |
|     } | | |
| } | | |
| } | | |

Table 66 shows an example of the motion sensor type.

TABLE 66

| MotionSensorUpdateModeType { | Number of bits | Mnemonic |
|---|---|---|
| ListUpdate | 22 | bslbf |
| if(ListUpdate[0]){ | | |
|     TimeStampFlag | 1 | bslbf |
| } | | |
| if(ListUpdate[1]){ | | |
|     IDFlag | 1 | bslbf |
| } | | |

TABLE 66-continued

| MotionSensorUpdateModeType { | Number of bits | Mnemonic |
|---|---|---|
| if(ListUpdate[2]){ | | |
|     sensorIdRefFlag | 1 | bslbf |
| } | | |
| if(ListUpdate[3]){ | | |
|     linkedlistFlag | 1 | bslbf |
| } | | |
| if(ListUpdate[4]){ | | |
|     groupIDFlag | 1 | bslbf |
| } | | |
| if(ListUpdate[5]){ | | |
|     priorityFlag | 1 | bslbf |
| } | | |
| if(ListUpdate[6]){ | | |
|     activateFlag | 1 | bslbf |
| } | | |
| if(ListUpdate[7]){ | | |
|     PositionFlag | 1 | bslbf |
| } | | |
| if(ListUpdate[8]){ | | |
|     OrientationFlag | 1 | bslbf |
| } | | |
| if(ListUpdate[7]){ | | |
|     VelocityFlag | 1 | bslbf |
| } | | |
| if(ListUpdate[7]){ | | |
|     AngularVelocityFlag | 1 | bslbf |
| } | | |
| if(ListUpdate[7]){ | | |
|     AccelerationFlag | 1 | bslbf |
| } | | |
| if(ListUpdate[7]){ | | |
|     AngularAccelerationFlag | 1 | bslbf |
| } | | |
| if(ListUpdate[9]){ | | |
|     If(TimeStampFlag){ | | |
|         TimeStamp | | TimeStampType |
|     } | | |
| } | | |
| if(ListUpdate[10]){ | | |
|     If(IDFlag) { | | |
|         ID | See ISO 10646 | UTF-8 |
|     } | | |
| } | | |
| if(ListUpdate[11]){ | | |
|     if(sensorIdRefFlag) { | | |
|         sensorIdRefLength | | vluimsbf5 |
|         sensorIdRef | 8* sensorIdRefLength | bslbf |
|     } | | |
| } | | |
| if(ListUpdate[12]){ | | |
|     if(linkedlistFlag) { | | |
|         linkedlistLength | | vluimsbf5 |
|         linkedlist | 8* linkedlistLength | bslbf |
|     } | | |
| } | | |
| if(ListUpdate[13]){ | | |
|     if(groupIDFlag) { | | |
|         groupIDLength | | vluimsbf5 |
|         groupID | 8* groupIDLength | bslbf |
|     } | | |
| } | | |
| if(ListUpdate[14]){ | | |
|     If(priorityFlag) { | | |
|         priority | 8 | uimsbf |
|     } | | |
| } | | |
| if(ListUpdate[15]){ | | |
|     if(activateFlag) { | | |
|         activate | 1 | bslbf |
|     } | | |
| } | | |
| if(ListUpdate[16]){ | | |
|     if(PositionFlag) { | | |
|         Position | | PositionSensorUpdateModeType |
|     } | | |
| } | | |
| if(ListUpdate[17]){ | | |
|     if(OrientationFlag) { | | |

TABLE 66-continued

| MotionSensorUpdateModeType { | Number of bits | Mnemonic |
|---|---|---|
|         Orientation | | OrientationSensorUpdateModeType |
|        } | | |
|     } | | |
|     if(ListUpdate[18]){ | | |
|        if(VelocityFlag) { | | |
|            Velocity | | VelocitySensorUpdateModeType |
|        } | | |
|     } | | |
|     if(ListUpdate[19]){ | | |
|        if(AngularVelocityFlag) { | | |
|            AngularVelocity | | AngularVelocitySensorUpdateModeType |
|        } | | |
|     } | | |
|     if(ListUpdate[20]){ | | |
|        if(AccelerationFlag) { | | |
|            Acceleration | | AccelerationSensorUpdateModeType |
|        } | | |
|     } | | |
|     if(ListUpdate[21]){ | | |
|        If(AngularAccelerationFlag) { | | |
|            AngularAcceleration | | AngularAccelarationSensorUpdateModeType |
|        } | | |
|     } | | |
| } | | |

Table 67 shows an example of the intelligent camera type.

TABLE 67

| IntelligentCameraUpdateModeType { | Number of bits | Mnemonic |
|---|---|---|
|     ListUpdate | | bslbf |
|     if(ListUpdate[0]){ | | |
|        TimeStampFlag | 1 | bslbf |
|     } | | |
|     if(ListUpdate[1]){ | | |
|        IDFlag | 1 | bslbf |
|     } | | |
|     if(ListUpdate[2]){ | | |
|        sensorIdRefFlag | 1 | bslbf |
|     } | | |
|     if(ListUpdate[3]){ | | |
|        linkedlistFlag | 1 | bslbf |
|     } | | |
|     if(ListUpdate[4]){ | | |
|        groupIDFlag | 1 | bslbf |
|     } | | |
|     if(ListUpdate[5]){ | | |
|        priorityFlag | 1 | bslbf |
|     } | | |
|     if(ListUpdate[6]){ | | |
|        activateFlag | 1 | bslbf |
|     } | | |
|     if(ListUpdate[7]){ | | |
|        FacialIDFlag | 1 | bslbf |
|     } | | |
|     if[ListUpdate[8]){ | | |
|        BodyIDFlag | 1 | bslbf |
|     } | | |
|     if(ListUpdate[9]){ | | |
|        FaceFeatureFlag | 1 | bslbf |
|     } | | |
|     if(ListUpdate[10]){ | | |
|        BodyFeatureFlag | 1 | bslbf |
|     } | | |
|     if(ListUpdate[11]){ | | |
|        If(TimeStampFlag){ | | |
|            TimeStamp | | TimeStampType |
|        } | | |
|     } | | |
|     if(ListUpdate[12]){ | | |
|        If(IDFlag) { | | |
|            ID | See ISO 10646 | UTF-8 |
|        } | | |
|     } | | |
|     if(ListUpdate[13]){ | | |

TABLE 67-continued

| IntelligentCameraUpdateModeType { | Number of bits | Mnemonic |
|---|---|---|
|     if(sensorIdRefFlag) { | | |
|         sensorIdRefLength | | vluimsbf5 |
|         sensorIdRef | 8* sensorIdRefLength | bslbf |
|     } | | |
| } | | |
| if(ListUpdate[14]){ | | |
|     if(linkedlistFlag) { | | |
|         linkedlistLength | | vluimsbf5 |
|         linkedlist | 8* linkedlistLength | bslbf |
|     } | | |
| } | | |
| if(ListUpdate[15]){ | | |
|     if(groupIDFlag) { | | |
|         groupIDLength | | vluimsbf5 |
|         groupID | 8* groupIDLength | bslbf |
|     } | | |
| } | | |
| if(ListUpdate[16]){ | | |
|     If(priorityFlag) { | | |
|         priority | 8 | uimsbf |
|     } | | |
| } | | |
| if(ListUpdate[17]){ | | |
|     if(activateFlag) { | | |
|         activate | 1 | bslbf |
|     } | | |
| } | | |
| if(ListUpdate[18]){ | | |
|     if(FacialIDFlag) { | | |
|         FacialAnimationIDLength | | vluimsbf5 |
|         FacialAnimationID | 8* FacialAnimationIDLength | bslbf |
|     } | | |
| } | | |
| if(ListUpdate[19]){ | | |
|     if(BodyIDFlag) { | | |
|         BodyAnimationIDLength | | vluimsbf5 |
|         BodyAnimationID | 8* BodyAnimationIDLength | bslbf |
|     } | | |
| } | | |
| if(ListUpdate[20]){ | | |
|     if(FaceFeatureFlag) { | | |
|         NumOfFaceFeature | 8 | uimsbf |
|         UpdateMask | NumOfFaceFeature | bslbf |
|         for( k=0; | | |
|     k<NumOfFaceFeature;k++ ) { | | |
|         if(UpdateMask[k]){ | | |
|             FaceFeature[k] | | Float3DVectorType |
|         } | | |
|     } | | |
|     } | | |
| } | | |
| if(ListUpdate[21]){ | | |
|     if(BodyFeatureFlag) { | | |
|         NumOfBodyFeature | 8 | uimsbf |
|         UpdateMask | NumOfBodyFeature | bslbf |
|         for( k=0; | | |
|     k<NumOfBodyFeature;k++ ) { | | |
|         if(UpdateMask[k]){ | | |
|             BodyFeature[k] | | Float3DVectorType |
|         } | | |
|     } | | |
|     } | | |
| } | | |
| } | | |

Metadata for an individual device and a sensor in the second update mode will be described hereinafter.

A device command vocabulary will also be described herein.

Table 68 shows an example of the color correction type.

TABLE 68

| ColorCorrectionDeviceUpdateModeType{ | Number of bits | Mnemonic |
|---|---|---|
| idFlag | 1 | bslbf |
| deviceIdRefFlag | 1 | bslbf |
| activateFlag | 1 | bslbf |
| intensityFlag | 1 | bslbf |
| ListUpdate | idFlag + deviceIdRefFlag + activateFlag + intensityFlag + 1 | bslbf |
| ListItemNum = 0 | | |
| if( idFlag){ | | |
|    if(ListUpdate[ListItemNum]){ | | |
|       id | See ISO 10646 | UTF-8 |
|    } | | |
|    ListItemNum++ | | |
| } | | |
| if(deviceIdRefFlag){ | | |
|    if(ListUpdate[ListItemNum]){ | | |
|       deviceIdRefLength | | vluimsbf5 |
|       deviceIdRef | 8* deviceIdRefLength | bslbf |
|    } | | |
|    ListItemNum++ | | |
| } | | |
| if(activateFlag){ | | |
|    if(ListUpdate[ListItemNum]){ | | |
|       activate | 1 | bslbf |
|    } | | |
|    ListItemNum++ | | |
| } | | |
| if(intensityFlag){ | | |
|    if(ListUpdate[ListItemNum]){ | | |
|       intensity | 7 | uimsbf |
|    } | | |
|    ListItemNum++ | | |
| } | | |
| TimeStamp | | TimeStampType |
| if(ListUpdate[ListItemNum]){ | | |
|    LoopSpatialLocator | | vluimsbf5 |
|    UpdateMask | LoopSpatialLocator | bslbf |
|    for(k=0;k< LoopSpatialLocator; k++){ | | |
|       if(UpdateMask[k]){ | | |
|          SpatialLocator [k] | | mpeg7:RegionLocatorType |
|       } | | |
|    } | | |
| } | | |
| } | | |

ColorCorrectionDeviceUpdateModeType may include flags. That is, each of idFlag, deviceIdRefFlag, activateFlag, and intensityFlag, for example, may occupy 1 bit. At a point in time of switching from a normal mode to an update mode, a single bit will be assigned to the ListUpdate 540, for each flag having a value of "1," among the flags. In addition, a single bit will be assigned to the ListUpdate 540, for TimeStamp data. That is, a length of the ListUpdate 540 may be changed based on a value of the flag at the point in time of switching to the update mode.

Whether id date is included in the ColorCorrectionDeviceUpdateModeType is to be determined. When a value of the idFlag corresponds to "1," it may indicate that 1 bit was assigned to the ListUpdate 540, for the idFlag and the id data corresponding to the idFlag. Accordingly, whether the value of the idFlag corresponds to "1" may be verified. In order to determine whether a value of the id data is changed, whether a value of a bit of the ListUpdate 540 corresponding to the idFlag corresponds to "1" may be verified. That is, when the value of the idFlag corresponds to "1," and the value of the bit of the ListUpdate 540 corresponding to the idFlag corresponds to "1," the value of the id data corresponding to the idFlag may be included in the metadata. ListItemNum of which a value is initiated to "0" may be used in order to indicate one of bit rows of the ListUpdate.

In addition, when the value of the idFlag corresponds to "1," it may indicate that 1 bit assigned to the ListUpdate 540 for the idFlag is verified, a value of the ListItemNum may be increased by an increment of "1", such that a subsequent bit of the ListUpdate 540 may be targeted for verification. When the value of the idFlag corresponds to "0," it may indicate that no bit was assigned to the ListUpdate 540 for the idFlag, originally. Accordingly, the value of the ListItemNum may not be increased.

Table 69 shows an example of the rigid body motion type.

TABLE 69

| RigidBodyMotionDeviceUpdateModeType{ | Number of bits | Mnemonic |
|---|---|---|
| idFlag | 1 | bslbf |
| deviceIdRefFlag | 1 | bslbf |
| activateFlag | 1 | bslbf |
| intensityFlag | 1 | bslbf |
| MoveTowardFlag | 1 | bslbf |
| directionXFlag | 1 | bslbf |
| directionYFlag | 1 | bslbf |
| directionZFlag | 1 | bslbf |
| speedXFlag | 1 | bslbf |
| speedYFlag | 1 | bslbf |
| speedZFlag | 1 | bslbf |
| accelerationXFlag | 1 | bslbf |
| accelerationYFlag | 1 | bslbf |
| accelerationZFlag | 1 | bslbf |
| InclineFlag | 1 | bslbf |
| PitchAngleFlag | 1 | bslbf |
| YawAngleFlag | 1 | bslbf |
| RollAngleFlag | 1 | bslbf |
| PitchSpeedFlag | 1 | bslbf |
| YawSpeedFlag | 1 | bslbf |
| RollSpeedFlag | 1 | bslbf |
| PitchAccelerationFlag | 1 | bslbf |
| YawAccelerationFlag | 1 | bslbf |
| RollAccelerationFlag | 1 | bslbf |
| durationFlag | 1 | bslbf |
| ListUpdate | idFlag + deviceIdRefFlag + activateFlag + intensityFlag + MoveTowardFlag + directionXFlag + directionYFlag + directionZFlag + speedXFlag + speedYFlag + speedZFlag + accelerationXFlag + accelerationYFlag + accelerationZFlag + InclineFlag + PitchAngleFlag + YawAngleFlag + RollAngleFlag + PitchSpeedFlag + YawSpeedFlag + RollSpeedFlag + PitchAccelerationFlag + YawAccelerationFlag + RollAccelerationFlag + durationFlag + 1 | bslbf |
| ListItemNum = 0 | | |
| if( idFlag){ | | |
|     if(ListUpdate[ListItemNum]){ | | |
|         id | See ISO 10646 | UTF-8 |
|     } | | |
|     ListItemNum++ | | |
| } | | |
| if(deviceIdRefFlag){ | | |
|     if(ListUpdate[ListItemNum]){ | | |
|         deviceIdRefLength | | vluimsbf5 |
|         deviceIdRef | 8* deviceIdRefLength | bslbf |
|     } | | |
|     ListItemNum++ | | |
| } | | |
| if(activateFlag){ | | |
|     if(ListUpdate[ListItemNum]){ | | |
|         activate | 1 | bslbf |
|     } | | |
|     ListItemNum++ | | |
| } | | |
| if(intensityFlag){ | | |
|     if(ListUpdate[ListItemNum]){ | | |
|         intensity | 7 | uimsbf |
|     } | | |
|     ListItemNum++ | | |
| } | | |
| TimeStamp | | TimeStampType |
| if(MoveTowardFlag) { | | |
|   if(ListUpdate[ListItemNum]){ | | |
|     if(directionXFlag){ | | |
|       if(ListUpdate[ListItemNum]){ | | |
|         directionX | 32 | fsbf |
|       } | | |
|       ListItemNum++ | | |
|     } | | |
|     if(directionYFlag){ | | |
|       if(ListUpdate[ListItemNum]){ | | |
|         directionY | 32 | fsbf |
|       } | | |

TABLE 69-continued

| RigidBodyMotionDeviceUpdateModeType{ | Number of bits | Mnemonic |
|---|---|---|
|         ListItemNum++ | | |
|       } | | |
|       if(directionZFlag){ | | |
|         if(ListUpdate[ListItemNum]){ | | |
|             directionZ | 32 | fsbf |
|         } | | |
|         ListItemNum++ | | |
|       } | | |
|       if(speedXFlag){ | | |
|         if(ListUpdate[ListItemNum]){ | | |
|             speedX | 32 | fsbf |
|         } | | |
|         ListItemNum++ | | |
|       } | | |
|       if(speedYFlag){ | | |
|         if(ListUpdate[ListItemNum]){ | | |
|             speedY | 32 | fsbf |
|         } | | |
|         ListItemNum++ | | |
|       } | | |
|       if(speedZFlag){ | | |
|         if(ListUpdate[ListItemNum]){ | | |
|             speedZ | 32 | fsbf |
|         } | | |
|         ListItemNum++ | | |
|       } | | |
|       if(accelerationXFlag){ | | |
|         if(ListUpdate[ListItemNum]){ | | |
|             accelerationX | 32 | fsbf |
|         } | | |
|         ListItemNum++ | | |
|       } | | |
|       if(accelerationYFlag){ | | |
|         if(ListUpdate[ListItemNum]){ | | |
|             accelerationY | 32 | fsbf |
|         } | | |
|         ListItemNum++ | | |
|       } | | |
|       if(accelerationZFlag){ | | |
|         if(ListUpdate[ListItemNum]){ | | |
|             accelerationZ | 32 | fsbf |
|         } | | |
|         ListItemNum++ | | |
|       } | | |
|     } | | |
|     ListItemNum++ | | |
| } | | |
| if(InclineTypeFlag) { | | |
|     if(ListUpdate[ListItemNum]){ | | |
|         if(PitchAngleFlag){ | | |
|             if(ListUpdate[ListItemNum]){ | | |
|                 PitchAngle | 32 | fsbf |
|             } | | |
|             ListItemNum++ | | |
|         } | | |
|         if(YawAngleFlag){ | | |
|             if(ListUpdate[ListItemNum]){ | | |
|                 YawAngle | 32 | fsbf |
|             } | | |
|             ListItemNum++ | | |
|         } | | |
|         if(RollAngleFlag){ | | |
|             if(ListUpdate[ListItemNum]){ | | |
|                 RollAngle | 32 | fsbf |
|             } | | |
|             ListItemNum++ | | |
|         } | | |
|         if(PitchSpeedFlag){ | | |
|             if(ListUpdate[ListItemNum]){ | | |
|                 PitchSpeed | 32 | fsbf |
|             } | | |
|             ListItemNum++ | | |
|         } | | |
|         if(YawSpeedFlag){ | | |
|             if(ListUpdate[ListItemNum]){ | | |
|                 YawSpeed | 32 | fsbf |
|             } | | |
|             ListItemNum++ | | |

TABLE 69-continued

| RigidBodyMotionDeviceUpdateModeType{ | Number of bits | Mnemonic |
|---|---|---|
|         } | | |
|         if(RollSpeedFlag){ | | |
|             if(ListUpdate[ListItemNum]){ | | |
|                 RollSpeed | 32 | fsbf |
|             } | | |
|             ListItemNum++ | | |
|         } | | |
|         if(PitchAccelerationFlag){ | | |
|             if(ListUpdate[ListItemNum]){ | | |
|                 PitchAcceleration | 32 | fsbf |
|             } | | |
|             ListItemNum++ | | |
|         } | | |
|         if(YawAccelerationFlag){ | | |
|             if(ListUpdate[ListItemNum]){ | | |
|                 YawAcceleration | 32 | fsbf |
|             } | | |
|             ListItemNum++ | | |
|         } | | |
|         if(RollAccelerationFlag){ | | |
|             if(ListUpdate[ListItemNum]){ | | |
|                 RollAccelaration | 32 | fsbf |
|             } | | |
|             ListItemNum++ | | |
|         } | | |
|     } | | |
|     ListItemNum++ | | |
| } | | |
| if(durationFlag){ | | |
|     if(ListUpdate[ListItemNum]){ | | |
|         duration | 32 | fsbf |
|     } | | |
| } | | |
| } | | |

Table 70 shows an example of the tactile type.

TABLE 70

| TactileDeviceUpdateModeType{ | Number of bits | Mnemonic |
|---|---|---|
| idFlag | 1 | bslbf |
| deviceIdRefFlag | 1 | bslbf |
| activateFlag | 1 | bslbf |
| ListUpdate | idFlag + deviceIdRefFlag + activateFlag + 4 | bslbf |
| ListItemNum = 0 | | |
| if( idFlag){ | | |
|     if(ListUpdate[ListItemNum]){ | | |
|         id | See ISO 10646 | UTF-8 |
|     } | | |
|     ListItemNum++ | | |
| } | | |
| if(deviceIdRefFlag){ | | |
|     if(ListUpdate[ListItemNum]){ | | |
|         deviceIdRefLength | | vluimsbf5 |
|         deviceIdRef | 8* deviceIdRefLength | bslbf |
|     } | | |
|     ListItemNum++ | | |
| } | | |
| if(activateFlag){ | | |
|     if(ListUpdate[ListItemNum]){ | | |
|         activate | 1 | bslbf |
|     } | | |
|     ListItemNum++ | | |
| } | | |
| TimeStamp | | TimeStampType |
| if(ListUpdate[ListItemNum]){ | | |
|     dimX | 16 | uimsbf |
| } | | |
| ListItemNum++ | | |
| if(ListUpdate[ListItemNum]){ | | |
|     dimY | 16 | uimsbf |
| } | | |
| ListItemNum++ | | |
| if(ListUpdate[ListItemNum]){ | | |

TABLE 70-continued

| TactileDeviceUpdateModeType{ | Number of bits | Mnemonic |
|---|---|---|
|     array_intensity | dimX*dimY*32 | fsbf |
|   } | | |
| } | | |

Table 71 shows an example of the kinesthetic type.

TABLE 71

| KinestheticDeviceUpdateModeType{ | Number of bits | Mnemonic |
|---|---|---|
|   idFlag | 1 | bslbf |
|   deviceIdRefFlag | 1 | bslbf |
|   activateFlag | 1 | bslbf |
|   PositionFlag | 1 | bslbf |
|   OrientationFlag | 1 | bslbf |
|   ForceFlag | 1 | bslbf |
|   Torque Flag | 1 | bslbf |
|   ListUpdate | idFlag + deviceIdRefFlag + activateFlag + PositionFlag + OrientationFlag + ForceFlag + TorqueFlag | bslbf |
|   ListItemNum = 0 | | |
|   if( idFlag){ | | |
|     if(ListUpdate[ListItemNum]){ | | |
|       id | See ISO 10646 | UTF-8 |
|     } | | |
|     ListItemNum++ | | |
|   } | | |
|   if(deviceIdRefFlag){ | | |
|     if(ListUpdate[ListItemNum]){ | | |
|       deviceIdRefLength | | vluimsbf5 |
|       deviceIdRef | 8* deviceIdRefLength | bslbf |
|     } | | |
|     ListItemNum++ | | |
|   } | | |
|   if(activateFlag){ | | |
|     if(ListUpdate[ListItemNum]){ | | |
|       activate | 1 | bslbf |
|     } | | |
|     ListItemNum++ | | |
|   } | | |
|   TimeStamp | | TimeStampType |
|   if(PositionFlag){ | | |
|     if(ListUpdate[ListItemNum]){ | | |
|       PositionFlag | | Float3DVectorType |
|     } | | |
|     ListItemNum++ | | |
|   } | | |
|   if(OrientationFlag){ | | |
|     if(ListUpdate[ListItemNum]){ | | |
|       Orientation | | Float3DVectorType |
|     } | | |
|     ListItemNum++ | | |
|   } | | |
|   if(ForceFlag){ | | |
|     if(ListUpdate[ListItemNum]){ | | |
|       Force | | Float3DVectorType |
|     } | | |
|     ListItemNum++ | | |
|   } | | |
|   if(TorqueFlag){ | | |
|     if(ListUpdate[ListItemNum]){ | | |
|       Torque | | Float3DVectorType |
|     } | | |
|   } | | |
| } | | |
| Float3DVectorType { | | |
|   X | 32 | fsbf |
|   Y | 32 | fsbf |
|   Z | 32 | fsbf |
| } | | |

A sensed information vocabulary will be described herein.
Table 72 shows an example of the position sensor type.

TABLE 72

| PositionSensorUpdateModeType { | Number of bits | Mnemonic |
|---|---|---|
| TimeStampFlag | 1 | bslbf |
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| positionFlag | 1 | bslbf |
| unitFlag | 1 | bslbf |
| ListUpdate | TimeStampFlag + IDFlag + sensorIdRefFlag + linkedlistFlag + groupIDFlag + priorityFlag + activateFlag + positionFlag + unitFlag | bslbf |
| ListItemNum = 0 | | |
| if(TimeStampFlag){ | | |
|     if(ListUpdate[ListItemNum]){ | | |
|         TimeStamp | | TimeStampType |
|     } | | |
|     ListItemNum++ | | |
| } | | |
| if(IDFlag){ | | |
|     if(ListUpdate[ListItemNum]){ | | |
|         ID | See ISO 10646 | UTF-8 |
|     } | | |
|     ListItemNum++ | | |
| } | | |
| if(sensorIdRefFlag){ | | |
|     if(ListUpdate[ListItemNum]){ | | |
|         sensorIdRefLength | | vluimsbf5 |
|         sensorIdRef | 8* sensorIdRefLength | bslbf |
|     } | | |
|     ListItemNum++ | | |
| } | | |
| if(linkedlistFlag){ | | |
|     if(ListUpdate[ListItemNum]){ | | |
|         linkedlistLength | | vluimsbf5 |
|         linkedlist | 8* linkedlistLength | bslbf |
|     } | | |
|     ListItemNum++ | | |
| } | | |
| if(groupIDFlag){ | | |
|     if(ListUpdate[ListItemNum]){ | | |
|         groupIDLength | | vluimsbf5 |
|         groupID | 8* groupIDLength | bslbf |
|     } | | |
|     ListItemNum++ | | |
| } | | |
| if(priorityFlag){ | | |
|     if(ListUpdate[ListItemNum]){ | | |
|         priority | 8 | uimsbf |
|     } | | |
|     ListItemNum++ | | |
| } | | |
| if(activateFlag){ | | |
|     if(ListUpdate[ListItemNum]){ | | |
|         activate | 1 | bslbf |
|     } | | |
|     ListItemNum++ | | |
| } | | |
| if(positionFlag){ | | |
|     if(ListUpdate[ListItemNum]){ | | |
|         position | | Float3DVectorType |
|     } | | |
|     ListItemNum++ | | |
| } | | |
| if(unitFlag){ | | |
|     if(ListUpdate[ListItemNum]){ | | |
|         unit | | Float3DVectorType |
|     } | | |
|     } | | |
| } | | |

Table 73 shows an example of the orientation sensor type.

TABLE 73

| OrientationSensorUpdateModeType { | Number of bits | Mnemonic |
|---|---|---|
| TimeStampFlag | 1 | bslbf |
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| orientationFlag | 1 | bslbf |
| unitFlag | 1 | bslbf |
| ListUpdate | TimeStampFlag + IDFlag + sensorIdRefFlag + linkedlistFlag + groupIDFlag + priorityFlag + activateFlag + orientationFlag + unitFlag | bslbf |
| ListItemNum = 0 | | |
| if(TimeStampFlag){ | | |
|     if(ListUpdate[ListItemNum]){ | | |
|         TimeStamp | | TimeStampType |
|     } | | |
|     ListItemNum++ | | |
| } | | |
| If(IDFlag){ | | |
|     if(ListUpdate[ListItemNum]){ | | |
|         ID | See ISO 10646 | UTF-8 |
|     } | | |
|     ListItemNum++ | | |
| } | | |
| if(sensorIdRefFlag){ | | |
|     if(ListUpdate[ListItemNum]){ | | |
|         sensorIdRefLength | | vluimsbf5 |
|         sensorIdRef | 8* sensorIdRefLength | bslbf |
|     } | | |
|     ListItemNum++ | | |
| } | | |
| if(linkedlistFlag){ | | |
|     if(ListUpdate[ListItemNum]){ | | |
|         linkedlistLength | | vluimsbf5 |
|         linkedlist | 8* linkedlistLength | bslbf |
|     } | | |
|     ListItemNum++ | | |
| } | | |
| if(groupIDFlag){ | | |
|     if(ListUpdate[ListItemNum]){ | | |
|         groupIDLength | | vluimsbf5 |
|         groupID | 8* groupIDLength | bslbf |
|     } | | |
|     ListItemNum++ | | |
| } | | |
| if(priorityFlag){ | | |
|     if(ListUpdate[ListItemNum]){ | | |
|         priority | 8 | uimsbf |
|     } | | |
|     ListItemNum++ | | |
| } | | |
| if(activateFlag){ | | |
|     if(ListUpdate[ListItemNum]){ | | |
|         activate | 1 | bslbf |
|     } | | |
|     ListItemNum++ | | |
| } | | |
| if(orientationFlag){ | | |
|     if(ListUpdate[ListItemNum]){ | | |
|         orientation | | Float3DVectorType |
|     } | | |
|     ListItemNum++ | | |
| } | | |
| if(unitFlag){ | | |
|     if(ListUpdate[ListItemNum]){ | | |
|         unit | | Float3DVectorType |
|     } | | |
|     } | | |
| } | | |

Table 74 shows an example of the velocity sensor type.

TABLE 74

| VelocitySensorUpdateModeType { | Number of bits | Mnemonic |
|---|---|---|
| TimeStampFlag | 1 | bslbf |
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| velocityFlag | 1 | bslbf |
| unitFlag | 1 | bslbf |
| ListUpdate | TimeStampFlag + IDFlag + sensorIdRefFlag + linkedlistFlag + groupIDFlag + priorityFlag + activateFlag + velocityFlag + unitFlag | bslbf |
| ListItemNum = 0 | | |
| if(TimeStampFlag){ | | |
|     if(ListUpdate[ListItemNum]){ | | |
|         TimeStamp | | TimeStampType |
|     } | | |
|     ListItemNum++ | | |
| } | | |
| if(IDFlag){ | | |
|     if(ListUpdate[ListItemNum]){ | | |
|         ID | See ISO 10646 | UTF-8 |
|     } | | |
|     ListItemNum++ | | |
| } | | |
| if(sensorIdRefFlag){ | | |
|     if(ListUpdate[ListItemNum]){ | | |
|         sensorIdRefLength | | vluimsbf5 |
|         sensorIdRef | 8* sensorIdRefLength | bslbf |
|     } | | |
|     ListItemNum++ | | |
| } | | |
| if(linkedlistFlag){ | | |
|     if(ListUpdate[ListItemNum]){ | | |
|         linkedlistLength | | vluimsbf5 |
|         linkedlist | 8* linkedlistLength | bslbf |
|     } | | |
|     ListItemNum++ | | |
| } | | |
| if(groupIDFlag){ | | |
|     if(ListUpdate[ListItemNum]){ | | |
|         groupIDLength | | vluimsbf5 |
|         groupID | 8* groupIDLength | bslbf |
|     } | | |
|     ListItemNum++ | | |
| } | | |
| if(priorityFlag){ | | |
|     if(ListUpdate[ListItemNum]){ | | |
|         priority | 8 | uimsbf |
|     } | | |
|     ListItemNum++ | | |
| } | | |
| if(activateFlag){ | | |
|     if(ListUpdate[ListItemNum]){ | | |
|         activate | 1 | bslbf |
|     } | | |
|     ListItemNum++ | | |
| } | | |
| if(velocityFlag){ | | |
|     if(ListUpdate[ListItemNum){ | | |
|         velocity | | Float3DVectorType |
|     } | | |
|     ListItemNum++ | | |
| } | | |
| if(unitFlag){ | | |
|     if(ListUpdate[ListItemNum]){ | | |
|         unit | | Float3DVectorType |
|     } | | |
|     } | | |
| } | | |

Table 75 shows an example of the angular velocity sensor type.

TABLE 75

| AngularVelocitySensorUpdateModeType { | Number of bits | Mnemonic |
|---|---|---|
| TimeStampFlag | 1 | bslbf |
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| angularvelocityFlag | 1 | bslbf |
| unitFlag | 1 | bslbf |
| ListUpdate | TimeStampFlag + IDFlag + sensorIdRefFlag + linkedlistFlag + groupIDFlag + priorityFlag + activateFlag + angularvelocityFlag + unitFlag | bslbf |
| ListItemNum = 0 | | |
| if(TimeStampFlag){ | | |
|     if(ListUpdate[ListItemNum]){ | | |
|         TimeStamp | | TimeStampType |
|     } | | |
|     ListItemNum++ | | |
| } | | |
| if(IDFlag){ | | |
|     if(ListUpdate[ListItemNum]){ | | |
|         ID | See ISO 10646 | UTF-8 |
|     } | | |
|     ListItemNum++ | | |
| } | | |
| if(sensorIdRefFlag){ | | |
|     if(ListUpdate[ListItemNum]){ | | |
|         sensorIdRefLength | | vluimsbf5 |
|         sensorIdRef | 8* sensorIdRefLength | bslbf |
|     } | | |
|     ListItemNum++ | | |
| } | | |
| if(linkedlistFlag){ | | |
|     if(ListUpdate[ListItemNum]){ | | |
|         linkedlistLength | | vluimsbf5 |
|         linkedlist | 8* linkedlistLength | bslbf |
|     } | | |
|     ListItemNum++ | | |
| } | | |
| if(groupIDFlag){ | | |
|     if(ListUpdate[ListItemNum]){ | | |
|         groupIDLength | | vluimsbf5 |
|         groupID | 8* groupIDLength | bslbf |
|     } | | |
|     ListItemNum++ | | |
| } | | |
| if(priorityFlag){ | | |
|     if(ListUpdate[ListItemNum]){ | | |
|         priority | 8 | uimsbf |
|     } | | |
|     ListItemNum++ | | |
| } | | |
| if(activateFlag){ | | |
|     if(ListUpdate[ListItemNum]){ | | |
|         activate | 1 | bslbf |
|     } | | |
|     ListItemNum++ | | |
| } | | |
| if(angularvelocityFlag){ | | |
|     if(ListUpdate[ListItemNum]){ | | |
|         angularvelocity | | Float3DVectorType |
|     } | | |
|     ListItemNum++ | | |
| } | | |
| if(unitFlag){ | | |
|     if(ListUpdate[ListItemNum]){ | | |
|         unit | | Float3DVectorType |
|     } | | |
|     } | | |
| } | | |

Table 76 shows an example of the acceleration sensor type.

TABLE 76

| AccelerationSensorUpdateModelType { | Number of bits | Mnemonic |
|---|---|---|
| TimeStampFlag | 1 | bslbf |
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| accelerationFlag | 1 | bslbf |
| unitFlag | 1 | bslbf |
| ListUpdate | TimeStampFlag + IDFlag + sensorIdRefFlag + linkedlistFlag + groupIDFlag + priorityFlag + activateFlag + accelerationFlag + unitFlag | bslbf |
| ListItemNum = 0 | | |
| if(TimeStampFlag){ | | |
|    if(ListUpdate[ListItemNum]){ | | |
|       TimeStamp | | TimeStampType |
|    } | | |
|    ListItemNum++ | | |
| } | | |
| if(IDFlag){ | | |
|    if(ListUpdate[ListItemNum]){ | | |
|       ID | See ISO 10646 | UTF-8 |
|    } | | |
|    ListItemNum++ | | |
| } | | |
| if(sensorIdRefFlag){ | | |
|    if(ListUpdate[ListItemNum]){ | | |
|       sensorIdRefLength | | vluimsbf5 |
|       sensorIdRef | 8* sensorIdRefLength | bslbf |
|    } | | |
|    ListItemNum++ | | |
| } | | |
| if(linkedlistFlag){ | | |
|    if(ListUpdate[ListItemNum]){ | | |
|       linkedlistLength | | vluimsbf5 |
|       linkedlist | 8* linkedlistLength | bslbf |
|    } | | |
|    ListItemNum++ | | |
| } | | |
| if(groupIDFlag){ | | |
|    if(ListUpdate[ListItemNum]){ | | |
|       groupIDLength | | vluimsbf5 |
|       groupID | 8* groupIDLength | bslbf |
|    } | | |
|    ListItemNum++ | | |
| } | | |
| if(priorityFlag){ | | |
|    if(ListUpdate[ListItemNum]){ | | |
|       priority | 8 | uimsbf |
|    } | | |
|    ListItemNum++ | | |
| } | | |
| if(activateFlag){ | | |
|    if(ListUpdate(ListItemNum)){ | | |
|       activate | 1 | bslbf |
|    } | | |
|    ListItemNum++ | | |
| } | | |
| if(accelerationFlag){ | | |
|    if(ListUpdate[ListItemNum]){ | | |
|       acceleration | | Float3DVectorType |
|    } | | |
|    ListItemNum++ | | |
| } | | |
| if(unitFlag){ | | |
|    if(ListUpdate[ListItemNum]){ | | |
|       unit | | Float3DVectorType |
|    } | | |
|    } | | |
| } | | |

Table 77 shows an example of the angular acceleration sensor type.

TABLE 77

| AngularAccelerationSensorUpdateModeType{ | Number of bits | Mnemonic |
|---|---|---|
| TimeStampFlag | 1 | bslbf |
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| angularaccelerationFlag | 1 | bslbf |
| unitFlag | 1 | bslbf |
| ListUpdate | TimeStampFlag + IDFlag + sensorIdRefFlag + linkedlistFlag + groupIDFlag + priorityFlag + activateFlag + angularaccelerationFlag + unitFlag | bslbf |
| ListItemNum = 0 | | |
| if(TimeStampFlag){ | | |
|     if(ListUpdate[ListItemNum]){ | | |
|         TimeStamp | | TimeStampType |
|     } | | |
|     ListItemNum++ | | |
| } | | |
| if(IDFlag){ | | |
|     if(ListUpdate[ListItemNum]){ | | |
|         ID | See ISO 10646 | UTF-8 |
|     } | | |
|     ListItemNum++ | | |
| } | | |
| if(sensorIdRefFlag){ | | |
|     if(ListUpdate[ListItemNum]){ | | |
|         sensorIdRefLength | | vluimsbf5 |
|         sensorIdRef | 8* sensorIdRefLength | bslbf |
|     } | | |
|     ListItemNum++ | | |
| } | | |
| if(linkedlistFlag){ | | |
|     if(ListUpdate[ListItemNum]){ | | |
|         linkedlistLength | | vluimsbf5 |
|         linkedlist | 8* linkedlistLength | bslbf |
|     } | | |
|     ListItemNum++ | | |
| } | | |
| if(groupIDFlag){ | | |
|     if(ListUpdate[ListItemNum]){ | | |
|         groupIDLength | | vluimsbf5 |
|         groupID | 8* groupIDLength | bslbf |
|     } | | |
|     ListItemNum++ | | |
| } | | |
| if(priorityFlag){ | | |
|     if(ListUpdate[ListItemNum]){ | | |
|         priority | 8 | uimsbf |
|     } | | |
|     ListItemNum++ | | |
| } | | |
| if(activateFlag){ | | |
|     if(ListUpdate[ListItemNum]){ | | |
|         activate | 1 | bslbf |
|     } | | |
|     ListItemNum++ | | |
| } | | |
| if(angularaccelerationFlag){ | | |
|     if(ListUpdatetListItemNum]){ | | |
|         angularacceleration | | Float3DVectorType |
|     } | | |
|     ListItemNum++ | | |
| } | | |
| if(unitFlag){ | | |
|     if(ListUpdate[ListItemNum]){ | | |

TABLE 77-continued

| AngularAccelerationSensorUpdateModeType{ | Number of bits | Mnemonic |
|---|---|---|
| unit<br>}<br>}<br>} | | Float3DVectorType |

Table 78 shows an example of the motion sensor type.

TABLE 78

| MotionSensorUpdateModeType { | Number of bits | Mnemonic |
|---|---|---|
| TimeStampFlag | 1 | bslbf |
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| positionFlag | 1 | bslbf |
| orientationFlag | 1 | bslbf |
| velocityFlag | 1 | bslbf |
| angularvelocityFlag | 1 | bslbf |
| accelerationFlag | 1 | bslbf |
| angularaccelerationFlag | 1 | bslbf |
| ListUpdate | TimeStampFlag + IDFlag + sensorIdRefFlag + linkedlistFlag + groupIDFlag + priorityFlag + activateFlag + positionFlag + orientationFlag + velocityFlag + angularvelocityFlag + accelerationFlag + angularaccelerationFlag | bslbf |
| ListItemNum = 0 | | |
| if(TimeStampFlag){ | | |
|     if(ListUpdate[ListItemNum]){ | | |
|         TimeStamp | | TimeStampType |
|     } | | |
|     ListItemNum++ | | |
| } | | |
| if(IDFlag){ | | |
|     if(ListUpdate[ListItemNum]){ | | |
|         ID | See ISO 10646 | UTF-8 |
|     } | | |
|     ListItemNum++ | | |
| } | | |
| if(sensorIdRefFlag){ | | |
|     if(ListUpdate[ListItemNum]){ | | |
|         sensorIdRefLength | | vluimsbf5 |
|         sensorIdRef | 8* sensorIdRefLength | bslbf |
|     } | | |
|     ListItemNum++ | | |
| } | | |
| if(linkedlistFlag){ | | |
|     if(ListUpdate[ListItemNum]){ | | |
|         linkedlistLength | | vluimsbf5 |
|         linkedlist | 8* linkedlistLength | bslbf |
|     } | | |
|     ListItemNum++ | | |
| } | | |
| if(groupIDFlag){ | | |
|     if(ListUpdate[ListItemNum]){ | | |
|         groupIDLength | | vluimsbf5 |
|         groupID | 3* groupIDLength | bslbf |
|     } | | |
|     ListItemNum++ | | |
| } | | |
| if(priorityFlag){ | | |
|     if(ListUpdate[ListItemNum]){ | | |
|         priority | 8 | uimsbf |
|     } | | |
|     ListItemNum++ | | |
| } | | |
| if(activateFlag){ | | |

TABLE 78-continued

| MotionSensorUpdateModeType { | Number of bits | Mnemonic |
|---|---|---|
|     if(ListUpdate[ListItemNum]){ | | |
|         activate | 1 | bslbf |
|     } | | |
|     ListItemNum++ | | |
| } | | |
| if(positionFlag){ | | |
|     if(ListUpdate[ListItemNum]){ | | |
|         position | | PositionSensorUpdateModeType |
|     } | | |
|     ListItemNum++ | | |
| } | | |
| if(orientationFlag){ | | |
|     if(ListUpdate[ListItemNum]){ | | |
|         orientation | | OrientationSensorUpdateModeType |
|     } | | |
|     ListItemNum++ | | |
| } | | |
| if(velocityFlag){ | | |
|     if(ListUpdate[ListItemNum]){ | | |
|         velocity | | VelocitySensorUpdateModeType |
|     } | | |
|     ListItemNum++ | | |
| } | | |
| if(angularvelocityFlag){ | | |
|     if(ListUpdate[ListItemNum]){ | | |
|         angularvelocity | | AngularVelocitySensorUpdateModeType |
|     } | | |
|     ListItemNum++ | | |
| } | | |
| if(accelerationFlag){ | | |
|     if(ListUpdate[ListItemNum]){ | | |
|         acceleration | | AccelerationSensorUpdateModeType |
|     } | | |
|     ListItemNum++ | | |
| } | | |
| if(angularaccelerationFlag){ | | |
|     if(ListUpdate[ListItemNum]){ | | |
|         angularacceleration | | AngularAccelerationSensorUpdateModeType |
|     } | | |
|     } | | |
| } | | |

Table 79 shows an example of the intelligent camera type.

TABLE 79

| IntelligentCameraUpdateModeType { | Number of bits | Mnemonic |
|---|---|---|
| TimeStampFlag | 1 | bslbf |
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| FacialIDFlag | 1 | bslbf |
| BodyIDFlag | 1 | bslbf |
| FaceFeatureFlag | 1 | bslbf |
| BodyFeatureFlag | 1 | bslbf |
| ListUpdate | TimeStampFlag + IDFlag + sensorIdRefFlag + linkedlistFlag + groupIDFlag + priorityFlag + activateFlag + FacialIDFlag + BodyIDFlag + FaceFeatureFlag + BodyFeatureFlag | bslbf |
| ListItemNum = 0 | | |
| if(TimeStampFlag){ | | |
|     if(ListUpdate[ListItemNum]){ | | |
|         TimeStamp | | TimeStampType |
|     } | | |
|     ListItemNum++ | | |
| } | | |
| if(IDFlag){ | | |
|     if(ListUpdate[ListItemNum]){ | | |

TABLE 79-continued

| IntelligentCameraUpdateModeType { | Number of bits | Mnemonic |
|---|---|---|
|         ID | See ISO 10646 | UTF-8 |
|         } | | |
|         ListItemNum++ | | |
|     } | | |
|     if(sensorIdRefFlag){ | | |
|         if(ListUpdate[ListItemNum]){ | | |
|             sensorIdRefLength | | vluimsbf5 |
|             sensorIdRef | 8* sensorIdRefLength | bslbf |
|         } | | |
|         ListItemNum++ | | |
|     } | | |
|     if(linkedlistFlag){ | | |
|         if(ListUpdate[ListItemNum]){ | | |
|             linkedlistLength | | vluimsbf5 |
|             linkedlist | 8* linkedlistLength | bslbf |
|         } | | |
|         ListItemNum++ | | |
|     } | | |
|     if(groupIDFlag){ | | |
|         if(ListUpdate[ListItemNum]){ | | |
|             groupIDLength | | vluimsbf5 |
|             groupID | 8* groupIDLength | bslbf |
|         } | | |
|         ListItemNum++ | | |
|     } | | |
|     if(priorityFlag){ | | |
|         if(ListUpdate[ListItemNum]){ | | |
|             priority | 8 | uimsbf |
|         } | | |
|         ListItemNum++ | | |
|     } | | |
|     if(activateFlag){ | | |
|         if(ListUpdate[ListItemNum]){ | | |
|             activate | 1 | bslbf |
|         } | | |
|         ListItemNum++ | | |
|     } | | |
|     if(FacialIDFlag){ | | |
|         if(ListUpdate[ListItemNum]){ | | |
|         FacialAnimationIDLength | | vluimsbf5 |
|         FacialAnimationID | 8* FacialAnimationIDLength | bslbf |
|         } | | |
|         ListItemNum++ | | |
|     } | | |
|     if(BodyIDFlag){ | | |
|         if(ListUpdate[ListItemNum]){ | | |
|         BodyAnimationIDLength | | vliuimsbf5 |
|         BodyAnimationID | 8* BodyAnimationIDLength | bslbf |
|         } | | |
|         ListItemNum++ | | |
|     } | | |
|     if(FaceFeatureFlag) | | |
|         if(ListUpdate[ListItemNum]){ | | |
|         NumOfFaceFeature | 8 | uimsbf |
|         UpdateMask | NumOfFaceFeature | bslbf |
|         for(k=0;k< | | |
| NumOfFaceFeature; k++){ | | |
|             if(UpdateMask[k]){ | | |
|             FaceFeature[k] | | Float3DVectorType |
|             } | | |
|         } | | |
|     } | | |
|     if(BodyFeatureFlag) | | |
|         if(ListUpdate[ListItemNum]{ | | |
|         NumOfBodyFeature | 8 | uimsbf |
|         UpdateMask | NumOfFaceFeature | bslbf |
|         for(k=0;k< | | |
| NumOfBodyFeature; k++){ | | |
|             if(UpdateMask[k]){ | | |
|             BodyFeature[k] | | Float3DVectorType |
|             } | | |
|         } | | |
|     } | | |
| } | | |

Example embodiments of the present disclosure include computer-readable media including program instructions to implement various operations and methods, discussed above, embodied by a computer. The results produced can be displayed on a display of the computing hardware. A program/software implementing the embodiments may be recorded on non-transitory computer-readable media comprising computer-readable recording media. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of computer-readable media include magnetic media such as hard disks, floppy disks, and magnetic tape; optical media such as CD ROM discs; magneto-optical media such as floptical discs; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the virtual world processing apparatus may include at least one processor to execute at least one of the above-described units and methods.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

The invention claimed is:

1. A virtual world processing apparatus, comprising:
a sensor configured to output information relating to sensed information; and
an encoder configured to output metadata of a binary format, based on the output information,
wherein the encoder outputs the metadata of the binary format that is encoded into first metadata or second metadata, depending on an operating mode, the first metadata comprises items in the information, and the second metadata comprises an item of which a value is different from a previous value of the item, among the items in the information, the encoder outputting the metadata into the first metadata in response to the operating mode being a normal mode in which all received information is outputted, and the encoder outputting the metadata into the second metadata in response to the operating mode being an update mode in which only a portion and not all of the received information is outputted.

2. The virtual world processing apparatus of claim 1, wherein the encoder comprises:

a switch configured to receive the information outputted from the sensor, and to output the information to one of output ports of the switch, depending on the operating mode;
a first encoding unit connected to the one of the output ports of the switch to output the first metadata; and
a second encoding unit connected to another of the output ports of the switch to output the second metadata.

3. The virtual world processing apparatus of claim 1, wherein
each item in the information comprises a flag, and data corresponding to the flag,
the second metadata comprises a bit indicating whether a value of each of the flag and the data corresponding to the flag is changed,
the flag has a first value in response to the data corresponding to the flag being present, or has a second value in response to the data corresponding to the flag being absent,
the bit has a third value in response to the value of the corresponding flag or the value of the data corresponding to the flag being changed, or has a fourth value in response to the value of the corresponding flag or the value of the data corresponding to the flag remaining unchanged, and
the second metadata further comprises the flag for which the corresponding bit has the third value, and the data for which the corresponding bit has the third value and the corresponding flag has the first value.

4. The virtual world processing apparatus of claim 1, wherein
each item in the information comprises a flag, and data corresponding to the flag,
the flag has a first value in response to the data corresponding to the flag being present, or has a second value in response to the data corresponding to the flag being absent,
the second metadata comprises the flag, and a bit corresponding to data, among the data, for which the flag of the second metadata has the first value,
the bit has a third value in response to a value of the data corresponding to the flag being changed, or has a fourth value in response to the value of the data corresponding to the flag remaining unchanged, and
the second metadata further comprises data, among the data, for which the corresponding bit has the third value.

5. The virtual world processing apparatus of claim 1, wherein in response to the operating mode being the update mode, a portion of current information which differs from past information is transferred.

6. The virtual world processing apparatus of claim 1, wherein in response to the operating mode being the update mode, only information that differs from past information is outputted.

7. A virtual world processing apparatus, comprising:
a decoder configured to output information, based on metadata of a binary format; and
a processor configured to generate other information to be applied to a virtual world, based on the output information,
wherein the decoder outputs the metadata of the binary format that is decoded into first metadata or second metadata depending on an operating mode, the first metadata comprises items in the outputted information, and the second metadata comprises an item of which a value is different from a previous value of the item, among the items in the outputted information, the metadata being decoded into the first metadata in response to the operating mode being a normal mode in which all received information is outputted, and the metadata being decoded into the second metadata in response to the operating mode being an update mode in which only a portion and not all of the received information is outputted.

8. The virtual world processing apparatus of claim 7, wherein the decoder comprises:
   a first decoding unit to receive the metadata of the binary format, to decode the received metadata of the binary format into the first metadata, and to output the metadata of the binary format that is decoded into the first metadata;
   a second decoding unit to receive the metadata of the binary format, to decode the received metadata of the binary format into the second metadata, and to output the metadata of the binary format that is decoded into the second metadata; and
   a switch to receive an output of the first decoding unit and an output of the second decoding unit, and to output one of the two outputs, depending on the operating mode.

9. The virtual world processing apparatus of claim 7, wherein
   each item in the information comprises a flag, and data corresponding to the flag,
   the second metadata comprises a bit indicating whether a value of each of the flag and the data corresponding to the flag is changed,
   the flag has a first value in response to the data corresponding to the flag being present, or has a second value in response to the data corresponding to the flag being absent,
   the bit has a third value in response to the value of the corresponding flag or the value of the data corresponding to the flag being changed, or has a fourth value in response to the value of the corresponding flag or the value of the data corresponding to the flag remaining unchanged, and
   the second metadata further comprises the flag for which the corresponding bit has the third value, and the data for which the corresponding bit has the third value and the corresponding flag has the first value.

10. The virtual world processing apparatus of claim 7, wherein
   each item in the information comprises a flag, and data corresponding to the flag,
   the flag has a first value when the data corresponding to the flag is present, or has a second value when the data corresponding to the flag is absent,
   the second metadata comprises the flag, and a bit corresponding to data, among the data, for which the flag corresponding to the second metadata has the first value,
   the bit has a third value in response to a value of the data corresponding to the flag being changed, or has a fourth value in response to the value of the data corresponding to the flag remaining unchanged, and
   the second metadata further comprises data, among the data, for which the corresponding bit has the third value.

11. A virtual world processing method, comprising:
   outputting information about sensed information; and
   outputting metadata of a binary format, based on the output information,
   wherein the outputting of the metadata of the binary format comprises outputting the metadata of the binary format that is encoded into first metadata or second metadata depending on an operating mode, the first metadata comprises items in the information, and the second metadata comprises an item of which a value is different from a previous value of the item, among the items in the information, and
   wherein the second metadata comprises flags corresponding to the items,
   each of the flags has a first value in response to the corresponding item being present, or has a second value in response to the corresponding item being absent,
   the second metadata further comprises at least one bit corresponding to at least one item, among the items, for which the corresponding flag has the first value,
   each of the at least one bit has a third value in response to a value of the corresponding item being changed, or has a fourth value in response to the value of the corresponding item remaining unchanged, and
   the second metadata further comprises the value of the item, among the items, for which the corresponding bit has the third value.

12. The virtual world processing method of claim 11, wherein the outputting of the metadata of the binary form comprises:
   receiving the information, and outputting the information to one of output ports of the switch depending on the modes;
   outputting the first metadata to the one of the output ports based on the output information; and
   outputting the second metadata to another of the output ports based on the output information.

13. A non-transitory computer-readable medium comprising a program for instructing a computer to perform the method of claim 11.

14. A virtual world processing method, comprising:
   outputting information based on metadata of a binary format; and
   generating other information to be applied to a virtual world, based on the outputted information,
   wherein the outputting of the information comprises outputting the metadata of the binary format that is decoded into first metadata or second metadata depending on an operating mode, the first metadata comprises items in the outputted information, and the second metadata comprises an item of which a value is different from a previous value of the item, among the items in the outputted information, and
   wherein the second metadata comprises flags corresponding to the items,
   each of the flags has a first value in response to the corresponding item being present, or has a second value in response to the corresponding item being absent,
   the second metadata further comprises at least one bit corresponding to at least one item, among the items, for which the corresponding flag has the first value,
   each of the at least one bit has a third value in response to a value of the corresponding item being changed, or has a fourth value in response to the value of the corresponding item remaining unchanged, and
   the second metadata further comprises the item, among the items, for which the corresponding bit has the third value.

15. The virtual world processing method of claim 14, wherein the outputting of the information comprises:
- receiving the metadata of the binary format, decoding the received metadata of the binary format into the first metadata, and outputting the metadata of the binary format that is decoded into the first metadata;
- receiving the metadata of the binary format, decoding the received metadata of the binary format into the second metadata, and outputting the metadata of the binary format that is decoded into the second metadata; and
- receiving an output of the first decoding unit and an output of the second decoding unit, and outputting one of the received two outputs, depending on the operating mode.

16. A method for interacting between a real world and a virtual world, the method comprising:
- transferring, by a processor, information from the real world to the virtual world, the information being sensed in the real world using a sensor; and
- processing the transferred information, and applying the transferred information to the virtual world, thereby controlling an object of the virtual world,
- wherein the transferring of information comprises transferring an entirety of the information being sensed or a selective portion of the information being sensed, based on an operating mode, and
- wherein the selective portion of the information being sensed is transferred in response to the transferred information being scarcely different from previously transferred information and in response to an operating being an update mode, in which only a portion and not all of the received information is outputted.

17. The method of claim 16, wherein the operating mode is one of a normal mode and an updating mode.

* * * * *